(12) United States Patent
Ma et al.

(10) Patent No.: US 10,674,482 B2
(45) Date of Patent: Jun. 2, 2020

(54) RESOURCE ALLOCATION METHOD, BASE STATION, AND USER EQUIPMENT

(71) Applicant: HUAWEI TECHNOLOGIES CO., LTD., Shenzhen, Guangdong (CN)

(72) Inventors: Jie Ma, Shenzhen (CN); Bo Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 164 days.

(21) Appl. No.: 15/631,624

(22) Filed: Jun. 23, 2017

(65) Prior Publication Data
US 2017/0295563 A1  Oct. 12, 2017

Related U.S. Application Data

(63) Continuation of application No. PCT/CN2014/094995, filed on Dec. 25, 2014.

(51) Int. Cl.
*H04W 4/00* (2018.01)
*H04W 72/04* (2009.01)
*H04W 92/18* (2009.01)

(52) U.S. Cl.
CPC .......... *H04W 72/04* (2013.01); *H04W 92/18* (2013.01)

(58) Field of Classification Search
CPC .............................. H04W 72/04; H04W 92/18
(Continued)

(56) References Cited

U.S. PATENT DOCUMENTS 9,936,531 B2 * 4/2018 Wang ............... H04W 76/14
2014/0010207 A1 * 1/2014 Horn ............... H04W 36/165
370/332

(Continued)

FOREIGN PATENT DOCUMENTS

CN  103200634 A  7/2013
CN  103442409     12/2013
(Continued)

OTHER PUBLICATIONS

International Search Report dated Sep. 25, 2015 in corresponding International Application No. PCT/CN2014/094995.
(Continued)

*Primary Examiner* — Chuong T Ho
(74) *Attorney, Agent, or Firm* — Leydig, Voit & Mayer, Ltd.

(57) ABSTRACT

The present invention provides a resource allocation method, a base station, and user equipment. The method includes: receiving, by a second base station, resource configuration information of a first base station; and sending, by the second base station, the resource configuration information of the first base station to user equipment (UE), where the resource configuration information of the first base station is used to configure a resource for device-to-device (D2D) communication between the UE and the second base station. According to the method provided in embodiments of the present invention, the UE can perform D2D communication with the second base station or a core network by using the resource configured by using the resource configuration information of the first base station. Therefore, an uplink resource or a downlink resource of the first base station can be reused by the UE, thereby improving resource utilization of a communications system.

14 Claims, 23 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2015/0119055 A1* | 4/2015 | Shin | ...................... | H04W 8/005 455/450 |
| 2015/0124748 A1* | 5/2015 | Park | ...................... | H04L 5/0032 370/329 |
| 2015/0146687 A1* | 5/2015 | Kim | ...................... | H04W 76/14 370/331 |
| 2015/0264631 A1* | 9/2015 | Zhang | .................. | H04W 48/08 370/329 |
| 2016/0150458 A1* | 5/2016 | Wang | ................ | H04W 36/0072 370/331 |
| 2016/0157172 A1* | 6/2016 | Jeong | ................... | H04W 76/14 370/329 |
| 2016/0295613 A1* | 10/2016 | Wager | ................. | H04L 41/0813 |
| 2016/0338124 A1* | 11/2016 | Byun | .................... | H04W 76/00 |
| 2016/0374139 A1* | 12/2016 | Chen | ....................... | H04L 47/29 |
| 2017/0070924 A1* | 3/2017 | Wu | ........................ | H04W 36/08 |
| 2017/0366995 A1* | 12/2017 | Jung | ...................... | H04W 24/10 |

FOREIGN PATENT DOCUMENTS

| | | |
|---|---|---|
| CN | 103916968 | 7/2014 |
| CN | 103974419 | 8/2014 |
| CN | 105934895 A | 9/2016 |
| WO | WO2013177183 | 11/2013 |

OTHER PUBLICATIONS

International Search Report, dated Sep. 21, 2015, in International Application No. PCT/CN2014/094995 (4 pp.).

Extended European Search Report dated Nov. 15, 2017 in corresponding European Patent Application No. 14908789.2.

LG Electronics Inc.: "D2D operation upon mobility," 3GPP Draft; R-143736 [D2D-C] D2D Operation Upon Mobility, $3^{rd}$ Generation Partnership Project (3GPP), Mobile Competence Centre; 650, Route Des Lucioles; F-06921 Sophia Antipolis Cedex; France, vol. RAN WG2, No. Dresden, Germany; Aug. 9, 2014, XP050820009.

ZTE: "Discussion on the ProSe authorised indication in X2 handover," 3GPP Draft; R3-141809, $3^{rd}$ Generation Partnership Project (3GPP), Mobile Competence Centre; 650, Route Des Lucioles; F-06921 Sophia Antipolis Cedex; France, vol. RAN WG3, No. Dresden, Germany; Aug. 8, 2014, XP050821783.

ZTE: "Solution for ProSe discovery and communication," 3GPP Draft; S2-130979-ZTE Arch Alt for ProSe, $3^{rd}$ Generation Partnership Project (3GPP), Mobile Competence Centre; 650, Route Des Lucioles; F-06921 Sophia Antipolis Cedex; France, vol. SA WG2, No. San Diego, USA; Apr. 2, 2013, XP050708226.

Chinese Office Action dated Apr. 19, 2019 in corresponding Chinese Patent Application No. 201480084261.4.

\* cited by examiner

CONT. FROM FIG. 19A | CONT. FROM FIG. 19A | CONT. FROM FIG. 19A

1908. Determine, according to the received signal received strength that is of the reference signal and that is reported by the UE, that the UE meets a preset condition of performing D2D communication with the second base station 1909. Send identifier information of the UE to the second base station, where the identifier information of the UE is used to notify the second base station that the UE meets the preset condition of performing D2D communication with the second base station, and is further used to indicate that the second base station serves as a second serving cell of the UE 1910. Send, to the UE, second indication information that carries a first identifier, where the second indication information is used to instruct the UE to perform D2D communication with the second base station corresponding to the first identifier 1911. Send the resource configuration information of the first base station to the UE 1912. Obtain, according to the resource configuration information of the first base station, a communications resource required for D2D communication 1913. Send data obtained from a core network to the second base station 1914. Send the data to the UE in a D2D communication mode, so that the UE can receive the data by using the determined communications resource

FIG. 19B

RESOURCE ALLOCATION METHOD, BASE STATION, AND USER EQUIPMENT

CROSS-REFERENCE TO RELATED APPLICATIONS

This application is a continuation of International Application No. PCT/CN2014/094995, filed on Dec. 25, 2014, the disclosure of which is hereby incorporated by reference in its entirety.

TECHNICAL FIELD

The present invention relates to communications technologies, and in particular, to a resource allocation method, a base station, and user equipment.

BACKGROUND

In recent years, with rapid development of wireless communications technologies, a quantity of wireless users increases sharply; and a service requirement also increases sharply. As various new wireless services emerge, people have a higher requirement on a communication rate. However, spectrum resources applicable to wireless communication are limited. Therefore, to provide a high enough data communication rate by using the limited spectrum resources to meet a user requirement, it is extremely important to improve spectrum utilization.

Currently, in a frequency division duplex (FDD) system, a mobile broadband (MBB) service is obviously asymmetrical, and a downlink service volume is three times an uplink service volume. Consequently, downlink spectrum resources are not sufficient, while uplink spectrum resources are usually in an idle state.

Therefore, how to maximize utilization of spectrum resources for service transmission is a problem to be resolved in the present invention.

SUMMARY

Embodiments of the present invention provide a resource allocation method, a base station, and user equipment, so as to resolve a prior-art technical problem of low resource utilization.

According to a first aspect, an embodiment of the present invention provides a resource allocation method, including:

receiving, by a second base station, resource configuration information of a first base station: and sending, by the second base station, the resource configuration information of the first base station to user equipment (UE), where the resource configuration information of the first base station is used to configure a resource for device-to-device (D2D) communication between the UE and the second base station.

With reference to the first aspect, in a first possible implementation of the first aspect, before the receiving, by a second base station, resource configuration information of a first base station, the method further includes:

notifying, by the second base station, the first base station that the second base station supports D2D communication.

With reference to the first aspect or the first possible implementation of the first aspect, in a second possible implementation of the first aspect, the sending, by the second base station, the resource configuration information of the first base station to UE includes:

sending, by the second base station, the resource configuration information of the first base station to the UE by using the resource configured by using the resource configuration information of the first base station.

With reference to any one of the first aspect to the second possible implementation of the first aspect, in a third possible implementation of the first aspect, before the sending, by the second base station, the resource configuration information of the first base station to user equipment (UE), the method further includes:

sending, by the second base station, a reference signal to the UE, where the reference signal is used to instruct the UE to send a setup request message; and receiving, by the second base station, the setup request message, where the setup request message is used to request the second base station to send the resource configuration information of the first base station to the UE.

With reference to the third possible implementation of the first aspect, in a fourth possible implementation of the first aspect, the setup request message is an RRC connection setup request message.

With reference to the third possible implementation of the first aspect or the fourth possible implementation of the first aspect, in a fifth possible implementation of the first aspect, the sending, by the second base station, the resource configuration information of the first base station to UE includes:

sending, by the second base station, a setup response message to the UE, where the setup response message includes the resource configuration information of the first base station, and the setup request message is directly sent by the UE to the second base station.

With reference to the third possible implementation of the first aspect or the fourth possible implementation of the first aspect, in a sixth possible implementation of the first aspect, the setup request message includes an identifier of the UE and first indication information, the first indication information is used to notify the second base station that the UE supports D2D communication with the second base station, and the sending, by the second base station, the resource configuration information of the first base station to UE includes:

sending, by the second base station, a setup response message to the UE according to the identifier of the UE, where the setup response message includes the resource configuration information of the first base station, and the setup request message is sent by the UE to the second base station by using the first base station.

With reference to the fifth possible implementation of the first aspect or the sixth possible implementation of the first aspect, in a seventh possible implementation of the first aspect, the setup response message is an RRC connection setup response message.

With reference to any one of the first aspect to the second possible implementation of the first aspect, in an eighth possible implementation of the first aspect, the sending, by the second base station, the resource configuration information of the first base station to UE includes:

receiving, by the second base station, identifier information of the UE sent by the first base station, where the identifier information of the UE is used to notify the second base station that the UE supports D2D communication with the second base station; and sending, by the second base station, the resource configuration information of the first base station to the UK according to the identifier information of the UE.

With reference to the eighth possible implementation of the first aspect in a ninth possible implementation of the first aspect, the identifier information of the UE is further used to indicate that the second base station serves as a second serving cell of the UE.

With reference to the ninth possible implementation of the first aspect, in a tenth possible implementation of the first aspect, after the sending, by the second base station, the resource configuration information of the first base station to the UE according to the identifier information of the UE, the method further includes:

receiving, by the second base station, data sent by the first base station; and sending, by the second base station, the data to the UE according to the resource configured by using the resource configuration information of the first base station.

With reference to any one of the eighth possible implementation of the first aspect to the tenth possible implementation of the first aspect, in an eleventh possible implementation of the first aspect, the sending, by the second base station, the resource configuration information of the first base station to the UE according to the identifier information of the UE includes:

sending, by the second base station, the resource configuration information of the first base station to the UE by using the first base station.

With reference to any one of the eighth possible implementation of the first aspect to the tenth possible implementation of the first aspect, in a twelfth possible implementation of the first aspect, the sending, by the second base station, the resource configuration information of the first base station to the UE according to the identifier information of the UE includes:

receiving, by the second base station, an RRC connection setup request message sent by the UE; and sending, by the second base station, an RRC connection setup response message to the UE, where the RRC connection setup response message includes the resource configuration information of the first base station.

With reference to any one of the eighth possible implementation of the first aspect to the twelfth possible implementation of the first aspect, in a thirteenth possible implementation of the first aspect, the resource configured by using the resource configuration information of the first base station includes an uplink resource of the first base station and/or a downlink resource of the first base station.

According to a second aspect, an embodiment of the present invention provides a resource allocation method, including:

sending, by a first base station, resource configuration information of the first base station to a second base station, where the resource configuration information of the first base station is used to configure a resource for device-to-device (D2D) communication between user equipment (UE) and the second base station.

With reference to the second aspect, in a first possible implementation of the second aspect before the sending, by a first base station, resource configuration information of the first base station to a second base station, the method further includes:

determining, by the first base station according to an indication of the second base station, that the second base station supports D2D communication.

With reference to the second aspect or the first possible implementation of the second aspect, in a second possible implementation of the second aspect, after the sending, by a first base station, resource configuration information of the first base station to a second base station, the method further includes:

sending, by the first base station, a first message to the UE, where the first message is used to notify the UE that the second base station supports D2D communication;

receiving, by the first base station, an RRC connection setup request message that is sent by the UE and that carries first indication information, where the first indication information is used to notify the first base station that the UE supports D2D communication with the second base station; and adding, by the first base station, an identifier of the UE to the RRC connection setup request message, and sending the RRC connection setup request message to the second base station, so that the second base station sends an RRC connection setup response message to the UE according to the identifier of the UE, where the RRC connection setup response message includes the resource configuration information of the first base station.

With reference to the second aspect or the first possible implementation of the second aspect, in a third possible implementation of the second aspect, after the sending, by a first base station, resource configuration information of the first base station to a second base station, the method further includes:

sending, by the first base station, a first message to the UE, where the first message is used to notify the UE that the second base station supports D2D communication;

sending, by the first base station, a measurement instruction to the UE, where the measurement instruction is used to instruct the UE to measure signal received strength of a reference signal sent by the second base station;

determining, by the first base station according to the received signal received strength that is of the reference signal and that is reported by the UE, that the UE supports D2D communication with the second base station; and sending, by the first base station, identifier information of the UE to the second base station, and sending, to the UE, second indication information that carries a first identifier, where the identifier information of the UE is used to notify the second base station that the UE supports D2D communication with the second base station, and the second indication information is used to instruct the UE to perform D2D communication with the second base station corresponding to the first identifier.

With reference to the third possible implementation of the second aspect, in a fourth possible implementation of the second aspect, the identifier information of the UE is further used to indicate that the second base station serves as a second serving cell of the UE.

With reference to the third possible implementation of the second aspect or the fourth possible implementation of the second aspect, in a fifth possible implementation of the second aspect, after the sending, by the first base station, identifier information of the UE to the second base station, and sending, to the UE, second indication information that carries a first identifier, the method further includes:

receiving, by the first base station, the resource configuration information of the first base station sent by the second base station corresponding to the first identifier, and sending the resource configuration information of the first base station to the UE.

According to a third aspect, an embodiment of the present invention provides a resource allocation method, including:

receiving, by user equipment (UE), resource configuration information of a first base station sent by a second base station; and determining, by the UE according to the resource configuration information of the first base station, a communications resource required for D2D communication.

With reference to the third aspect, in a first possible implementation of the third aspect, the receiving, by UE, resource configuration information of a first base station sent by a second base station includes:

receiving, by the UE, the resource configuration information of the first base station sent by the second base station by using a resource configured by using the resource configuration information of the first base station.

With reference to the third aspect or the first possible implementation of the third aspect, in a second possible implementation of the third aspect, before the receiving, by UE, resource configuration information of a first base station sent by a second base station, the method further includes:

receiving, by the UE, a reference signal sent by the second base station, where the reference signal is used to instruct the UE to send a setup request message; and sending, by the UE, the setup request message, where the setup request message is used to request the second base station to send the resource configuration information of the first base station to the UE.

With reference to the second possible implementation of the third aspect, in a third possible implementation of the third aspect, the sending, by the UE, the setup request message specifically includes:

receiving, by the UE, a first message sent by the first base station, where the first message is used to notify the UE that the second base station supports D2D communication;

measuring, by the UE, signal received strength of the reference signal, and determining, according to the signal received strength of the reference signal, that the UE supports D2D communication with the second base station; and sending, by the UE, the setup request message.

With reference to the third possible implementation of the third aspect, in a fourth possible implementation of the third aspect, the setup request message is an RRC connection setup request message.

With reference to any one of the second possible implementation of the third aspect to the fourth possible implementation of the third aspect, in a fifth possible implementation of the third aspect, the receiving, by UE, resource configuration information of a first base station sent by a second base station includes:

receiving, by the UE, a setup response message sent by the second base station, where the setup response message includes the resource configuration information of the first base station, and the setup request message is directly sent by the UE to the second base station.

With reference to any one of the second possible implementation of the third aspect to the fourth possible implementation of the third aspect, in a sixth possible implementation of the third aspect, the setup request message includes an identifier of the UE and first indication information, the first indication information is used to notify the second base station that the UE supports D2D communication with the second base station, and the receiving, by UE, resource configuration information of a first base station sent by a second base station includes:

receiving, by the UE, a setup response message sent by the second base station according to the identifier of the UE, where the setup response message includes the resource configuration information of the first base station, and the setup request message is sent by the UE to the second base station by using the first base station.

With reference to the fifth possible implementation of the third aspect or the sixth possible implementation of the first aspect, in a seventh possible implementation of the third aspect, the setup response message is an RRC connection setup response message.

With reference to the third aspect or the first possible implementation of the third aspect, in an eighth possible implementation of the third aspect, the receiving, by UE, resource configuration information of a first base station sent by a second base station includes:

measuring, by the UE according to a measurement instruction sent by the first base station, signal received strength of a reference signal sent by the second base station;

reporting, by the UE, the signal received strength of the reference signal to the first base station, so that the first base station sends identifier information of the UE to the second base station after determining, according to the signal received strength of the reference signal, that the UE supports D2D communication with the second base station, where the identifier information of the UE is used to notify the second base station that the UE supports D2D communication with the second base station;

receiving, by the UE, second indication information that is sent by the first base station and that carries a first identifier, where the second indication information is used to instruct the UE to perform D2D communication with the second base station corresponding to the first identifier; and receiving, by the UE, the resource configuration information of the first base station sent by the second base station corresponding to the first identifier.

With reference to the eighth possible implementation of the third aspect, in a ninth possible implementation of the third aspect, the identifier information of the UE is further used to indicate that the second base station serves as a second serving cell of the UE.

With reference to the eighth possible implementation of the third aspect or the ninth possible implementation of the third aspect, in a tenth possible implementation of the third aspect, the receiving, by the UE, the resource configuration information of the first base station sent by the second base station corresponding to the first identifier includes:

receiving, by the UE, the resource configuration information of the first base station sent by using the first base station by the second base station corresponding to the first identifier.

With reference to the eighth possible implementation of the third aspect or the ninth possible implementation of the third aspect, in an eleventh possible implementation of the third aspect, the receiving, by the UE, the resource configuration information of the first base station sent by the second base station corresponding to the first identifier includes:

sending, by the UE, an RRC connection setup request message to the second base station corresponding to the first identifier: and receiving, by the UE, an RRC connection setup response message sent by the second base station corresponding to the first identifier, where the RRC connection setup response message includes the resource configuration information of the first base station.

According to a fourth aspect, an embodiment of the present invention provides a resource allocation method, including:

receiving, by the second base station, resource configuration information of a first base station, where the resource configuration information of the first base station is used to configure a resource for device-to-device (D2D) communication between the UE and the second base station, and is used to set a mode of communication between the second base station and the first base station to a D2D communication mode; and performing, by the second base station, D2D communication with the first base station by using the resource configured by using the resource configuration information of the first base station.

According to a fifth aspect, on embodiment of the present invention provides a base station, including:

a receiving module, configured to receive resource configuration information of a first base station; and a sending module, configured to send the resource configuration information of the first base station to user equipment (UE), where the resource configuration information of the first base station is used to configure a resource for device-to-device (D2D) communication between UE and the base station.

With reference to the fifth aspect, in a first possible implementation of the fifth aspect, the sending module is further configured to: before the receiving module receives the resource configuration information of the first base station, notify the first base station that the base station supports D2D communication.

With reference to the fifth aspect or the first possible implementation of the fifth aspect, in a second possible implementation of the fifth aspect, the sending module is specifically configured to send the resource configuration information of the first base station to the UE by using the resource configured by using the resource configuration information of the first base station.

With reference to any one of the fifth aspect to the second possible implementation of the fifth aspect, in a third possible implementation of the fifth aspect, the sending module is further configured to send a reference signal to the UE before sending the resource configuration information of the first base station to the user equipment (UE), where the reference signal is used to instruct the UE to send a setup request message; and the receiving module is further configured to receive the setup request message, where the setup request message is used to request the base station to send the resource configuration information of the first base station to the UE.

With reference to the third possible implementation of the fifth aspect, in a fourth possible implementation of the fifth aspect, the setup request message is an RRC connection setup request message.

With reference to the third possible implementation of the fifth aspect or the fourth possible implementation of the fifth aspect, in a fifth possible implementation of the fifth aspect, the sending module is specifically configured to send a setup response message to the UE, where the setup response message includes the resource configuration information of the first base station, and the setup request message is directly sent by the UE to the base station.

With reference to the third possible implementation of the fifth aspect or the fourth possible implementation of the fifth aspect, in a sixth possible implementation of the fifth aspect, the setup request message includes an identifier of the UE and first indication information, the first indication information is used to notify the base station that the UE supports D2D communication with the base station, and the sending module is specifically configured to scud a setup response message to the UE according to the identifier of the UE, where the setup response message includes the resource configuration information of the first base station, and the setup request message is sent by the UE to the base station by using the first base station.

With reference to the fifth possible implementation of the fifth aspect or the sixth possible implementation of the fifth aspect, in a seventh possible implementation of the fifth aspect, the setup response message is an RRC connection setup response message.

With reference to any one of the fifth aspect to the second possible implementation of the fifth aspect, in an eighth possible implementation of the fifth aspect, the receiving module is specifically configured to receive identifier information of the UE sent by the first base station, where the identifier information of the UE is used to notify the base station that the UE supports D2D communication with the base station; and the sending module is specifically configured to send the resource configuration information of the first base station to the UE according to the identifier information of the UE.

With reference to the eighth possible implementation of the fifth aspect, in a ninth possible implementation of the fifth aspect, the identifier information of the UE is further used to indicate that the base station serves as a second serving cell of the UE.

With reference to the ninth possible implementation of the fifth aspect, in a tenth possible implementation of the fifth aspect, the receiving module is further configured to: after the sending module sends the resource configuration information of the first base station to the UE according to the identifier information of the UE, receive data sent by the first base station; and the sending module is further configured to send the data to the UE according to the resource configured by using the resource configuration information of the first base station.

With reference to any one of the eighth possible implementation of the fifth aspect to the tenth possible implementation of the fifth aspect, in an eleventh possible implementation of the fifth aspect, the sending module is specifically configured to send the resource configuration information of the first base station to the UE by using the first base station.

With reference to any one of the eighth possible implementation of the fifth aspect to the tenth possible implementation of the fifth aspect, in a twelfth possible implementation of the fifth aspect, the receiving module is specifically configured to receive an RRC connection setup request message sent, by the UE; and the sending module is specifically configured to send an RRC connection setup response message to the UE, where the RRC connection setup response message includes the resource configuration information of the first base station.

With reference to any one of the fifth aspect to the twelfth possible implementation of the fifth aspect, in a thirteenth possible implementation of the fifth aspect, the resource configured by using the resource configuration information of the first base station includes an uplink resource of the first base station and/or a downlink resource of the first base station.

According to a sixth aspect, an embodiment of the present invention provides a base station, including:

a sending module, configured to send resource configuration information of the base station to a second base station, where the resource configuration information of the base station is used to configure a resource for device-to-device (D2D) communication between user equipment (UE) and the second base station.

With reference to the sixth aspect, in a first possible implementation of the sixth aspect, the base station further includes:

a processing module, configured to determine, according to an indication of the second base station, that the second base station supports D2D communication.

With reference to the sixth aspect or the first possible implementation of the sixth aspect, in a second possible implementation of the sixth aspect, the base station further includes a receiving module;

the sending module is further configured to send a first message to the UE after sending the resource configuration information of the base station to the second base station, where the first message is used to notify the UE that the second base station supports D2D communication;

the receiving module is configured to receive an RRC connection setup request message that is sent by the UE and that carries first indication information, where the first indication information is used to notify the base station that the UE supports D2D communication with the second base station; and the sending module is further configured to: add an identifier of the UE to the RRC connection setup request message, and send the RRC connection setup request message to the second base station, so that the second base station sends an RRC connection setup response message to the UE according to the identifier of the UE, where the RRC connection setup response message includes the resource configuration information of the base station.

With reference to the sixth aspect or the first possible implementation of the sixth aspect, in a third possible implementation of the sixth aspect, the base station further includes a receiving module;

the sending module is further configured to: send a first message to the UE, and send a measurement instruction to the UE, where the first message is used to notify the UE that the second base station supports D2D communication, and the measurement instruction is used to instruct the UE to measure signal received strength of a reference signal sent by the second base station;

the processing module is further configured to determine, according to the signal received strength that is of the reference signal, reported by the UE, and received by the receiving module, that the UE supports D2D communication with the second base station; and the sending module is further configured to: send identifier information of the UE to the second base station, and send, to the UE, second indication information that carries a first identifier, where the identifier information of the UE is used to notify the second base station that the UE supports D2D communication with the second base station, and the second indication information is used to instruct the UE to perform D2D communication with the second base station corresponding to the first identifier.

With reference to the third possible implementation of the sixth aspect, in a fourth possible implementation of the sixth aspect, the identifier information of the UE is further used to indicate that the second base station serves as a second serving cell of the UE.

With reference to the third possible implementation of the sixth aspect or the fourth possible implementation of the sixth aspect, in a fifth possible implementation of the sixth aspect, the receiving module is further configured to: after the sending module sends the identifier information of the UE to the second base station, and sends, to the UE, the second indication information that carries the first identifier, receive the resource configuration information of the base station sent by the second base station corresponding to the first identifier; and the sending module is further configured to send the resource configuration information of the base station to the UE.

According to a seventh aspect, an embodiment of the present invention provides user equipment (UE), including:

a receiving module, configured to receive resource configuration information of a first base station sent by a second base station; and a processing module, configured to determine, according to the resource configuration information of the first base station, a communications resource required for D2D communication.

With reference to the seventh aspect, in a first possible implementation of the seventh aspect, the receiving module is specifically configured to receive the resource configuration information of the first base station sent by the second base station by using a resource configured by using the resource configuration information of the first base station.

With reference to the seventh aspect or the first possible implementation of the seventh aspect, in a second possible implementation of the seventh aspect, the UE further includes a sending module;

the receiving module is further configured to: before receiving the resource configuration information of the first base station sent by the second base station, receive a reference signal sent by the second base station, where the reference signal is used to instruct the UE to send a setup request message; and the sending module is configured to send the setup request message, where the setup request message is used to request the second base station to send the resource configuration information of the first base station to the UE.

With reference to the second possible implementation of the seventh aspect, in a third possible implementation of the seventh aspect, the receiving module is specifically configured to receive a first message sent by the first base station, where the first message is used to notify the UE that the second base station supports D2D communication;

the processing module is specifically configured to; measure signal received strength of the reference signal, and determine, according to the signal received strength of the reference signal, that the UE supports D2D communication with the second base station; and the sending module is specifically configured to send the setup request message alter the processing module determines, according to the signal received strength of the reference signal, that the UE supports D2D communication with the second base station.

With reference to the third possible implementation of the seventh aspect, in a fourth possible implementation of the seventh aspect, the setup request message is an RRC connection setup request message.

With reference to any one of the second possible implementation of the seventh aspect to the fourth possible implementation of the seventh aspect, in a fifth possible implementation of the seventh aspect, the receiving module is specifically configured to receive a setup response message sent by the second base station, where the setup response message includes the resource configuration information of the first base station, and the setup request message is directly sent by the UE to the second base station.

With reference to any one of the second possible implementation of the seventh aspect to the fourth possible implementation of the seventh aspect, in a sixth possible implementation of the seventh aspect, the setup request message includes an identifier of the UE and first indication information, the first indication information is used to notify the second base station that the UE supports D2D communication with the second base station, and the receiving module is specifically configured to receive a setup response message sent by the second base station according to the identifier of the UE, where the setup response message includes the resource configuration information of the first base station, and the setup request message is sent by the UE to the second base station by using the first base station.

With reference to the fifth possible implementation of the seventh aspect or the sixth possible implementation of the seventh aspect, in a seventh possible implementation of the seventh aspect, the setup response message is an RRC connection setup response message.

With reference to the seventh aspect or the first possible implementation of the seventh aspect, in an eighth possible implementation of the seventh aspect, the processing module is specifically configured to measure, according to a measurement instruction sent by the first base station, signal received strength of a reference signal sent by the second base station;

the sending module is specifically configured to report the signal received strength of the reference signal to the first base station, so that the first base station sends identifier information of the UE to the second base station after determining, according to the signal received strength of the reference signal, that the UE supports D2D communication with the second base station, where the identifier information of the UE is used to notify the second base station that the UE supports D2D communication with the second base station; and the receiving module is specifically configured to: receive second indication information that is sent by the first base station and that carries a first identifier, and receive the resource configuration information of the first base station sent by the second base station corresponding to the first identifier, where the second indication information is used to instruct the UR to perform D2D communication with the second base station corresponding to the first identifier.

With reference to the eighth possible implementation of the seventh aspect, in a ninth possible implementation of the seventh aspect, the identifier information of the UE is further used to indicate that the second base station serves as a second serving cell of the UE.

With reference to the eighth possible implementation of the seventh aspect or the ninth possible implementation of the seventh aspect, in a tenth possible implementation of the seventh aspect, the receiving module is specifically configured to receive the resource configuration information of the first base station sent by using the first base station by the second base station corresponding to the first identifier.

With reference to the eighth possible implementation of the seventh aspect or the ninth possible implementation of the seventh aspect, in an eleventh possible implementation of the seventh aspect, the sending module is specifically configured to send an RRC connection setup request message to the second base station corresponding to the first identifier; and the receiving module is specifically configured to receive an RRC connection setup response message sent by the second base station corresponding to the first identifier, where the RRC connection setup response message includes the resource configuration information of the first base station.

According to an eighth aspect, an embodiment of the present invention provides a base station, including:

a receiving module, configured to receive resource configuration information of a first base station, where the resource configuration information of the first base station is used to configure a resource for device-to-device (D2D) communication between UE and the base station, and is used to set a mode of communication between the base station and the first base station to a D2D communication mode; and a processing module, configured to perform D2D communication with the first base station by using the resource configured by using the resource configuration information of the first base station.

According to the resource allocation method, the base station, and the user equipment provided in the embodiments of the present invention, a second base station receives resource configuration information of a first base station, and sends the resource configuration information of the first base station to UE, so that the UE performs D2D communication with the second base station or a core network by using a resource configured by using the resource configuration information of the first base station. Therefore, an uplink resource or a downlink resource of the first base station can be reused by the UE, thereby improving resource utilization of a communications system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 19A and FIG. 19B are a signaling flowchart of Embodiment 19 of a resource allocation method according to the present invention;

DESCRIPTION OF EMBODIMENTS

Figure 1:
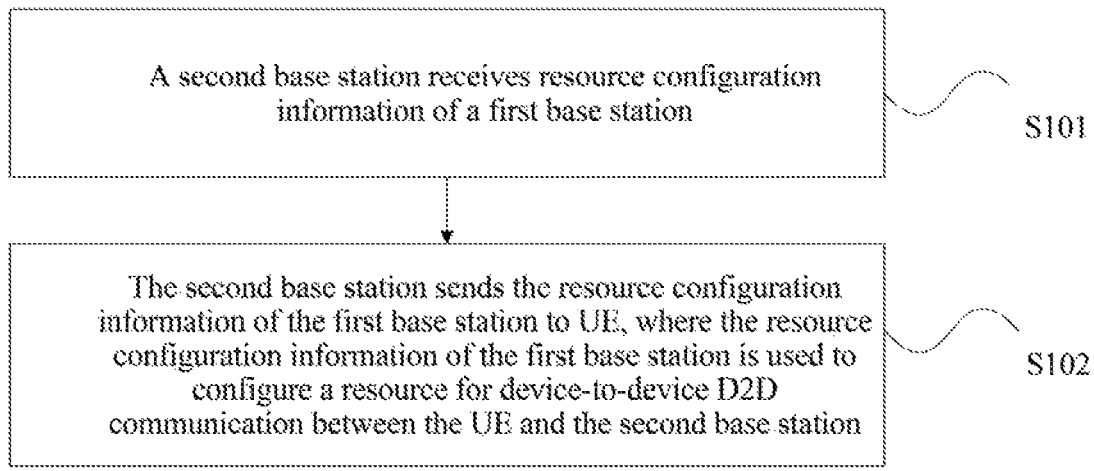
FIG. 1 is a schematic flowchart of Embodiment 1 of a resource allocation method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A terminal involved in this application, that is, user equipment, may be a wireless terminal or a wired terminal. The wireless terminal may refer to a device that provides a user with voice and/or data connectivity, a handheld device with a wireless connection function, or another processing device connected to a radio modem. The wireless terminal may communicate with one or more core networks by using a radio access network (such as radio access network (RAN)). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal is a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

A base station (for example, an access point) involved in this application may refer to a device in communication with a wireless terminal by using one or more sectors at an air interface in an access network. The base station may be configured to mutually convert a received over-the-air frame and an IP packet and serve as a router between the wireless terminal and a remaining portion of the access network. The remaining portion of the access network may include an Internet protocol (IP) network. The base station may coordinate attribute management of the air interface. For example, the base station may be a base transceiver station (BTS) in GSM or CDMA, may be a NodeB in WCDMA, or may be an evolved NodeB (NodeB, eNB, or e-NodeB, evolutional NodeB) in LTE, This is not limited in this application.

The embodiments of the present invention relate to a heterogeneous network scenario. A network architecture of the scenario may include a macro base station, at least one micro base station, and at least one UE. There is an X2 interface logical connection between the macro base station and the micro base station. An S1 connection is established between the macro base station and a core network. The micro base station may establish an S1 connection to the core network, or may not establish an S1 connection to the core network. In addition, a connection between the UE and the micro base station related to the embodiments of the present invention is a device-to-device (D2D) connection. That is, in the embodiments of the present invention, no matter whether signaling is transmitted or data is exchanged between the micro base station and the UE, a mode of communication between the micro base station and the UE is a D2D communication mode, and the micro base station and/or the UE may reuse an uplink resource or a downlink resource of the macro base station, thereby improving resource utilization of an entire communications system. For a specific implementation process of the present invention, refer to the following embodiments. In the following embodiments, a first base station is a macro base station, and a second base station is a micro base station. There may be one or more second base stations, and each second base station performs same operations.

FIG. 1 is a schematic flowchart of Embodiment 1 of a resource allocation method according to the present invention. This embodiment relates to a specific process in which a second base station is capable of performing D2D communication with UE, and the second base station sends resource configuration information of a first base station to the UE. As shown in FIG. 1, the method includes the following steps.

S101: The second base station receives resource configuration information of the first base station.

Optionally, the first base station may periodically send the resource configuration information of the first base station to the second base station, or may send the resource configuration information of the first base station to the second base station after detecting that the second base station supports D2D communication, or may send the resource configuration information of the first base station to the second base station in another trigger manner. Therefore, the second base station may periodically receive the resource configuration information of the first base station; or may receive the resource configuration information of the first base station at a time and perform D2D communication in a preset time period by using a resource configured by using the resource configuration information of the first base station, and after the preset time period elapses, release the resource configured by using the resource configuration information of the first base station.

S102: The second base station sends the resource configuration information of the first base station to the UE, where the resource configuration information of the first base station is used to configure a resource for device-to-device (D2D) communication between the UE and the second base station.

Specifically, after receiving the resource configuration information of the first base station sent by the first base station, the second base station may perform parsing processing, decoding processing, or the like on the resource configuration information of the first base station, or may convert the resource configuration information of the first base station into information in a format that can be identified by the UE, and send the information in this format to the UE, so that the UE can determine, according to the resource configuration information, the resource required for D2D communication between the UE and the second base station. It should be noted that in this embodiment, the UE supports D2D communication, and the second base station also supports D2D communication by default. Therefore, a mode of communication between the UE and the second base station is a D2D communication mode.

After receiving the resource configuration information of the first base station, the UE may determine the resource for D2D communication with the second base station according to the resource configuration information of the first base station. Optionally, the resource may be an uplink resource of the first base station, or may be a downlink resource of the first base station. Optionally, the resource configuration information of the first base station may further include a physical resource block parameter. The UE may learn of, according to the physical resource block parameter, a data or signaling format used when the UE performs D2D communication with a core network or another network element device, so as to perform data transmission or signaling interaction with the core network or the another network element device in a D2D communication mode by using the resource configured by using the resource configuration information of the first base station. That is, in this embodiment of the present invention, the uplink resource or the downlink resource of the first base station can be reused by the UE that performs D2D communication with the second base station, thereby improving resource utilization of a communications system.

According to the resource allocation method provided in this embodiment of the present invention, a second base station receives resource configuration information of a first base station, and sends the resource configuration information of the first base station to UE, so that the UE performs D2D communication with the second base station or a core network by using a resource configured by using the resource configuration information of the first base station. Therefore, an uplink resource or a downlink resource of the first base station can be reused by the UE, thereby improving resource utilization of a communications system.

Figure 2:
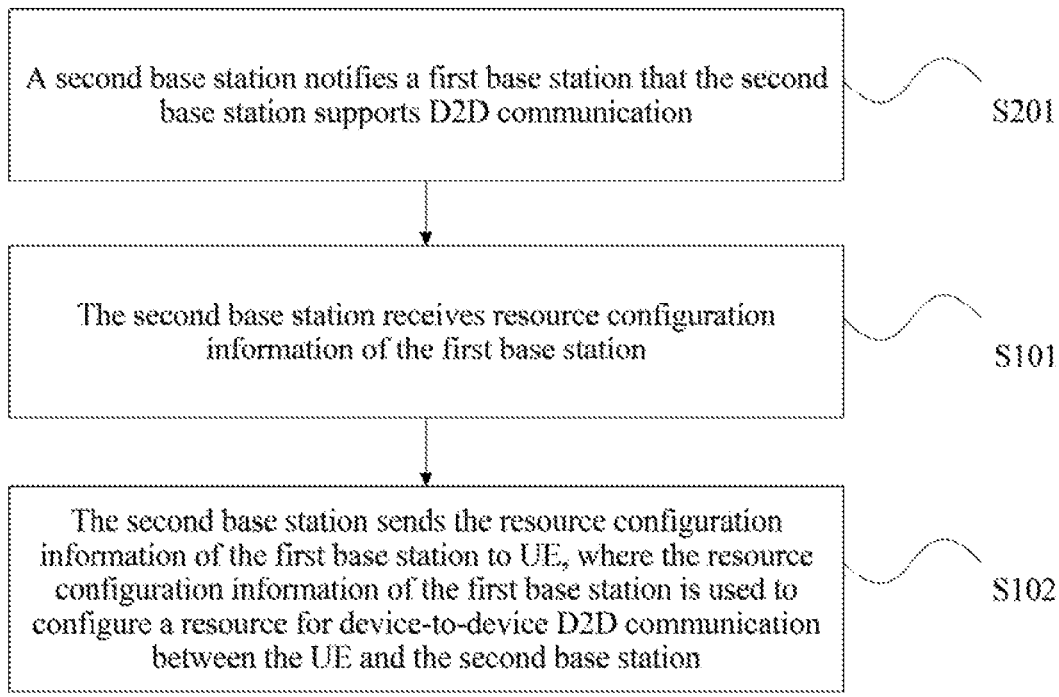
FIG. 2 is a schematic flowchart of Embodiment 2 of a resource allocation method according to the present invention.

Based on the foregoing embodiment shown in FIG. 1. Embodiment 2 of the present invention relates to a specific process in which a first base station learns that a second base station supports D2D communication. As shown in FIG. 2, further, before S101, the method further includes the following steps.

S201: The second base station notifies the first base station that the second base station supports D2D communication.

Specifically, the second base station detects whether the second base station has a D2D communication capability. Optionally, the second base station may detect whether a D2D module is installed on the second base station, to determine whether the second base station has a D2D communication capability. The D2D module may be a physical board, or may be a program supporting D2D communication. That is, during initial deployment of an entire network architecture, a physical board with a D2D communication capability may be deployed on the second base station, or a program supporting a D2D communication capability may be loaded into the second base station.

Optionally, when detecting that the second base station supports D2D communication, the second base station may send indication information to the first base station. After receiving the indication information, the first base station learns that the second base station supports D2D communication. The indication information may be reported to the first base station by using RRC signaling, or may be reported to the first base station by using other signaling. A form of the indication information is not limited in this embodiment of the present invention provided that after receiving the indication information, the first base station learns that the second base station supports D2D communication. Optionally, the second base station may notify an operation, administration and maintenance (OAM) console that the second base station supports a D2D communication capability, or an OAM console actively detects whether the second base station supports D2D communication, so that when the OAM console learns that the second base station supports D2D communication, an operation and management personnel can perform corresponding configuration on the first base station by using the OAM console. Therefore, the first base station learns that the second base station supports D2D communication, and further sends the resource configuration information of the first base station to the second base station.

Optionally, when learning that the second base station supports D2D communication, the first base station may instruct the second base station to communicate with a D2D terminal to establish a D2D cell. In this case, the second base station may be considered as a cellular straight-through terminal with a D2D communication capability, and may communicate with the D2D terminal in a D2D communication mode. Therefore, the first base station may send another piece of indication information to the second base station, and the indication information may carry a resource of the first base station. Optionally, the resource of the first base station may be a time-frequency domain resource range, such as physical resource blocks with indexes 4 to 54 in a frequency domain, and each subframe in a time domain; or all physical resource blocks in a frequency domain, and subframes with subframe indexes 0 to 4 in each subframe in a time domain. After receiving the indication information, the second base station may send the resource configuration information of the first base station to the UE by using the resource of the first base station carried in the indication information. That is, the resource configuration information of the first base station may be directly sent by the first base station to the second base station, or the first base station sends indication information to the second base station, and the second base station sends the resource configuration information of the first base station to the UE according to the indication information.

Optionally, the second base station may send the resource configuration information of the first base station to the UE by using a downlink resource of the second base station, or may send the resource configuration information of the first base station to the UE by using a resource configured by using the resource configuration information of the first base station. It should be noted that, the UE is UE that is determined by the second base station and that meets a preset condition of performing D2D communication with the second base station, and a communication mode used during interaction between the UE and the second base station is a D2D communication mode. Optionally, the preset condition, met by the UE, of performing D2D communication with the second base station may be: received strength of a signal received by the UE meets a preset threshold, or received strength of a signal received by the UE meets a signal to interference plus noise ratio threshold for demodulating a signal by the UE, or a distance between the UE and the second base station meets a particular condition, or the like.

Figure 3:
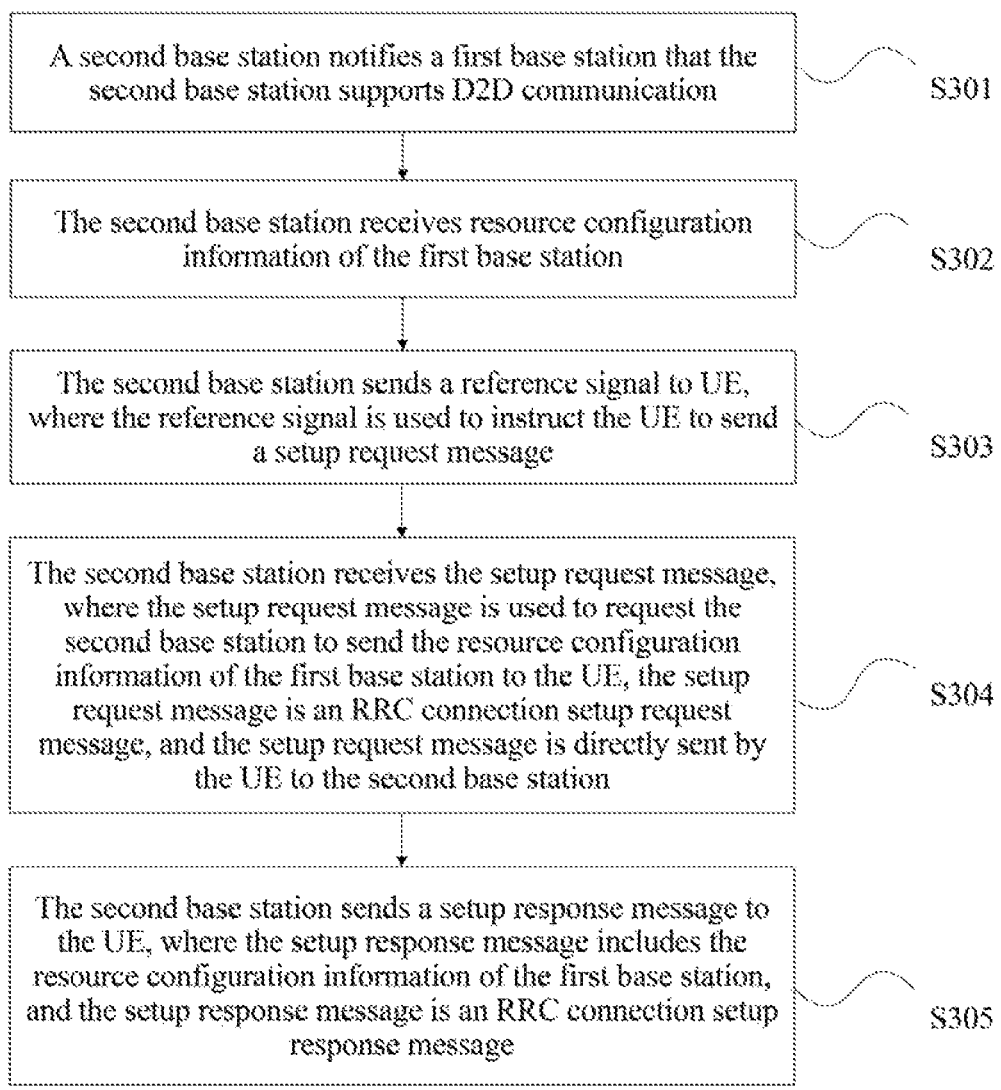
FIG. 3 is a schematic flowchart of Embodiment 3 of a resource allocation method according to the present invention.

FIG. 3 is a schematic flowchart of Embodiment 3 of a resource allocation method according to the present invention. This embodiment relates to a specific process in which a second base station sends resource configuration information of a first base station to UE. This embodiment is applied to a scenario in which an S1 connection is established between the second base station and a core network, and a D2D mode is used for communication between the second base station and the UE. As shown in FIG. 3, the method specifically includes the following steps.

S301: The second base station notifies the first base station that the second base station supports D2D communication.

S302: The second base station receives resource configuration information of the first base station.

Specifically, for S301, refer to an execution process of S201 in Embodiment 2, and for S302, refer to an execution process of S101 in Embodiment 1. Details are not repeatedly described herein.

S303: The second base station sends a reference signal to the UE, where the reference signal is used to instruct the UE to send a setup request message.

Specifically, after receiving the resource configuration information of the first base station, the second base station sends the reference signal to the UE, to instruct the UE to send the setup request message. Optionally, the second base station may send the reference signal by using an uplink resource of the second base station, or may send the reference signal by using a resource configured by using the resource configuration information of the first base station. The resource configured by using the resource configuration information of the first base station includes an uplink resource of the first base station and/or a downlink resource of the first base station. Optionally, after receiving the resource configuration information of the first base station, the second base station may further send an acknowledgement to the first base station, to notify the first base station that the second base station has successfully received the resource configuration information of the first base station. Optionally, the reference signal may be carried in a broadcast message to be sent to the UE in a broadcast manner.

S304: The second base station receives the setup request message, where the setup request message is used to request the second base station to send the resource configuration information of the first base station to the UE, the setup request message is an RRC connection setup request message, and the setup request message is directly sent by the UE to the second base station.

Specifically, the first base station adds, to a first message, information indicating that the second base station supports D2D communication, and broadcasts the first message. After receiving the first message, the UE learns that the second base station supports D2D communication. Then, the UE receives and measures signal received strength of the reference signal sent by the second base station, and determines whether the signal received strength of the reference signal meets a preset condition of performing D2D communication with the second base station. Optionally, the preset condition may be: received strength of a signal received by the UE meets a preset threshold, or received strength of a signal received by the UE meets a signal to interference plus noise ratio threshold for demodulating a signal by the UE, or a distance between the UE and the second base station meets a particular condition, or the like.

When the UE determines that the signal received strength of the reference signal meets the preset condition, the UE determines that the UE supports D2D communication with the second base station. Therefore, when the UE needs to perform service interaction with the second base station, the UE sends the setup request message to the second base station. The setup request message is used to request the second base station to send the resource configuration information of the first base station to the UE. In this embodiment, the setup request message may be an RRC connection setup request message. It should be noted that, the UE is actually a D2D terminal in this case.

S305: The second base station sends a setup response message to the UE, where the setup response message includes the resource configuration information of the first base station, and the setup response message is an RRC connection setup response message.

Specifically, that the UE sends the setup request message (that is, the RRC connection setup request message) to the second base station actually means that the UE initiates an RRC connection to the second base station. Specifically, the UE sends a preamble is the second base station, and the second base station sends a random access channel response (Random Access Channel Response, hereinafter referred to as RAR) message to the UE after receiving the preamble. Then, the UE sends the RRC connection setup request message to the second base station, and the second base station determines, according to the RRC connection setup request message, that the UE supports D2D communication with the second base station. Therefore, the second base station sends the setup response message to the UE. The setup response message is an RRC connection setup response message, and the RRC connection setup response message includes the resource configuration information of the first base station. Optionally, the second base station may establish an RRC connection to the UE by using a downlink resource of the second base station, or may establish an RRC connection to the UE by using the resource configured by using the resource configuration information of the first base station.

Further, when the second base station establishes the RRC connection to the UE, the second base station further establishes an S1 connection to a core network, so that the UE performs, by using the resource configured by using the resource configuration information of the first base station, data interaction with the core network by using the second base station.

Figure 4:
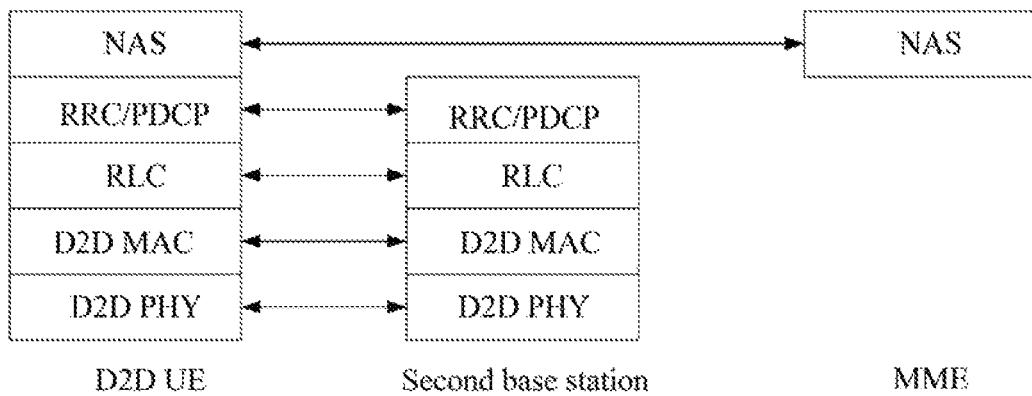
FIG. 4 is a schematic diagram of a protocol stack according to the present invention.

It should be noted that, no matter whether the UE establishes an RRC connection to the second base station or the UE performs data interaction with the core network by using the second base station, a protocol stack shown in FIG. 4 can be used in a process in which the UE performs D2D communication with the second base station.

According to the resource allocation method provided in this embodiment of the present invention, after notifying a first base station that a second base station supports D2D communication, the second base station receives resource configuration information of the first base station, and establishes an RRC connection to UE. In a process of establishing the RRC connection, the second base station adds the resource configuration information of the first base station to an RRC connection setup response message, and sends the RRC connection setup response message to the UE, so that the UE communicates with a network element device by using a resource configured by using the resource configuration information of the first base station. According to the method provided in this embodiment of the present invention, the second base station configures a resource of the first base station for the UE that performs D2D communication with the second base station, so that the resource of the first base station can be reused by the UE and the second base station, thereby improving resource utilization of a communications system.

Figure 5:
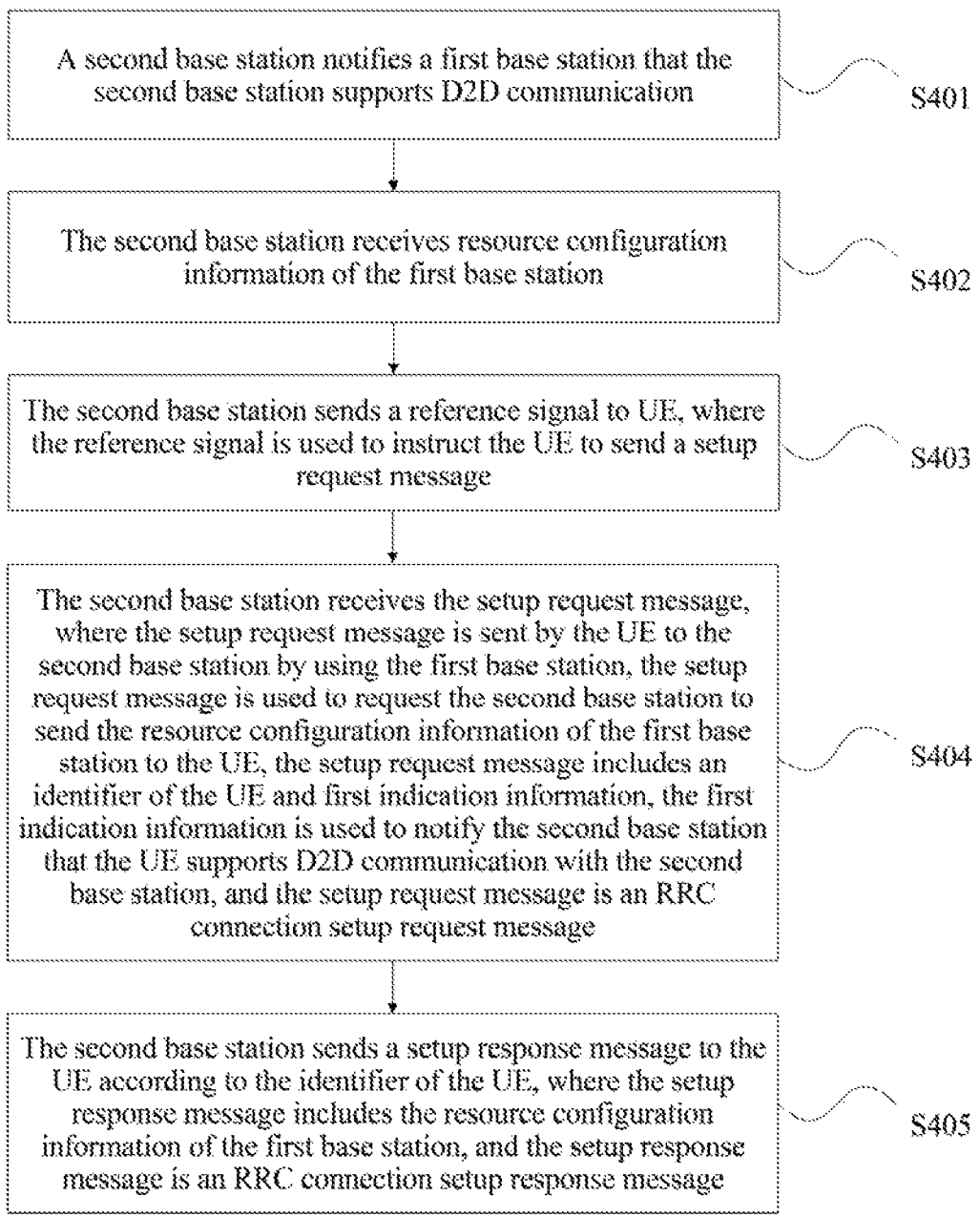
FIG. 5 is a schematic flowchart of Embodiment 4 of a resource allocation method according to the present invention.

FIG. 5 is a schematic flowchart of Embodiment 4 of a resource allocation method according to the present invention. This embodiment relates to another specific process in which a second base station sends resource configuration information of a first base station to UE. This embodiment is applied to a scenario in which an S1 connection is established between the second base station and a core network, and a D2D mode is used for communication between the second base station and the UE. As shown in FIG. 5, the method specifically includes the following steps.

S401: The second base station notifies the first base station that the second base station supports D2D communication.

S402: The second base station receives resource configuration information of the first base station.

Specifically, for S401, refer to an execution process of S201 in Embodiment 2, and for S402, refer to an execution process of S101 in Embodiment 1. Details are not repeatedly described herein.

S403: The second base station sends a reference signal to the UE, where the reference signal is used to instruct the UE to send a setup request message.

Specifically, after receiving the resource configuration information of the first base station, the second base station sends the reference signal to the UE, to instruct the UE to send the setup request message. Optionally, the second base station may send the reference signal by using an uplink resource of the second base station, or may send the reference signal by using a resource configured by using the resource configuration information of the first base station. The resource configured by using the resource configuration information of the first base station includes an uplink resource of the first base station and/or a downlink resource of the first base station. Optionally, after receiving the resource configuration information of the first base station, the second base station may further send an acknowledgement to the first base station, to notify the first base station that the second base station has successfully received the resource configuration information of the first base station. Optionally, the reference signal may be carried in a broadcast message to be sent to the UE in a broadcast manner.

S404: The second base station receives the setup request message, where the setup request message is sent by the UE to the second base station by using the first base station, the setup request message is used to request the second base station to send the resource configuration information of the first base station to the UE, the setup request message includes an identifier of the UE and first indication information, the first indication information is used to notify the second base station that the UE supports D2D communication with the second base station, and the setup request message is an RRC connection setup request message.

Specifically, the first base station adds, to a first message, information indicating that the second base station supports D2D communication, and broadcasts the first message. After receiving the first message, the UE learns that the second base station supports D2D communication. Then, the UE receives and measures signal received strength of the reference signal sent by the second base station, and determines whether the signal received strength of the reference signal meets a preset condition of performing D2D communication with the second base station. Optionally, the preset condition may be: received strength of a signal received by the UE meets a preset threshold, or received strength of a signal received by the UE meets a signal to interference plus noise ratio threshold for demodulating a signal by the UE, or a distance between the UE and the second base station meets a particular condition, or the like. When the UE determines that the signal received strength of the reference signal received by the UE meets the preset condition, the UE determines that the UE supports D2D communication with the second base station. It should be noted that, the UE is actually a D2D terminal in this case.

A difference between this embodiment and Embodiment 2 lies in that when the UE determines that the UE can perform D2D communication with the second base station, the UE sends the setup request message to the first base station in this case, and then the first base station sends the setup request message to the second base station. In this embodiment, the setup request message is an RRC connection setup request message. That is, in this embodiment, the UE initiates an RRC connection setup request to the first base station. Specifically, the UE sends a preamble to the first base station, and the first base station sends an RAR message to the UE after receiving the preamble. Then, the UE sends the RRC connection setup request message to the first base station, and adds the identifier of the UE and the first indication information to the RRC connection setup request message, so that the first base station learns that the UE meets the preset condition of performing D2D communication with the second base station. Therefore, the first base station sends the received RRC connection setup request message to the second base station, so that the second base station learns, according to the first indication information and the identifier of the UE, that the UE supports D2D communication with the second base station.

S405: The second base station sends a setup response message to the UE according to the identifier of the UE, where the setup response message includes the resource configuration information of the first base station, and the setup response message is an RRC connection setup response message.

Specifically, after receiving the RRC connection setup request message that is sent by the first base station and that carries the identifier of the UE and the first indication information, the second base station adds the obtained resource configuration information of the first base station to the RRC connection setup response message, and sends the RRC connection setup response message to the UE. Optionally, the second base station may send the RRC connection setup response message to the UE by using a downlink resource of the second base station, or may send the RRC connection setup response message to the UE by using a resource of the first base station.

Further, when the second base station sends the RRC connection setup response message to the UE, the second base station further establishes an S1 connection to a core network, so that the UE can perform, by using the resource of the first base station, data interaction with the core network by using the second base station.

It should be noted that, no matter whether the second base station sends the RRC connection setup response message to the UE or the UE performs data interaction with the core network by using the second base station, a protocol stack shown in FIG. 4 can be used in a process in which the UE performs D2D communication with the second base station.

According to the resource allocation method provided in this embodiment of the present invention, a second base station sends first indication information to a first base station, so that the first base station sends resource configuration information of the first base station to the second base station after learning that the second base station supports D2D communication. After learning, by using an RRC connection setup request message that is sent by the first base station and that carries an identifier of UE and the first indication information, that the UE supports D2D communication with the second base station, the second base station sends the resource configuration information of the first base station to the UE according to the identifier of the UE, so that the UE communicates with a network element device by using a resource configured by using the resource configuration information of the first base station. According to the method provided in this embodiment of the present invention, the second base station configures a resource of the first base station for the UE that performs D2D communication with the second base station, so that an uplink resource of the first base station can be reused by the UE and the second base station, thereby improving resource utilization of a communications system.

Figure 6:
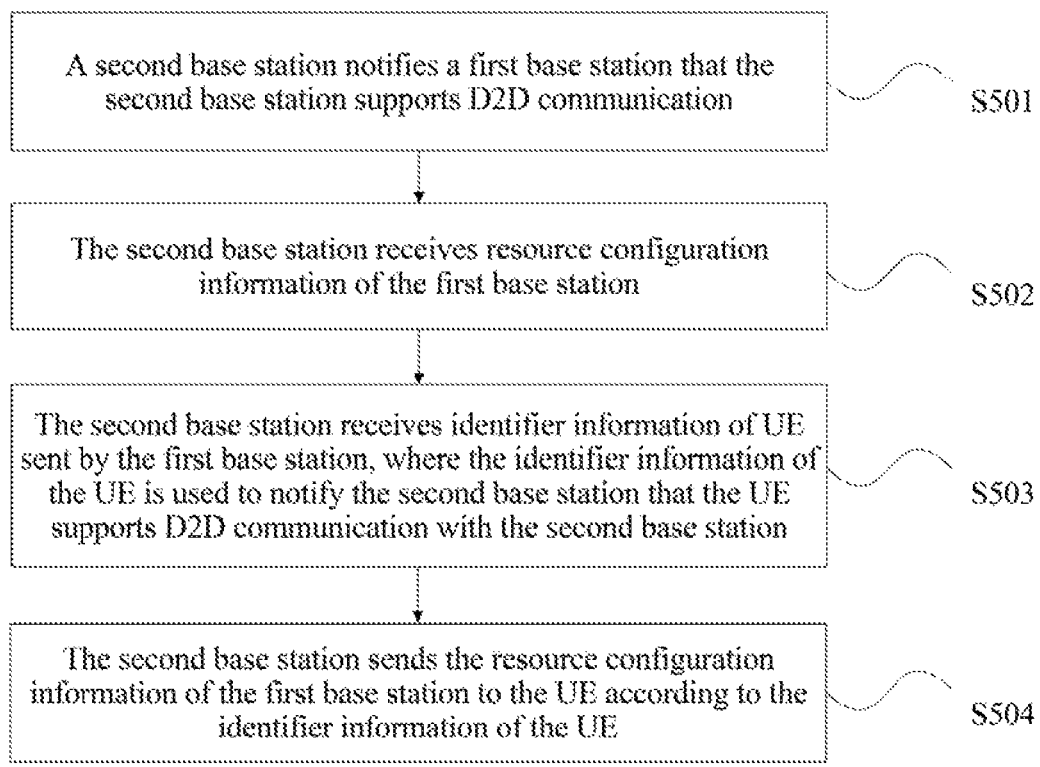
FIG. 6 is a schematic flowchart of Embodiment 5 of a resource allocation method according to the present invention.

FIG. 6 is a schematic flowchart of Embodiment 5 of a resource allocation method according to the present invention. This embodiment relates to another specific process in which a second base station sends resource configuration information of a first base station to UE. This embodiment is applied to a scenario in which an S1 connection is established between the second base station and a core network, and a D2D mode is used for communication between the second base station and the UE. As shown in FIG. 6, the method specifically includes the following steps.

S501: The second base station notifies the first base station that the second base station supports D2D communication.

S502: The second base station receives resource configuration information of the first base station.

Specifically, for S501 refer to an execution process of S201 in Embodiment 2, and for S502, refer to an execution process of S101 in Embodiment 1. Details are not repeatedly described herein.

S503. The second base station receives identifier information of the HE sent by the first base station, where the identifier information of the UE is used to notify the second base station that the UE supports D2D communication with the second base station.

Specifically, after receiving the resource configuration information of the first base station, the second base station may send a reference signal. Optionally, the reference signal may be carried in a broadcast message to be sent in a broadcast manner. Optionally, the second base station may broadcast the reference signal by using an uplink resource of the second base station, or may send the reference signal by using a resource configured by using the resource configuration information of the first base station. Optionally, after receiving the resource configuration information of the first base station, the second base station may further send an acknowledgement to the first base station, to notify the first base station that the second base station has successfully received the resource configuration information of the first base station.

Further, the first base station adds, to a first message, information indicating that the second base station supports D2D communication, broadcasts the first message, and instructs, by using the first message, the UE not to actively receive the reference signal sent by the second base station. Therefore, after the UE, receives the first message broadcasted by the first, base station, the UE initiates a cellular connection establishment process to the first base station. For a specific establishment process, refer to the prior art. Details are not described herein. Then, the first base station sends a measurement instruction to the UE, to instruct the UE to measure signal received strength of the reference signal sent by the second base station. After measuring the signal received strength of the reference signal sent by the second base station, the UE sends the signal received strength of the reference signal to the first base station, so that the first, base station determines, according to the signal received strength of the reference signal, whether the UE meets a preset condition of performing D2D communication with the second base station.

When the first base station determines, according to the signal received strength of the reference signal, that the UE meets the preset condition of performing D2D communication with the second base station, the first base station sends identifier information of the UE to the second base station, so that the second base station determines, according to the identifier information of the UE, that the UE supports D2D communication with the second base station. In addition, the first base station further adds a first identifier to second indication information, and sends the second indication information to the UE, so that the UE learns that the UE currently is supposed to perform D2D communication with the second base station corresponding to the first identifier (there may be multiple second base stations in an actual scenario, the first base station determines that the UE meets a preset condition of performing D2D communication with the multiple second base stations, and the first base station controls the UE to currently perform D2D communication with a specific base station or several specific base stations, and therefore, the first base station notifies the UE of an identifier of a second base station that currently is to perform D2D communication with the UE).

S504: The second base station sends the resource configuration information of the first base station to the UE according to the identifier information of the UE.

Specifically, after the second base station determines, according to the identifier information of the UE, that the UE supports D2D communication with the second base station, the second base station sends the resource configuration information of the first base station to the UE. Optionally, the second base station may send the resource configuration information of the first base station to the UE by using a downlink resource of the second base station, or may send the resource configuration information of the first base station to the UE by using a resource of the first base station.

Optionally, the second base station may forward the resource configuration information of the first base station to the UE by using the first base station.

Optionally, after receiving the second indication information sent by the first base station, the UE initiates an RRC connection to the second base station corresponding to the first identifier carried in the second indication information. That is, the UE sends an RRC connection setup request message to the second base station corresponding to the first identifier. Because the second base station has learned, according to the identifier information of the UE, that the UE supports D2D communication with the second base station, the second base station receives the RRC connection setup request message sent by the UE, adds the resource configuration information of the first base station to an RRC connection setup response message, and sends the RRC connection setup response message to the UE.

According to the resource allocation method provided in this embodiment of the present invention, a second base station sends first indication information to a first base station, so that after learning that the second base station supports D2D communication, the first base station sends resource configuration information of the first base station to the second base station. After determining, by using identifier information of UE sent by the first base station, that the UE supports D2D communication with the second base station, the second base station sends the resource configuration information of the first base station to the UE according to the identifier information of the UE, so that the UE communicates with a network element device by using a resource configured by using the resource configuration information of the first base station. According to the method provided in this embodiment of the present invention, the second base station configures a resource of the first base station for the UE that performs D2D communication with the second base station, so that the resource of the first base station can be reused by the UE and the second base station, thereby improving resource utilization of a communications system.

Figure 7:
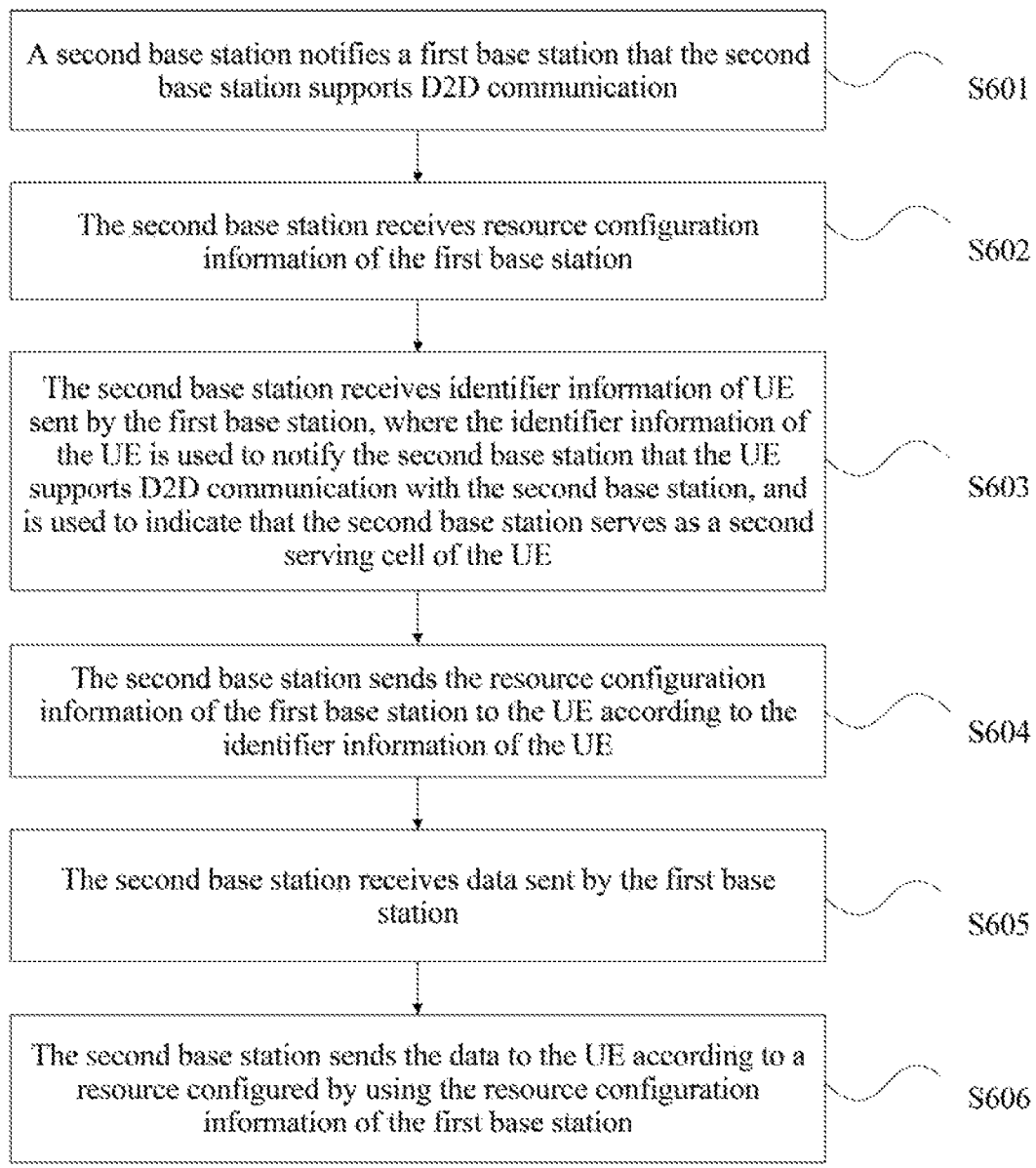
FIG. 7 is a schematic flowchart of Embodiment 6 of a resource allocation method according to the present invention.

FIG. 7 is a schematic flowchart of Embodiment 6 of a resource allocation method according to the present invention. This embodiment relates to another specific process in which a second base station serves as a second serving cell of UE, and the second base station sends resource configuration information of a first base station to the UE. This embodiment is applied to a master-slave eNB aggregation (MSA) scenario in which the first base station obtains data from a core network, then directly sends a part of the data to the UE, and sends the other part of the data to the UE by using the second base station, and a mode of communication between the second base station and the UE is a D2D communication mode. As shown in FIG. 7, the method includes the following steps.

S601: The second base station notifies the first base station that the second base station supports D2D communication.

S602: The second base station receives resource configuration information of the first base station.

Specifically, for S601, refer to an execution process of S201 in Embodiment 2, and for S602, refer to an execution process of S101 in Embodiment 1. Details are not repeatedly described herein.

S603: The second base station receives identifier information of the UE sent by the first base station, where the identifier information of the UE is used to notify the second base station that the UE supports D2D communication with the second base station, and is used to indicate that the second base station serves as a second serving cell of the UE.

Specifically, after receiving the resource configuration information of the first base station, the second base station may send a reference signal. Optionally, the reference signal may be carried in a broadcast message to be sent in a broadcast manner. Optionally, the second base station may broadcast the reference signal by using an uplink resource of the second base station, or may send the reference signal by using a resource configured by using the resource configuration information of the first base station. Optionally, after receiving the resource configuration information of the first base station, the second base station may further send an acknowledgement to the first base station, to notify the first base station that the second base station has successfully received the resource configuration information of the first base station.

Further, the first base station adds, to a first message, information indicating that the second base station supports D2D communication, broadcasts the first message, and instructs, by using the first message, the UE not to actively receive the reference signal sent by the second base station. Therefore, after the UE receives the first message broadcasted by the first base station, the UE initiates a cellular connection establishment process to the first base station. For a specific establishment process, refer to the prior art. Details are not described herein. Then, the first base station sends a measurement instruction to the UE, to instruct the UE to measure signal received strength of the reference signal sent by the second base station. After measuring the signal received strength of the reference signal sent by the second base station, the UE sends the signal received strength of the reference signal to the first base station, so that the first base station determines, according to the signal received strength of the reference signal, whether the UE meets a preset, condition of performing D2D communication with the second base station.

When the first base station determines, according to the signal received strength of the reference signal, that the UE meets the preset condition of performing D2D communication with the second base station, the first base station sends the identifier information of the UE to the second base station. Therefore, the second base station determines, according to the identifier information of the UE, that the UE can perform D2D communication with the second base station, and the second base station further learns, according to the identifier information of the UE, that the second base station serves the UE as the second serving cell of the UE in this case (the first base station serves the UE as a first serving cell of the UE). That is, the second base station notifies the UE how to perform sorting or combination processing on received data sent by the second base station and received data sent by the first base station, or notifies the UE of information such as an order of sending data by the second base station, so that the UE can son and combine a received part of data sent by the first base station and the other received part of data sent by the second base station, to obtain complete data.

In addition, the first base station further adds a first identifier to second indication information, and sends the second indication information to the UE, so that the UE learns that the UE currently is supposed to perform D2D communication with the second base station corresponding to the first identifier (there may be multiple second base stations in an actual scenario, the first base station determines that the UE meets a preset condition of performing D2D communication with the multiple second base stations, and the first base station controls the UE to currently perform D2D communication with a specific base station or several specific base stations, and therefore, the first base station notifies the UE of an identifier of a second base station that currently is to perform D2D communication with the UE).

S604: The second base station sends the resource configuration information of the first base station to the UE according to the identifier information of the UE.

For details, refer to S504 in Embodiment 5. Details are not repeatedly described herein.

S605: The second base station receives data sent by the first base station.

Specifically, the data may be service information, signaling, a message, or other data.

S606: The second base station sends the data to the UE according to a resource configured by using the resource configuration information of the first base station.

It should be noted that, because the second base station already serves the UE as the second serving cell of the UE, after receiving the data that is sent by the second base station by using the resource configured by using the resource configuration information of the first base station, the UE may learn, by using the second base station, how to perform sorting or combination processing on the received data sent by the second base station and the received data sent by the first base station, so as to obtain complete data. The resource configured by using the resource configuration information of the first base station may be an uplink resource of the first base station, or may be a downlink resource of the first base station. In addition, resources of the first base station that are mentioned in all the foregoing embodiments refer to the resource configured by using the resource configuration information of the first base station.

Optionally, when receiving the data sent by the second base station, the UE sends an acknowledgement feedback to the second base station. The acknowledgement feedback may be sent in the following several manners:

Manner 1: No matter whether there is a physical connection between the second base station and a tore network, the UE uses only a D2D link between the UE and the second base station to send the acknowledgement feedback to the second base station; the second base station transmits the acknowledgement feedback to the first base station, and then the first base station sends the acknowledgement feedback to the core network.

Manner 2: When there is a physical connection between the second base station and a core network, the UE uses only a D2D link to transmit the acknowledgement feedback to the second base station, and then the second base station transmits the acknowledgement feedback to the core network.

Manner 3: The UE uses only a cellular link, that is, the UE transmits the acknowledgement feedback to the first base station, and then the first base station transmits the acknowledgement feedback to a core network.

Manner 4: The UE uses both the third transmission manner and the first transmission manner, and the first base station uploads the acknowledgement feedback to a core network.

It should be noted that, a resource that is of the first base station and that is used when the second base station sends the data to the UE is different from a resource that is of the first base station and that is used when the UE sends the acknowledgement feedback to the second base station by using the D2D link. That is, the UE may learn, by using content in the resource configuration information of the first base station, a range or a frequency of the resource that is of the first base station and that is used by the second base station, and a range or a frequency of the resource that is of the first base station, that is used when the UE sends the acknowledgement feedback, and that is different from that used by the second base station, so as to avoid a resource conflict.

According to the resource allocation method provided in this embodiment of the present invention, a second base station sends first indication information to a first base station, so that the first base station sends resource configuration information of the first base station to the second base station after learning that the second base station supports D2D communication. After determining, by using identifier information of UE sent by the first base station, that the UE supports D2D communication with the second base station, the second base station sends the resource configuration information of the first base station to the UE according to the identifier information of the UE, so that the UE communicates with a network element device by using a resource configured by using the resource configuration information of the first base station. According to the method provided in this embodiment of the present invention, the second base station configures a resource of the first base station for the UE that performs D2D communication with the second base station, so that the resource of the first base station can be reused by the UE and the second base station, thereby improving resource utilization of a communications system.

Embodiment 7 of the present invention provides a resource allocation method. This embodiment rotates to a specific process in which a first base station sends resource configuration information of the first base station to a second base station, so that the second base station allocates a resource of the first base station to UE. The method includes:

sending, by the first base station, the resource configuration information of the first base station to the second base station, where the resource configuration information of the first base station is used to configure a resource for device-to-device (D2D) communication between the user equipment (UE) and the second base station.

Specifically, the first base station may periodically send the resource configuration information of the first base station to the second base station, or may send the resource configuration information of the first base station to the second base Station after detecting that the second base station supports D2D communication, or may send the resource configuration information of the first base station to the second base station in another trigger manner. Therefore, the second base station may periodically receive the resource configuration information of the first base station; or may receive the resource configuration information of the first base station at a time and perform D2D communication in a preset time period by using the resource configured by using the resource configuration information of the first base station, and after the preset time period elapses, release the resource configured by using the resource configuration information of the first base station.

After receiving the resource configuration information of the first base station sent by the first base station, the second base station may forward the resource, configuration information of the first base station to the UE, so that the UE can determine the resource for D2D communication with the second base station according to the resource configuration information of the first base station, or may perform data transmission or signaling interaction with a core network or another network element device in a D2D communication mode by using the resource configured by using the resource configuration information of the first base station. That is, in this embodiment of the present invention, an uplink resource or a downlink resource of the first base station can be reused by the UE that performs D2D communication with the second base station, thereby improving resource utilization of a communications system.

According to the resource allocation method provided in this embodiment of the present invention, a first base station sends resource configuration information of the first base station to a second base station, and the second base station sends the resource configuration information of the first base station to UE, so that the UE performs D2D communication with the second base station or a core network by using a resource configured by using the resource configuration information of the first base station. Therefore, an uplink resource or a downlink resource of the first base station can be reused by the UE thereby improving resource utilization of a communications system.

Figure 8:
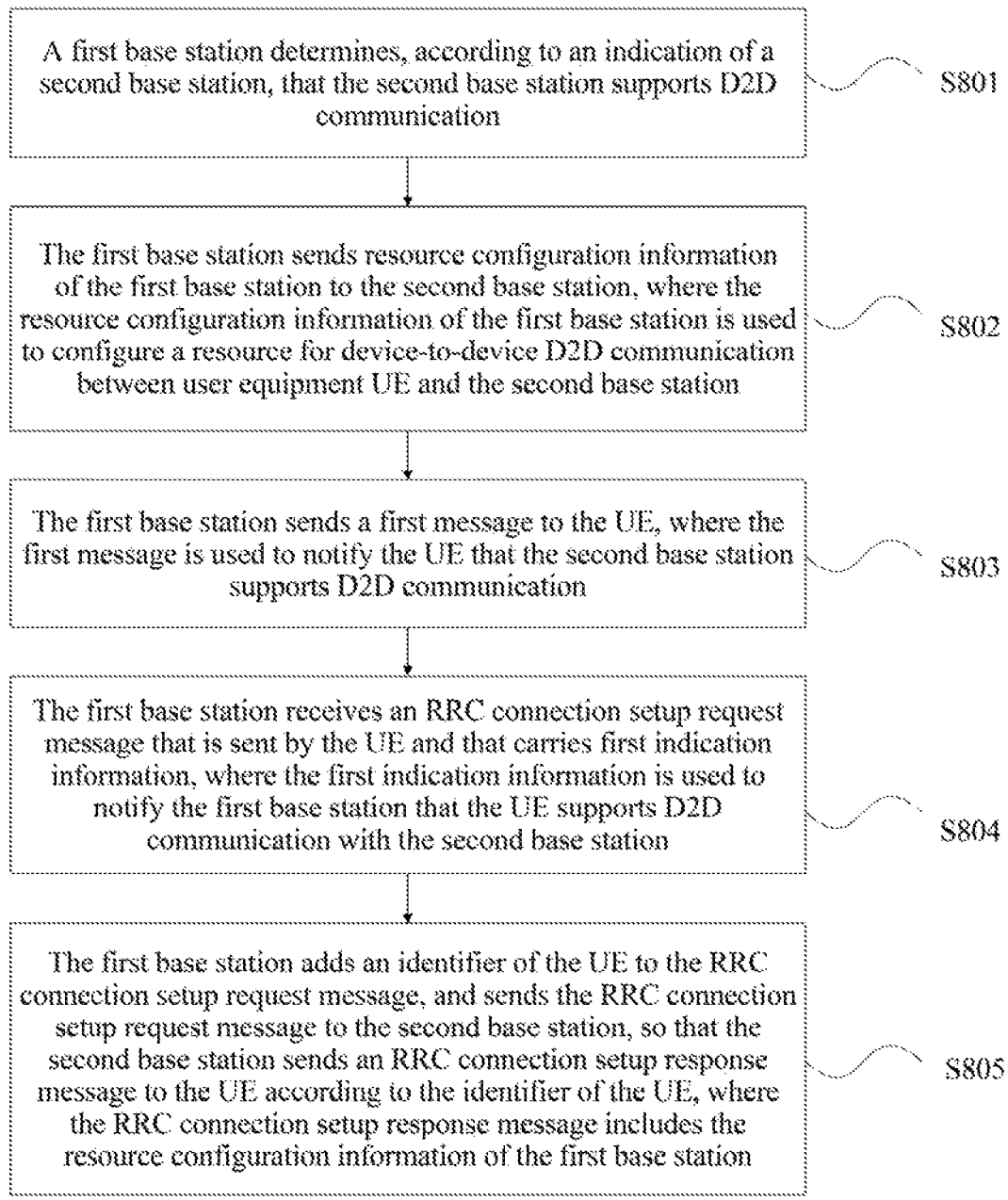
FIG. 8 is a schematic flowchart of Embodiment 8 of a resource allocation method according to the present invention.

FIG. 8 is a schematic flowchart of Embodiment 8 of a resource allocation method according to the present invention. This embodiment relates to a specific process in which after a first base station learns that a second base station supports D2D communication, the first base station sends resource configuration information of the first base station to the second base station. This embodiment is applied to a scenario in which an S1 connection is established between the second base station and a core network, and a D2D mode is used for communication between the second base station and UE. As shown in FIG. 8, the method includes the following steps.

S801: The First base station determines, according to an indication of the second base station, that the second base station supports D2D communication.

Specifically, the second base station detects whether the second base station has a D2D communication capability. Optionally, the second base station may detect whether a D2D module is installed on the second base station, to determine whether the second base station has a D2D communication capability. The D2D module may be a physical board, or may be a program supporting D2D communication. That is, during initial deployment of an entire network architecture, a physical board with a D2D communication capability may be deployed on the second base station, or a program supporting a D2D communication capability may be loaded into the second base station. Optionally, when detecting that the second base station supports D2D communication, the second base station may send indication information to the first base station. After receiving the indication information, the first base station learns that the second base station supports D2D communication. The indication information may be reported to the first base station by using RRC signaling, or may be reported to the first base station by using other signaling. A form of the indication information is not limited in this embodiment of the present invention provided that after receiving the indication information, the first base station learns that the second base station supports D2D communication. Optionally, the second base station may notify an OAM console that the second base station supports a D2D communication capability, or an OAM console actively detects whether the second base station supports D2D communication, so that when the OAM console learns that the second base station supports D2D communication, an operation and management personnel can perform corresponding configuration on the first base station by using the OAM console. Therefore, the first base station learns that the second base station supports D2D communication, and further sends resource configuration information of the first base station to the second base station.

S802: The first base station sends resource configuration information of the first base station to the second base station, where the resource configuration information of the first base station is used to configure a resource for device-to-device (D2D) communication between the user equipment (UE) and the second base station.

Specifically, for this step, refer to an execution process of Embodiment 7. Details are not repeatedly described herein.

S803: The first base station sends a first message to the UE, where the first message is used to notify the UE that the second base station supports D2D communication.

Specifically, after receiving the resource configuration information of the first base station, the second base station sends a reference signal to the UE, to instruct the UE to send a setup request message. Optionally the second base station may send the reference signal by using an uplink resource of the second base station, or may send the broadcasted reference signal by using the resource configured by using the resource configuration information of the first base station. The resource configured by using the resource configuration information of the first base station includes an uplink resource of the first base station and/or a downlink, resource of the first base station. Optionally, after receiving the resource configuration information of the first base station, the second base station may further send an acknowledgement to the first base station, to notify the first base station that the second base station has successfully received the resource configuration information of the first base station. Optionally, the reference signal may be carried in a broadcast message to be sent to the UE in a broadcast manner.

Further, the first base station adds, to the first message, information indicating that the second base station supports D2D communication, and broadcasts the first message. After receiving the first message, the UE learns that the second base station supports D2D communication. Then, the UE receives and measures signal received strength of the reference signal sent by the second base station, and determines whether the signal received strength of the reference signal meets a preset condition of performing D2D communication with the second base station. Optionally, the preset condition may be: received strength of a signal received by the UE meets a preset threshold, or received strength of a signal received by the UE meets a signal to interference plus noise ratio threshold for demodulating a signal by the UE, or a distance between the UE and the second base station meets a particular condition, or the like.

When the UE determines that the signal received strength of the reference signal received by the UE meets the preset condition, the UE determines that the UE supports D2D communication with the second base station. It should be noted that, the UE is actually a D2D terminal in this case.

S804: The first base station receives an RRC connection setup request message that is sent by the UE and that carries first indication information, where the first indication information is used to notify the first base station that the UE supports D2D communication with the second base station.

Specifically, when the UE determines that the UE can perform D2D communication with the second base station, the UE initiates establishment of an RRC connection to the first base station. Specifically, the UE sends a preamble to the first base station, and the first base station sends an RAR message to the UE after receiving the preamble. Then, the UE sends the RRC connection setup request message to the first base station, and adds the first indication information to the RRC connection setup request message, so that the first base station learns, by using the first indication information, that the UE meets the preset condition of performing D2D communication with the second base station.

S805: The first base station adds an identifier of the UE to the RRC connection setup request message, and sends the RRC connection setup request message to the second base station, so that the second base station sends an RRC connection setup response message to the UE according to the identifier of the UE, where the RRC connection setup response message includes the resource configuration information of the first base station.

Specifically, after learning, according to the RRC connection request message, that the UE meets the preset condition of performing D2D communication wifi) (the second base station, the first base station adds the identifier of the UE to the RRC connection setup request message, and sends the RRC connection setup request message to the second base station (the RRC connection setup request message carries the identifier of the UE and the first indication information in this case). The second base station receives the RRC connection setup request message, and learns that the UE corresponding to the identifier of the UE supports D2D communication with the second base station. Therefore, the second base station sends the RRC connection setup response message to the UE. The RRC connection setup response message includes the resource configuration information of the first base station. Optionally, the second base station may send the RRC connection setup response message to the UE by using a downlink resource of the second base station, or may send the RRC connection setup response message to the UE by using the resource configured by using the resource configuration information of the first base station.

Further, when the second base station sends the RRC connection setup response message to the UE, the second base station further simultaneously establishes an S1 connection to a core network, so that the UE can perform, by using the resource configured by using the resource configuration information of the first base station, data interaction with the core network by using the second base station.

It should be noted that, no matter whether the second base station sends the RRC connection setup response message to the UE or the UE performs data interaction with the core network by using the second base station, a protocol stack shown in FIG. 4 can be used in a process in which the UE performs D2D communication with the second base station.

According to the resource allocation method provided in this embodiment of the present invention, after determining, according to an indication of a second base station, that the second base station supports D2D communication, a first base station sends resource configuration information of the first base station to the second base station, and broadcasts, to UE, a first message indicating that the second base station supports D2D communication, so that the UE establishes an RRC connection to the first base station after determining, according to measured signal received strength of a reference signal sent by the second base station, that the UE supports D2D communication with the second base station. Therefore, the first base station sends, to the second base station, an RRC connection setup request that carries an identifier of the UE and first indication information, and further, the second base station sends the resource configuration information of the first base station to the UE. According to the method provided in this embodiment of the present invention, the second base station configures a resource of the first base station for the UE that performs D2D communication with the second base station, so that the resource of the first base station can be reused by the UE and the second base station, thereby improving resource utilization of a communications system.

Figure 9:
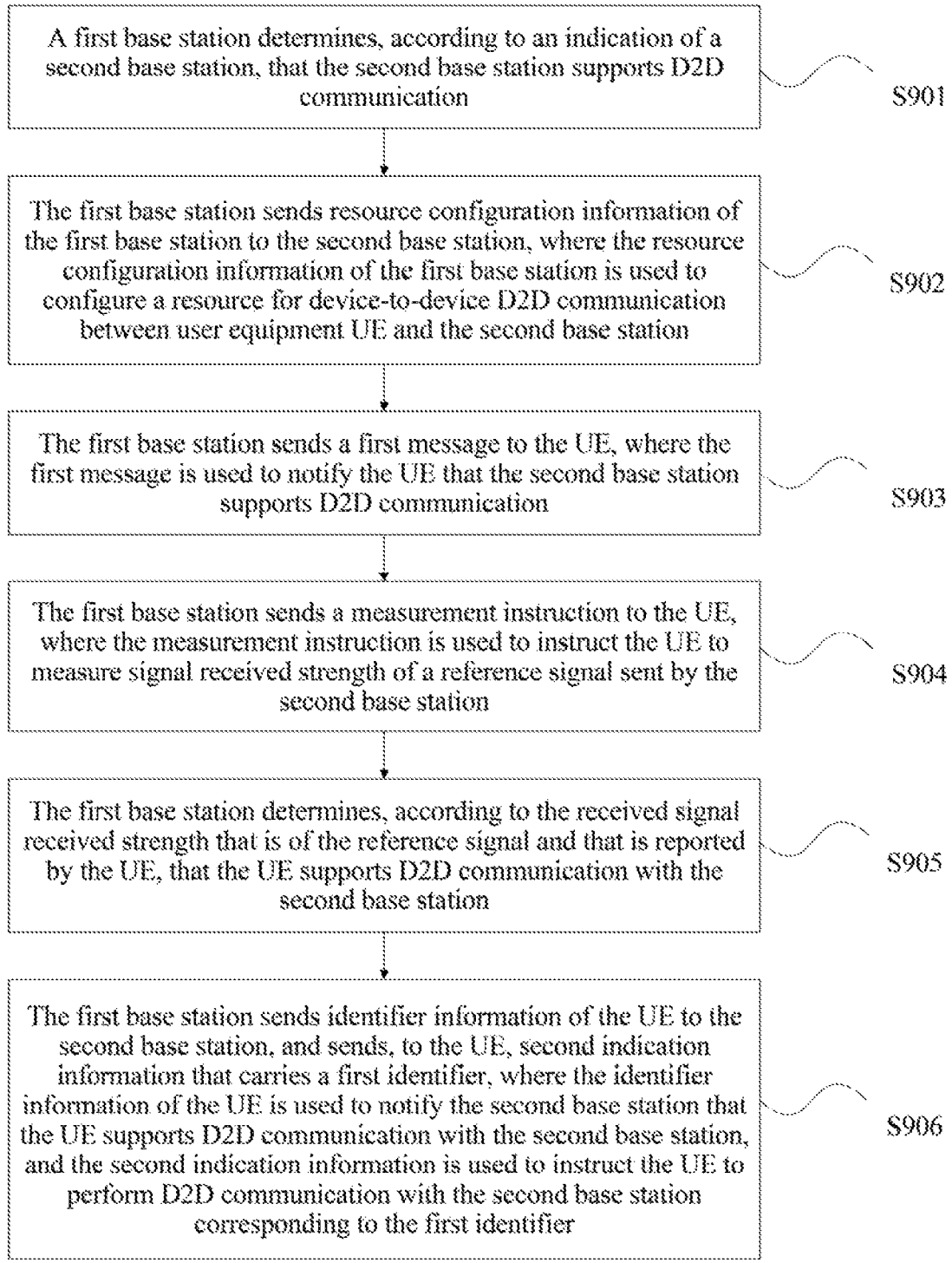
FIG. 9 is a schematic flowchart of Embodiment 9 of a resource allocation method according to the present invention.

FIG. 9 is a schematic flowchart of Embodiment 9 of a resource allocation method according to the present invention. This embodiment relates to another specific process in which after a first base station learns that a second base station supports D2D communication, the first base station sends resource configuration information of the first base station to the second base station. This embodiment is applied to a scenario in which an S1 connection is established between the second base station and a core network, and a D2D mode is used for communication between the second base station and UE. As shown in FIG. 9, the method includes the following steps.

S901: The first base station determines, according to an indication of the second base station, that the second base station supports D2D communication.

S902: The first base station sends resource configuration information of the first base station to the second base station, where the resource configuration information of the first base station is used to configure a resource for device-to-device (D2D) communication between the user equipment (UE) and the second base station.

Specifically, for a specific execution process of S901, refer to specific content of S801 in Embodiment 8, and for a specific execution process of S902, refer to an execution process of Embodiment 7. Details are not repeatedly described herein.

S903: The first base station sends a first message to the UE, where the first message is used to notify the UE that the second base station supports D2D communication.

Specifically, after receiving the resource configuration information of the first base station, the second base station sends a reference signal to the UE, to instruct the UE to send a setup request message. Optionally, the second base station may send the reference signal by using an uplink resource of the second base station, or may send the broadcasted reference signal by using the resource configured by using the resource configuration information of the first base station. The resource configured by using the resource configuration information of the first base station includes an uplink resource of the first base station and/or a downlink resource of the first base station. Optionally, after receiving the resource configuration information of the first base station, the second base station may further send an acknowledgement to the first base station, to notify the first base station that the second base station has successfully received the resource configuration information of the first, base station. Optionally, the reference signal may be carried in a broadcast message to be sent to the UE in a broadcast manner.

Further, the first base station adds, to the first message, information indicating that the second base station supports D2D, communication, broadcasts the first message, and instructs, by using the first message, the UE not to actively receive the reference signal sent by the second base station. Therefore, after the UE receives the first message broadcasted by the first base station, the UE initiates a cellular connection establishment process to the first base station. For a specific establishment process, refer to the prior art. Details are not described herein.

S904: The first base station sends a measurement instruction to the UE, where the measurement instruction is used to instruct the UE to measure signal received strength of a reference signal sent by the second base station.

S905: The first base station determines, according to the received signal received strength that is of the reference signal and that is reported by the UE, that the UE supports D2D communication with the second base station.

Specifically, after receiving the measurement instruction, the UE receives and measures the signal received strength of the reference signal sent by the second base station, and sends the signal received strength of the reference signal to the first base station, so that the first base station determines, according to the signal received strength of the reference signal, whether the UE meets a preset condition of performing D2D communication with the second base station. Optionally, the preset condition may be: received strength of a signal received by the UE meets a preset threshold, or received strength of a signal received by the UE meets a signal to interference plus noise ratio threshold for demodulating a signal by the UE, or a distance between the UE and the second base station meets a particular condition, or the like.

S906: The first base station sends identifier information of the UE to the second base station, and sends, to the UE, second indication information that carries a first identifier, where the identifier information of the UE is used to notify the second base station that the UE supports D2D communication with the second base station, and the second indication information is used to instruct the UE to perform D2D communication with the second base station corresponding to the first identifier.

Specifically, when the first base station determines, according to the signal received strength that is of the reference signal and that is reported by the UE, that the UE meets the preset condition of performing D2D communication with the second base station, the first base station sends the identifier information of the UE to the second base station, so that the second base station learns, according to the identifier information of the UE, that the UE corresponding to the identifier information supports D2D communication with the second base station. In addition, the first base station further sends, to the UE, the second indication information that carries the first identifier (the first identifier is an identifier of a second base station that currently is to perform D2D communication with the UE). Therefore, the UE can learn, according to the first identifier, that the UE currently is supposed to perform D2D communication with the second base station corresponding to the first identifier (there may be multiple second base stations in an actual scenario, the first base station determines that the UE meets a preset condition of performing D2D communication with the multiple second base stations, and the first base station controls the UE to currently perform D2D communication with a specific base station or several specific base stations, and therefore, the first base station notifies the UE of the identifier of a second base station that currently is to perform D2D communication with the UE).

Then, the second base station sends the resource configuration information of the first base station to the UE according to the identifier information of the UE. Optionally, the second base station may send the resource configuration information of the first base station to the UE by using a downlink, resource of the second base station, or may send the resource configuration information of the first base station to the UE by using the resource configured by using the resource configuration information of the first base station.

Optionally, the second base station may send the resource configuration information of the first base station to the UE by using the first base station.

Optionally, after receiving the second indication information that is sent by the first base station and that carries the first identifier, the UE initiates an RRC connection to the second base station corresponding to the first identifier. That is, the UE sends an RRC connection setup request message to the second base station, so that the second base station adds the resource configuration information of the first base station to an RRC connection setup response message, and sends the RRC connection setup response message to the UE.

According to the resource allocation method provided in this embodiment of the present invention, after determining, according to an indication of a second base station, that the second base station supports D2D communication, a first base station sends resource configuration information of the first base station to the second base station, and sends, to UE, a first message indicating that the second base station supports D2D communication, so that the UE reports measured signal received strength of a reference signal to the first base station after receiving a measurement instruction sent by the first base station. Therefore, after determining that the UE supports D2D communication with the second base station, the first base station sends identifier information of the UE to the second base station, and further, the second base station sends the resource configuration information of the first base station to the UE according to the identifier information of the UE. According to the method provided in this embodiment of the present invention, the second base station configures a resource of the first base station for the UE that performs D2D communication with the second base station, so that the resource of the first base station can be reused by the UE and the second base station, thereby improving resource utilization of a communications system.

Figure 10:
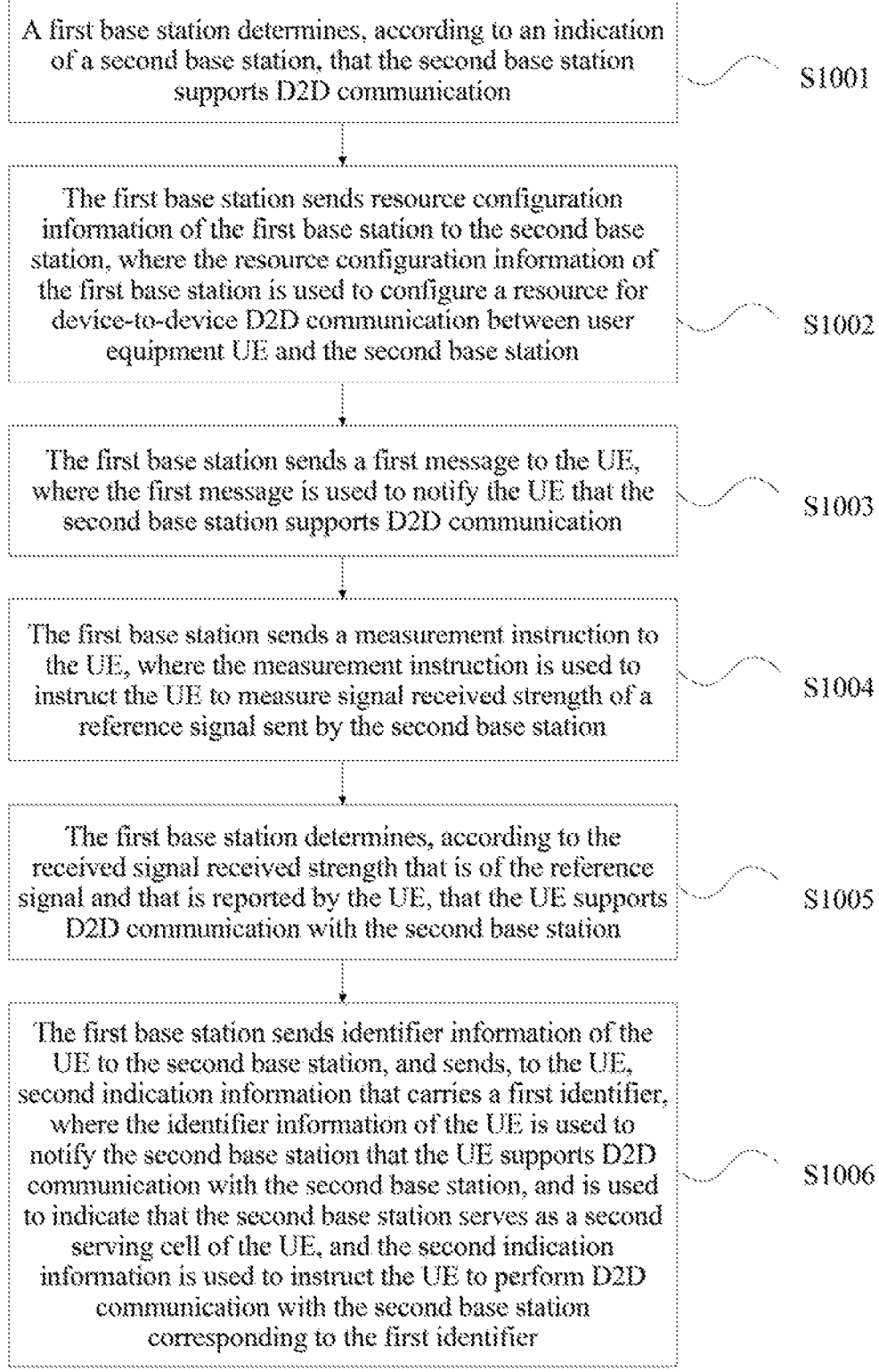
FIG. 10 is a schematic flowchart of Embodiment 10 of a resource allocation method according to the present invention.

FIG. 10 is a schematic flowchart of Embodiment 10 of a resource allocation method according to the present invention. This embodiment relates to another specific process in which after a first base station learns that a second base station supports D2D communication, the first base station sends resource configuration information of the first base station to the second base station. This embodiment relates to another specific process in which the second base station serves as a second serving cell of UE, and the second base station allocates an uplink resource of the first base station to the UE. This embodiment is applied to an MSA scenario in which the first base station obtains data from a core network, then directly sends a part of the data to the UE, and sends the other part of the data to the UE by using the second base station, and a mode of communication between the second base station and the UE is a D2D communication mode. As shown in FIG. 10, the method includes the following steps.

S1001: The first base station determines, according to an indication of the second base station, that the second base station supports D2D communication.

S1002: The first base station sends resource configuration information of the first base station to the second base station, where the resource configuration information of the first base station is used to configure a resource for device-to-device (D2D) communication between the user equipment (UE) and the second base station.

Specifically, for a specific execution process of S1001, refer to specific content of S801 in Embodiment 8, and for a specific execution process of S1002, refer to an execution process of Embodiment 7. Details are not repeatedly described herein.

S1003: The first base station sends a first message to the UE, where the first message is used to notify the UE that the second base station supports D2D communication.

S1004: The first base station sends a measurement instruction to the UE, where the measurement instruction is used to instruct the UE to measure signal received strength of a reference signal sent by the second base station.

S1005: The first base station determines, according to the received signal received strength that is of the reference signal and that is reported by the UE, that the UE supports D2D communication with the second base station.

Specifically, for a specific execution process of S1003 to S1005, refer to specific content of S903 to S905. Details are not repeatedly described herein.

S1006: The first base station sends identifier information of the UE to the second base station, and sends, to the UE, second indication information that carries a first identifier, where the identifier information of the UE is used to notify the second base station that the UE supports D2D communication with the second base station, and is used to indicate that the second base station serves as a second serving cell of the UE, and the second indication information is used to instruct the UE to perform D2D communication with the second base station corresponding to the first identifier.

Specifically, when the first base station determines, according to the signal received strength that is of the reference signal and that is reported by the UE, that the UE meets a preset condition of performing D2D communication with the second base station, the first base station sends the identifier information of the UE to the second base station, so that the second base station learns, according to the identifier information of the UE, that the UE corresponding to the identifier information supports D2D communication with the second base station, and the second base station further learns, according to the identifier information of the UE, that the second base station serves the UE as the second serving cell of the UE (the first base station serves the UE as a first serving cell of the UE). That is, the second base station notifies the UE how to perform sorting or combination processing on received data sent by the second base station and received data sent by the first base station, or notifies the UE of information such as an order of sending data by the second base station, so that the UE can sort and combine a received part of data sent by the first base station and the other received part of data sent by the second base station, to obtain complete data.

In addition, the first base station further sends, to the UE, the second indication information that carries the first identifier (the first identifier is an identifier of a second base station that currently is to perform D2D communication with the UE). Therefore, the UE can team, according to the first identifier, that the UE currently is supposed to perform D2D communication with the second base station corresponding to the first identifier (there may be multiple second base stations in an actual scenario, the first base station determines that the UE meets a preset condition of performing D2D communication with the multiple second base stations, and the first base station controls the UE to currently perform D2D communication with a specific base station or several specific base stations, and therefore, the first base station notifies the UE of the identifier of the second base station that currently is to perform D2D communication with the UE).

Then, the second base station sends the resource configuration information of the first base station to the UE according to the identifier information of the UE. Optionally, the second base station may send the resource configuration information of the first base station to the UE by using a downlink, resource of the second base station, or may send the resource configuration information of the first base station to the UE by using the resource configured by using the resource configuration information of the first base station.

Optionally, the second base station may send the resource configuration information of the first base station to the UE by using the first base station.

Optionally, after receiving the second indication information that is sent by the first base station and that carries the first identifier, the UE initiates an RRC connection to the second base station corresponding to the first identifier. That is the UE sends an RRC connection setup request message to the second base station, so that the second base station adds the resource configuration information of the first base station to an RRC connection setup response message, and sends the RRC connection setup response message to the UE.

Therefore, when receiving data sent by the first base station, the second base station sends the data to the UE by using a resource of the first base station, so that the UE can communicate with another network element device by using the resource of the first base station.

It should be noted that, because the second base station already serves the UE as the second serving cell of the UE, after receiving the data that is sent by the second base station by using the resource of the first base station, the UE may learn, by using the second base station, how to perform sorting or combination processing on the received data sent by the second base station and the received data sent by the first base station, so as to obtain complete data.

According to the resource allocation method provided in this embodiment of the present invention, after determining, according to an indication of a second base station, that the second base station supports D2D communication, a first base station sends resource configuration information of the first base station to the second base station, and sends, to UE, a first message indicating that the second base station supports D2D communication, so that the UE reports measured signal received strength of a reference signal to the first base station after receiving a measurement instruction sent by the first base station. Therefore, after determining that the UE supports D2D communication with the second base station, the first base station sends identifier information of the HE to the second base station, and further, the second base station sends the resource configuration information of the first base station to the UE according; to the identifier information of the UE. According to the method provided in this embodiment of the present invention, the second base station configures a resource of the first base station for the UE that performs D2D communication with the second base station, so that the resource of the first base station can be reused by the UE and the second base station, thereby improving resource utilization of a communications system.

Figure 11:
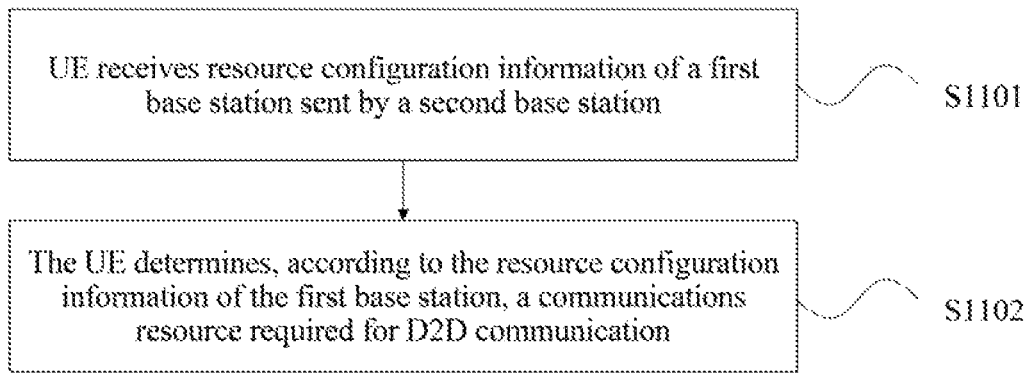
FIG. 11 is a schematic flowchart of Embodiment 11 of a resource allocation method according to the present invention.

FIG. 11 is a schematic flowchart of Embodiment 11 of a resource allocation method according to the present invention. This embodiment relates to a specific process in which UE receives resource configuration information of a first base station sent by a second base station, and determines a resource for D2D communication according to the resource configuration information of the first base station. As shown in FIG. 11, the method includes the following steps.

S1101: The UE receives resource configuration information of the first base station sent by the second base station.

Specifically, the first base station sends the resource configuration information to the second base station, so that the second base station forwards the resource configuration information of the first base station to the UE. Optionally, after learning that the second base station supports D2D communication, the first base station may send the resource configuration information of the first base station to the second base station. For a manner in which the first base station learns that the second base station supports D2D communication, refer to content of the foregoing embodiment. Details are not repeatedly described herein.

Optionally, the second base station may send the resource configuration information of the first base station to the UE by using a downlink resource of the second base station, or may send the resource configuration information of the first base station to the UE by using a resource configured by using the resource configuration information of the first base station. It should be noted that, the UE is UE that is determined by the second base station and that meets a preset condition of performing D2D communication with the second base station, and a communication mode used during interaction between the UE and the second base station is a D2D communication mode. Optionally, the preset condition, met by the UE, of performing D2D communication with the second base station may be: received strength of a signal received by the UE meets a preset threshold, or received strength of a signal received by the UE meets a signal to interference plus noise ratio threshold for demodulating a signal by the UE, or a distance between the UE and the second base station meets a particular condition, or the like.

S1102: The UE determines, according to the resource configuration information of the first base station, a communications resource required for D2D communication.

After receiving the resource configuration information of the first base station, the UE may perform corresponding processing on the resource configuration information of the first base station, to obtain a communications resource required when the UE performs D2D communication with a network element device. The communications resource may be an uplink resource of the first base station, or may be a downlink resource of the first base station. The communications resource may be all resources or a part of resources configured by using the resource configuration information. Optionally, the resource configuration information of the first base station may further include a physical resource block parameter. The UE may learn of, according to the physical resource block parameter, a data or signaling format used when the UE performs D2D communication with a core network or another network element device, so as to perform data transmission or signaling interaction with the core network or the another network element device in a D2D communication mode by using the resource configured by using the resource configuration information of the first base station. That is, in this embodiment of the present invention, the uplink resource or the downlink resource of the first base station can be reused by the UE that performs D2D communication with the second base station, thereby improving resource utilization of a communications system.

According to the resource allocation method provided in this embodiment of the present invention, UE that can support D2D communication with a second base station receives resource configuration information of a first base station sent by the second base station, obtains, according to the resource configuration information of the first base station, a communications resource required for D2D communication, and performs D2D communication by using the communications resource. According to the method provided in this embodiment of the present invention, the second base station configures a resource of the first base station for the UE that performs D2D communication with the second base station, so that the resource of the first base station can be reused by the UE, thereby improving resource utilization of a communications system.

Figure 12:
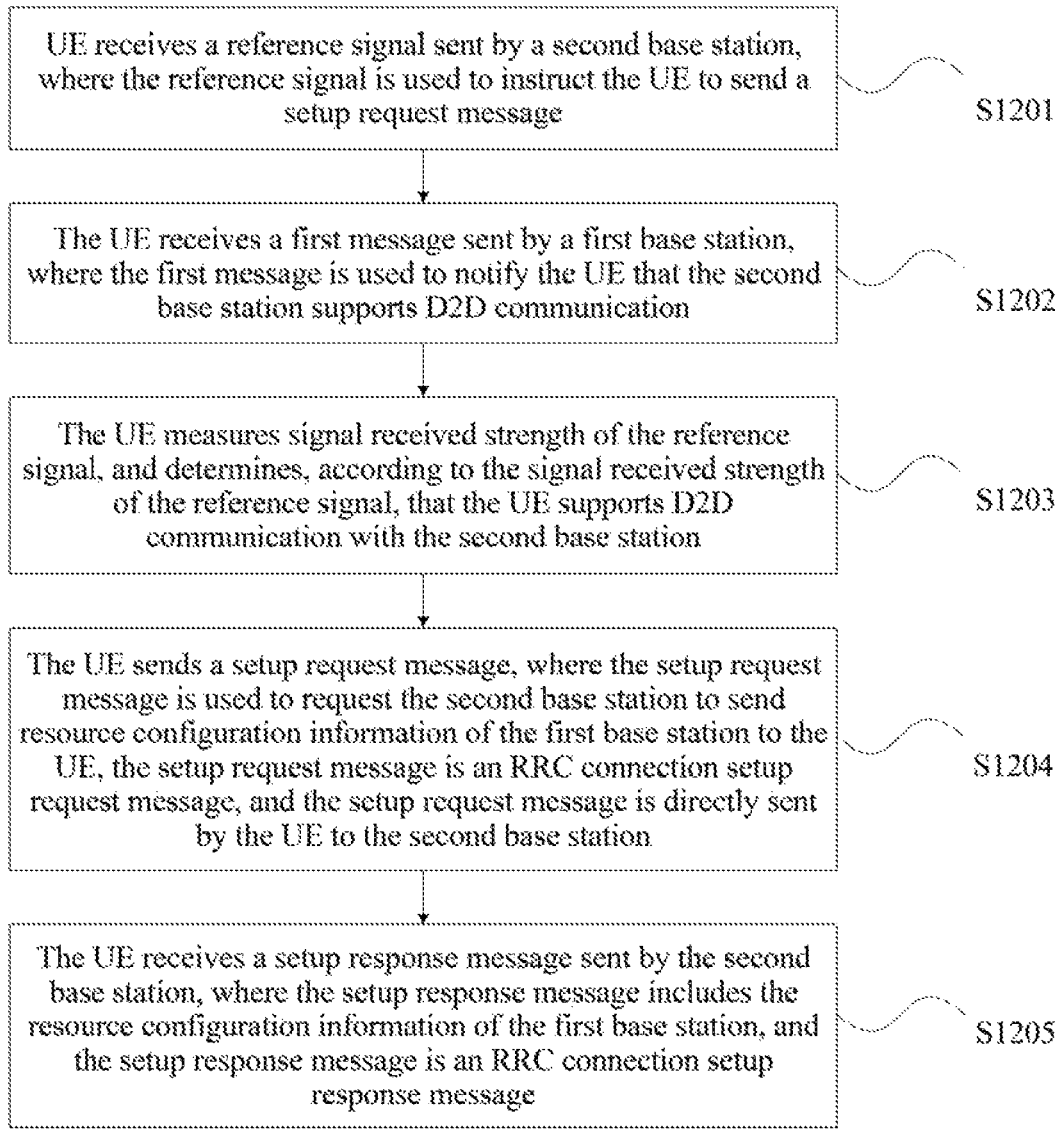
FIG. 12 is a schematic flowchart of Embodiment 12 of a resource allocation method according to the present invention.

FIG. 12 is a schematic flowchart of Embodiment 12 of a resource allocation method according to the present invention. This embodiment relates to a specific process in which UE obtains resource configuration information of a first base station. This embodiment is applied to a scenario in which an S1 connection is established between a second base station and a core network, and a D2D mode is used for communication between the second base station and the UE. Based on the foregoing embodiment shown in FIG. 11, the resource configuration information is an RRC connection setup response message. As shown in FIG. 12, the method specifically includes the following steps.

S1201: The UE receives a reference signal sent by the second base station, where the reference signal is used to instruct the UE to send a setup request message.

Specifically, after receiving resource configuration information of the first base station, the second base station sends the reference signal to the UE, to instruct the UE to send the setup request message. Optionally, the second base station may send the reference signal by using an uplink resource of the second base station, or may send the reference signal by using a resource configured by using the resource configuration information of the first base station. The resource, configured by using the resource configuration information of the first base station includes an uplink resource of the first base station and/or a downlink resource of the first base station. Optionally, after receiving the resource configuration information of the first base station, the second base station may further send an acknowledgement to the first base station, to notify the first base station that the second base station has successfully received the resource configuration information of the first base station. Optionally, the reference signal may be carried in a broadcast message to be sent to the UE in a broadcast manner.

For a specific process in which the UE sends the setup request message, refer to specific content of S1202 to S1204.

S1202: The UE receives a first message sent by the first base station, where the first message is used to notify the UE that the second base station supports D2D communication.

S1203: The UE measures signal received strength of the reference signal, and determines, according to the signal received strength of the reference signal, that the UE supports D2D communication with the second base station.

Specifically, the first base station adds, to the first message, information indicating that, the second base station supports D2D communication, and broadcasts the first message. After receiving the first message, the UE learns that the second base station supports D2D communication. Then, the UE receives and measures the signal received strength of the reference signal sent by the second base station, and determines whether the signal received strength of the reference signal meets a preset condition of performing D2D communication with the second base station. Optionally, the preset condition may be: received strength of a signal received by the UE meets a preset threshold, or received strength of a signal received by the UE meets a signal to interference plus noise ratio threshold for demodulating a signal by the UE, or a distance between the UE and the second base station meets a particular condition, or the like.

S1204: The UE sends the setup request message, where the setup request message is used to request the second base station to send resource configuration information of the first base station to the UE, the setup request message is an RRC connection setup request message, and the setup request message is directly sent by the UE to the second base station.

Specifically, when the UE determines that the signal received strength of the reference signal meets the preset condition, the UE determines that the UE supports D2D communication with the second base station. Therefore, when the UE needs to perform service interaction with the second base station, the UE sends the setup request message to the second base station. The setup request message is used to request the second base station to send the resource configuration information of the first base station to the UE. In this embodiment, the setup request message may be an RRC connection setup request message. It should be noted that, the UE is actually a D2D terminal in this case.

S1205: The UE receives a setup response message sent by the second base station, where the setup response message includes the resource configuration information of the first base station, and the setup response message is an RRC connection setup response message.

Specifically, that the UE sends the RRC connection setup request message, to the second base station actually means that the UE initiates an RRC connection to the second base station. Specifically, the UE sends a preamble to the second base station, and the second base station sends an RAR message to the UE after receiving the preamble. Then, the UE sends the RRC connection setup request message to the second base station, and the second base station determines, according to the RRC connection setup request message, that the UE supports D2D communication with the second base station. Therefore, the second base station sends the setup response message to the UE. The setup response message is an RRC connection setup response message, and the RRC connection setup response message includes the resource configuration information of the first base station. Optionally, the second base station may establish an RRC connection to the UE by using a downlink resource of the second base station, or may establish an RRC connection to the UE by using the resource configured by using the resource configuration information of the first base station. The RRC connection setup response message may be sent by the second base station to the UE by using the resource configured by using the resource configuration information of the first base station.

Further, when the second base station establishes an RRC connection to the UE, the second base station further establishes an S1 connection to a core network, so that the UE performs, by using the resource configured by using the resource configuration information of the first base station, data interaction with the core network by using the second base station.

It should be noted that, no matter whether the UE establishes an RRC connection to the second base station or the UE performs data interaction with the core network by using the second base station, a protocol stack shown in FIG. 4 can be used in a process in which the UE performs D2D communication with the second base station.

According to the resource allocation method provided in this embodiment of the present invention, after determining, according to a reference signal sent by a second base station, that UE meets a preset condition of performing D2D communication with the second base station, the UE establishes an RRC connection to the second base station. In a process of establishing the RRC connection, the UE receives an RRC connection setup response message that is sent by the second base station and that carries resource configuration information of a first base station, and determines, according to the resource configuration information of the first base station, a communications resource required for communication, so as to perform D2D communication by using the communications resource. According to the method provided in this embodiment of the present invention, the second base station configures a resource of the first base station for the UE that performs D2D communication with the second base station, so that the resource of the first base station can be reused by the UE and the second base station, thereby improving resource utilization of a communications system.

Figure 13:
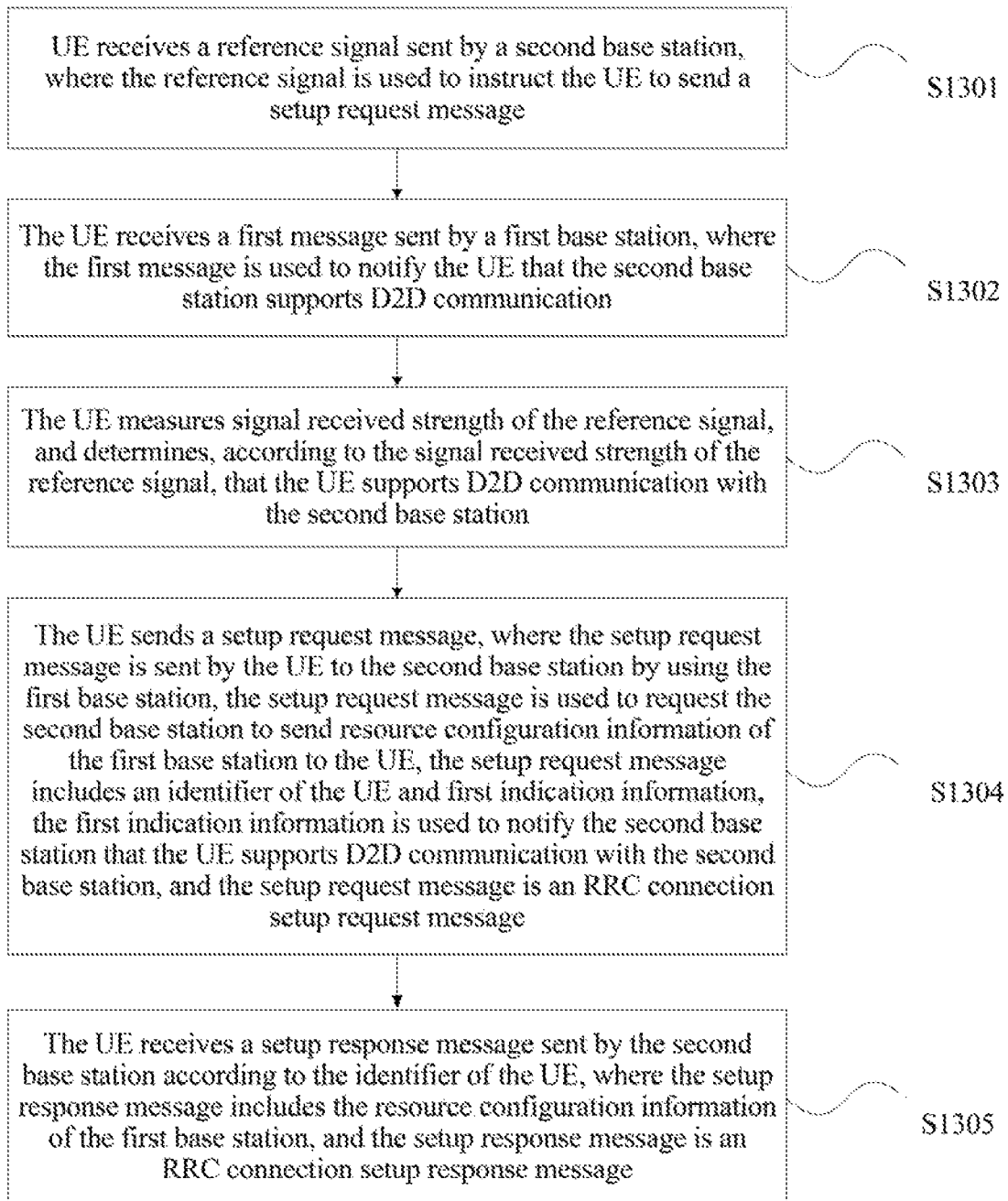
FIG. 13 is a schematic flowchart of Embodiment 13 of a resource allocation method according to the present invention.

FIG. 13 is a schematic flowchart of Embodiment 13 of a resource allocation method according to the present invention. This embodiment relates to another specific process in which UE obtains resource configuration information of a first base station. This embodiment is applied to a scenario in which an S1 connection is established between a second base station and a core network, and a D2D mode is used for communication between the second base station and the UE. As shown in FIG. 13, the method specifically includes the following steps.

S1301: The UE receives a reference signal sent by the second base station, where the reference signal is used to instruct the UE to send a setup request message.

S1302: The UE receives a first message sent by the first base station, where the first message is used to notify the UE that the second base station supports D2D communication.

S1303: The UE measures signal received strength of the reference signal, and determines, according to the signal received strength of the reference signal, that the UE supports D2D communication with the second base station.

Specifically, for S1301 to S1303, refer to descriptions of S1201 to S1203. Details are not repeatedly described herein.

S1304: The UE sends the setup request message, where the setup request message is sent by the UE to the second base station by using the first base station, the setup request message is used to request the second base station to send resource configuration information of the first base station to the UE, the setup request message includes an identifier of the UE and first indication information, the first indication information is used to notify the second base station that the UE supports D2D communication with the second base station, and the setup request message is an RRC connection setup request message.

Specifically, a difference between this embodiment and Embodiment 12 lies in that when the UE determines that the UE can perform D2D communication with the second base station, the UE sends the setup request message to the first base station in this case, and then the first base station sends the setup request message to the second base station. In this embodiment, the setup request message is an RRC connection setup request message. That is, in this embodiment, the UE initiates an RRC connection setup request to the first base station. Specifically, the UE sends a preamble to the first base station, and the first base station sends an RAR message to the UE after receiving the preamble. Then, the UE sends the RRC connection setup request message to the first base station, and adds the identifier of the UE and the first indication information to the RRC connection setup request message, so that the first base station learns that the UE meets a preset condition of performing D2D communication with the second base station. Therefore, the first base station sends the received RRC connection setup request message to the second base station, so that the second base station learns, according to the first indication information and the identifier of the UE, that the UE supports D2D communication with the second base station.

S1305: The UE receives a setup response message sent by the second base station according to the identifier of the UE, where the setup response message includes the resource configuration information of the first base station, and the setup response message is an RRC connection setup response message.

Specifically, after receiving the RRC connection setup request message that is sent by the first base station and that carries the identifier of the UE and the first indication information, the second base station adds the obtained resource configuration information of the first base station to the RRC connection setup response message, and sends the RRC connection setup response message to the UE. Optionally, the second base station may send the RRC connection setup response message to the UE by using a downlink resource of the second base station, or may send the RRC connection setup response message to the UE by using a resource of the first base station. The UE receives the RRC connection setup response message dial is sent by the second base station and that carries the resource configuration information of the first base station, to obtain a communications resource required for D2D communication.

Further, when the second base station sends the RRC connection setup response message to the UE, the second base station further establishes an S1 connection to a core network, so that the UE can perform, by using a communications resource in the resource of the first base station, data interaction with the core network by using the second base station.

It should be noted that, no matter whether the second base station sends the RRC connection setup response message to the UE or the UE performs data interaction with the core network by using the second base station, a protocol stack shown in FIG. 4 can be used in a process in which the UE performs D2D communication with the second base station.

According to the resource allocation method provided in this embodiment of the present invention, after determining, according to a reference signal sent by a second base station, that UE meets a preset condition of performing D2D communication with the second base station, the UE establishes an RRC connection to a first base station, so that the first base station sends, to the second base station, an RRC connection setup request message that carries an identifier of the UE and first indication information. Therefore, the UE receives an RRC connection setup response message that is sent by the second base station and that carries resource configuration information of the first base station, and obtains, according to the RRC connection setup response message, a communications resource required for D2D communication. According to the method provided in this embodiment of the present invention, the second station configures a resource of the first base station for the UE that performs D2D communication with the second base station, so that the resource of the first base station can be reused by the UE and the second base station, thereby improving resource utilization of a communications system.

Figure 14:
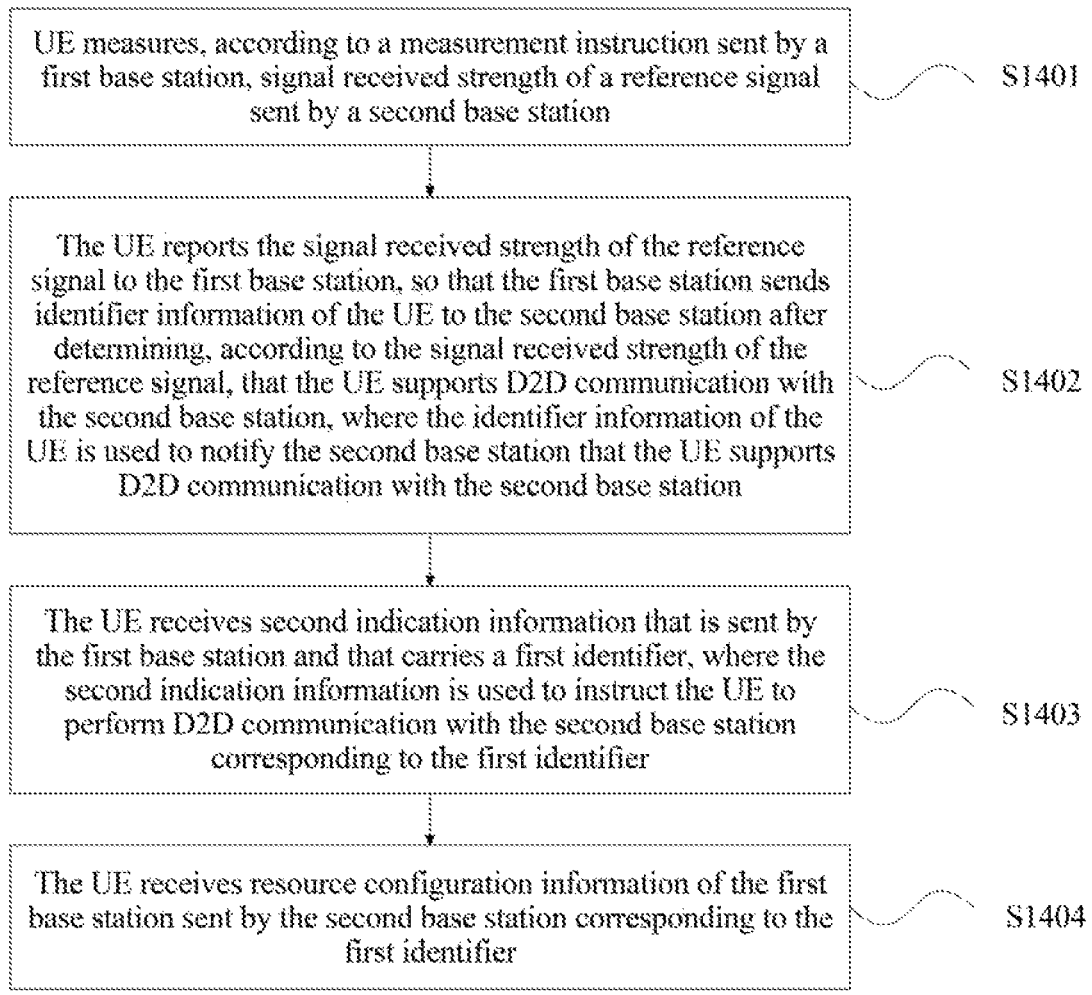
FIG. 14 is a schematic flowchart of Embodiment 14 of a resource allocation method according to the present invention.

FIG. 14 is a schematic flowchart of Embodiment 14 of a resource allocation method according to the present invention. This embodiment relates to another specific process in which UE obtains resource configuration information of a first base station. This embodiment is applied to a scenario in which an S1 connection is established between a second base station and a core network, and a D2D mode is used for communication between the second base station and the UE. As shown in FIG. 14, the method specifically includes the following steps.

S1401: The UE measures, according to a measurement instruction sent by the first base station, signal received strength of a reference signal sent by the second base station.

Specifically, after receiving resource configuration information of the first base station, the second base station may send the reference signal. Optionally, the reference signal may be carried in a broadcast message to be sent in a broadcast manner. Optionally, the second base station may broadcast the reference signal by using an uplink resource of the second base station, or may send the reference signal by using a resource configured by using the resource configuration information of the first base station. Optionally, after receiving the resource configuration information of the first base station, the second base station may further send an acknowledgement to the first base station, to notify the first base station that the second base station has successfully received the resource configuration information of the first base station.

Further, the first base station adds, to a first message, information indicating that the second base station supports D2D communication, broadcasts the first message, and instructs, by using the first message, the UE not to actively receive the reference signal sent by the second base station. Therefore, after the UE receives the first message broadcasted by the first base station, the UE initiates a cellular connection establishment process to the first base station. For a specific establishment process, refer to the prior art. Details are not described herein. Then, the first base station sends the measurement instruction to the UE, to instruct the UE to measure the signal received strength of the reference signal sent by the second base station.

S1402: The UE reports the signal received strength of the reference signal to the first base station, so that the first base station sends identifier information of the UE to the second base station after determining, according to the signal received strength of the reference signal that the UE supports D2D communication with the second base station, where the identifier information of the UE is used to notify the second base station that the UE supports D2D communication with the second base station.

Specifically, after measuring the signal received strength of the reference signal sent by the second base station, the UE sends the signal received strength of the reference signal to the first base station, so that the first base station determines, according to the signal received strength of the reference signal whether the UE meets a preset condition of performing D2D communication with the second base station. Optionally, the preset condition may be: received strength of a signal received by the UE meets a preset threshold, or received strength of a signal received by the UE meets a signal to interference plus noise ratio threshold for demodulating a signal by the UE, or a distance between the UE and the second base station meets a particular condition, or the like.

When the first base station determines, according to the signal received strength of the reference signal, that the UE meets the preset condition of performing D2D communication with the second base station, the first base station sends the identifier information of the UE to the second base station, so that the second base station determines, according to the identifier information of the UE, that the UE supports D2D communication with the second base station.

S1403: The UE receives second indication information that is sent by the first base station and that carries a first identifier, where the second indication information is used to instruct the UE to perform D2D communication with the second base station corresponding to the first identifier.

Specifically, when the first base station determines, according to the signal received strength of the reference signal, that the UE meets the preset condition of performing D2D communication with the second base station, the first base station further adds the first identifier to the second indication information, and sends the second indication information to the UE, so that the UE learns that the UE currently is supposed to perform D2D communication with the second base station corresponding to the first identifier (there may be multiple second base stations in an actual scenario, the first base station determines that the UE meets a preset condition of performing D2D communication with the multiple second base stations, and the first base station controls the UE to currently perform D2D communication with a specific base station or several specific base stations, and therefore, the first base station notifies the UE of an identifier of a second base station that currently is to perform D2D communication with the UE).

S1404: The UE receives resource configuration information of the first base station sent by the second base station corresponding to the first identifier.

Specifically, the first base station instructs, by using the second indication information, the UE to perform D2D communication with the second base station corresponding to the first identifier. In this case, the second base station corresponding to the first identifier may send the resource configuration information of the first base station to the UE by using a downlink resource of the second base station, or may send the resource configuration information of the first base station to the UE by using a resource of the first base station.

Optionally, the UE may further receive the resource configuration information of the first base station sent by using the first base station by the second base station corresponding to the first identifier.

Optionally, after receiving the second indication information sent by the first base station, the UE initiates an RRC connection to the second base, station corresponding to the first identifier carried in the second indication information. That is, the UE sends an RRC connection setup request message to the second base station corresponding to the first identifier. Because the second base station has learned, according to the identifier information of the UE, that the UE supports D2D communication with the second base station, the second base station receives the RRC connection setup request message sent by the UE, adds the resource configuration information of the first base station to an RRC connection setup response message, and sends the RRC connection setup response message to the UE.

According to the resource allocation method provided in this embodiment of the present invention, a first base station sends a measurement instruction to UE, and the UE sends, to the first base station, signal received strength that is of a reference signal sent by a second base station and that is measured according to the measurement instruction, so that the first base station determines whether the UE meets a preset condition of performing D2D communication with the second base station, and sends identifier information of the UE to the second base station after determining that the UE meets the preset condition. Therefore, the second base station sends resource configuration information of the first base station to the UE according to the identifier information of the UE, and the UE communicates with a network element device by using a resource configured by using the resource configuration information of the first base station. According to the method provided in this embodiment of the present invention, the second base station configures a resource of the first base station for the UE that performs D2D communication with the second base station, so that the resource of the first base station can be reused by the UE and the second base station, thereby improving resource utilization of a communications system.

Figure 15:
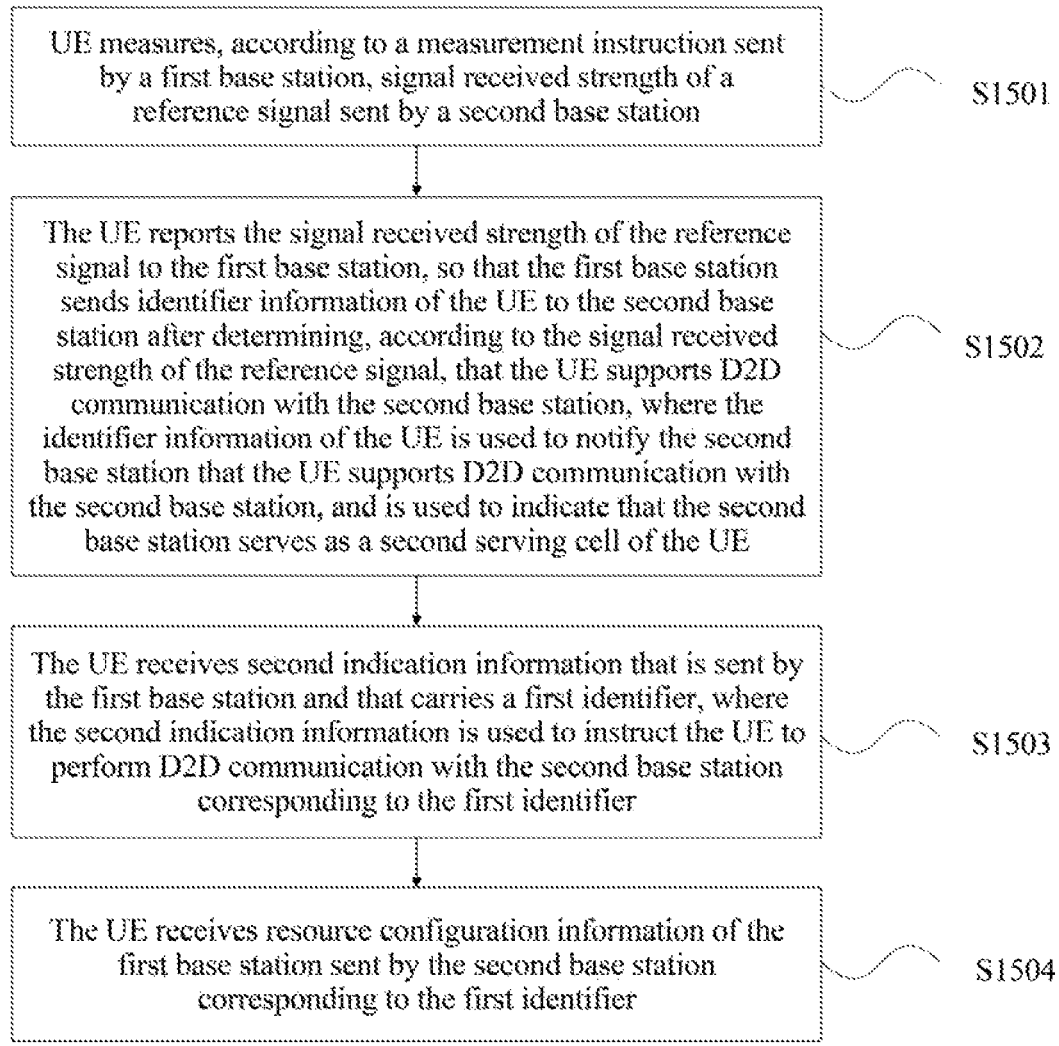
FIG. 15 is a schematic flowchart of Embodiment 15 of a resource allocation method according to the present invention.

FIG. 15 is a schematic flowchart of Embodiment 15 of a resource allocation method according to the present invention. This embodiment relates to another specific process in which UE obtains resource configuration information of a first base station. This embodiment is applied to an MSA scenario in which the first base station obtains data from a core network, then directly sends a part of the data to the UE, and sends the other part of the data to the UE by using a second base station, and a mode of communication between the second base station and the UE is a D2D communication mode. As shown in FIG. 15, the method includes the following steps.

S1501: The UE measures, according to a measurement instruction sent by the first base station, signal received strength of a reference signal sent by the second base station.

Specifically, for a specific execution process of S1501, refer to specific content of S1401. Details are not repeatedly described herein.

S1502: The UE reports the signal received strength of the reference signal to the first base station, so that the first base station sends identifier information of the UE to the second base station after determining, according to the signal received strength of the reference signal, that the UE supports D2D communication with the second base station, where the identifier information of the UE is used to notify the second base station that the UE supports D2D communication with the second base station, and is used to indicate that the second base station serves as a second serving cell of the UE.

Specifically, after measuring the signal received strength of the reference signal sent by the second base station, the UE sends the signal received strength of the reference signal to the first base station, so that the first base station determines, according to the signal received strength of the reference signal, whether the UE meets a preset condition of performing D2D communication with the second base station. Optionally, the preset condition may be: received strength of a signal received by the UE meets a preset threshold, or received strength of a signal received by the UE meets a signal to interference plus noise ratio threshold for demodulating a signal by the UE, or a distance between the UE and the second base station meets a particular condition, or the like.

When the first base station determines, according to the signal received strength of the reference signal, that the UE meets the preset condition of performing D2D communication with the second base station, the first base station sends the carried identifier information of the UE to the second base station, so that the second base station determines, according to the identifier information of the UE, that the UE can perform D2D communication with the second base station, and the second base station further learns, according to the identifier information of the UE, that the second base station serves the UE as the second serving cell of the UE in this case (the first base station serves the UE as a first serving cell of the UE). That is, the second base station notifies the UE how to perform sorting or combination processing on received data sent by the second base station and received data sent by the first base station, or notifies the UE of information such as an order of sending data by the second base station, so that the UE can sort and combine a received part of data sent by the first base station and the other received part of data sent, by the second base station, so as to obtain complete data.

S1503: The UE receives second indication information that is sent by the first base station and that carries a first identifier, where the second indication information is used to instruct the UE to perform D2D communication with the second base station corresponding to the first identifier.

Specifically, for a specific process of S1503, refer to specific content of S1403. Details are not repeatedly described herein.

S1504: The UE receives resource configuration information of the first base station sent by the second base station corresponding to the first identifier.

Specifically, the first base station instructs, by using the second indication information, the UE to perform D2D communication with the second base station corresponding to the first identifier. In this case, the second base station corresponding to the first identifier may send the resource configuration information of the first base station to the UE by using a downlink resource of the second base station, or may send the resource configuration information of the first base station to the UE by using an uplink resource of the first base station.

Optionally, the UE may further receive the resource configuration information of the first base station sent by using the first base station by the second base station corresponding to the first identifier. Optionally, after receiving the second indication information sent by the first base station, the UE initiates an RRC connection to the second base station corresponding to the first identifier carried in the second indication information. That is, the UE sends an RRC connection setup request message to the second base station corresponding to the first, identifier. Because the second base station has learned, according to the identifier information of the UE, that the UE supports D2D communication with the second base station, the second base station receives the RRC connection setup request message sent by the UE, adds the resource configuration information of the first base station to an RRC connection setup response message, and sends the RRC connection setup response message to the UE.

Further, when the second base station starts to perform D2D communication with the UE, the second base station may send a received part of data of the first base station to the UE by using a resource configured by using the resource configuration information of the first base station (the other part of data is sent by the first base station to the UE). Because the second already serves the UE as the second serving cell of the UE, after receiving the data sent by the second base station by using a resource of the first base station, the UE may learn, by using the second base station, how to perform sorting or combination processing on the received data sent by the second base station and the received data sent by the first base station, so as to obtain complete data.

Optionally, when receiving the data sent by the second base station, the UE sends an acknowledgement feedback to the second base station. The acknowledgement feedback may be sent in the following several manners:

Manner 1: No matter whether there is a physical connection between the second base station and a core network, the UE uses only a D2D link between the UE and the second base station to send the acknowledgement feedback to the second base station; the second base station transmits the acknowledgement feedback to the first base station, and then the first base station sends the acknowledgement feedback to the core network.

Manner 2: When there is a physical connection between the second base station and a core network, the UE uses only a D2D link to transmit the acknowledgement feedback to the second base station, and then the second base station transmits the acknowledgement feedback to the core network.

Manner 3: The UE uses only a cellular link, that is, the UE transmits the acknowledgement feedback to the first base station, and then the first base station transmits the acknowledgement feedback to a core network.

Manner 4: The UE uses both the third transmission manner and the first transmission manner, and the first base station uploads the acknowledgement feedback to a core network.

According to the resource allocation method provided in this embodiment of the present invention, a first base station, sends a measurement instruction to UE, and the UE sends, to the first base station, signal received strength that is of a reference signal sent by a second base station and that is measured according to the measurement instruction, so that the first base station determines whether the UK meets a preset condition of performing D2D communication with the second base station, and sends identifier information of the UE to the second base station after determining that the UK meets the preset condition. Therefore, the second base station sends resource configuration information of the first base station to the UE according to the identifier information of the UK. According to the method provided in this embodiment of the present invention, the second base station configures a resource of the first base station for the UE that performs D2D communication with the second base station, so that the resource of the first base station can be reused by the UE and the second base station, thereby improving resource utilization of a communications system.

Figure 16:
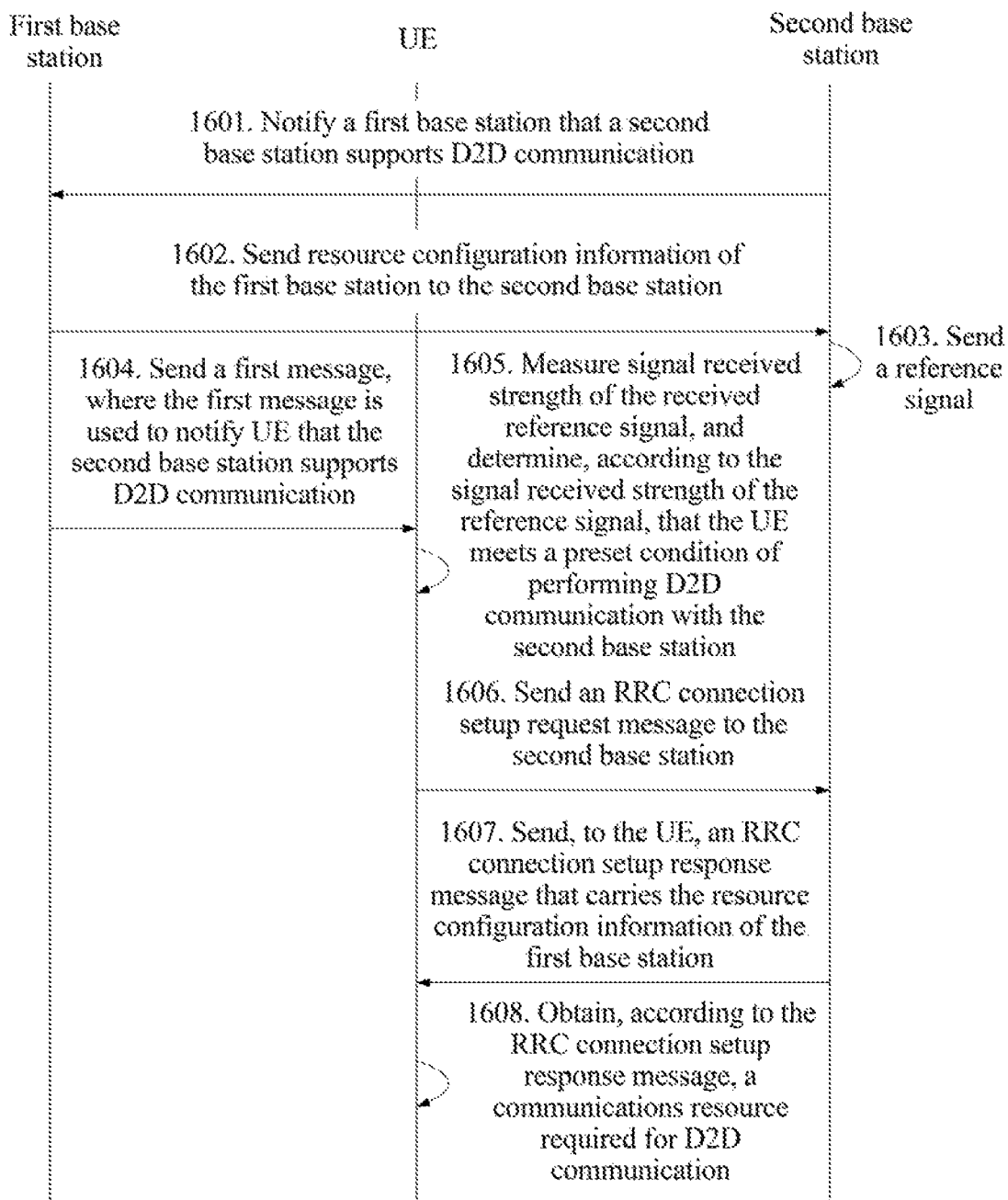
FIG. 16 is a signaling flowchart of Embodiment 16 of a resource allocation method according to the present invention.

FIG. 16 is a signaling flowchart of Embodiment 16 of a resource allocation method according to the present invention. This embodiment, is applied to a scenario in which there is an S1 physical link between a second base station and a core network, and a D2D mode is used for communication between the second base station and UE. As shown in FIG. 16, the method includes the following steps.

S1601: The second base station notifies a first base station that the second base station supports D2D communication.

S1602: The first base station sends resource configuration information of the first base station to the second base station.

S1603: The second base station sends a reference signal.

S1604: The first base station sends a first message, where the first message is used to notify the UK that the second base station supports D2D communication.

Specifically, the first message includes at least frequency domain information and/or time domain information of the reference signal sent by the second base station for D2D communication. The first message may be sent in a broadcast manner.

S1605: The UE measures signal received strength of the received reference signal, and determines, according to the signal received strength of the reference signal, that the UK meets a preset condition of performing D2D communication with the second base station.

S1606: The UE sends an RRC connection setup request message to the second base station.

S1607: The second base station sends, to the UE, an RRC connection setup response message that carries the resource configuration information of the first base station.

S1608: The UE obtains, according to the RRC connection setup response message, a communications resource required for D2D communication.

It should be noted that, the second base station may establish an S1 link from the second base station to a core network for the UE that performs D2D communication, to facilitate data interaction between the UE and the core network.

For S1601 to S1608, refer to an execution process of the foregoing embodiment. Details are not repeatedly described herein.

Figure 17:
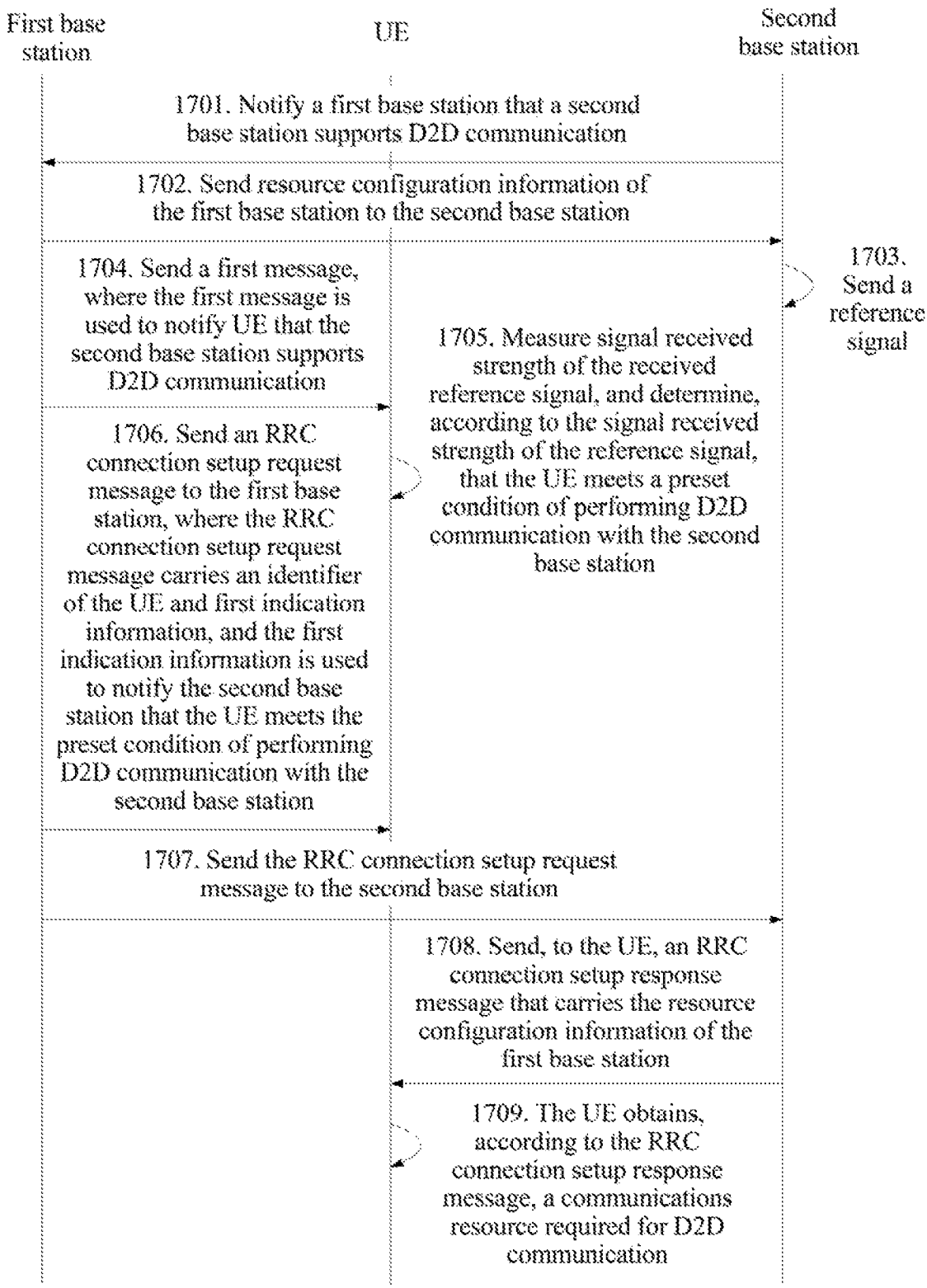
FIG. 17 is a signaling flowchart of Embodiment 17 of a resource allocation method according to the present, invention.

FIG. 17 is a signaling flowchart of Embodiment 17 of a resource allocation method according to the present invention. This embodiment is applied to a scenario in which there is an S1 physical link between a second base station and a core network, and a D2D mode is used for communication between the second base station and UE. As shown in FIG. 17, the method includes the following steps.

S1701: The second base station notifies a first base station that the second base station supports D2D communication.

S1702: The first base station sends resource configuration information of the first base station to the second base station.

S1703: The second base station sends a reference signal.

S1704: The first base station sends a first message, where the first message is used to notify the UK that the second base station supports D2D communication.

Specifically, the first message includes at least frequency domain information and/or time domain information of the reference signal sent by the second base station for D2D communication. The first message may be sent in a broadcast manner.

S1705: The UE measures signal received strength of the received reference signal and determines, according to the signal received strength of the reference signal, that the UE meets a preset condition of performing D2D communication with the second base station.

S1706: The UE sends an RRC connection setup request message to the first base station, where the RRC connection setup request message carries an identifier of the UE and first indication information, and the first indication information is used to notify the second base station that the UE meets the preset condition of performing D2D communication with the second base station.

S1707: The first base station sends the RRC connection setup request message to the second base station.

S1708: The second base station sends, to the UE, an RRC connection setup response message that carries the resource configuration information of the first base station.

S1709: The UE obtains, according to the RRC connection setup response message, a communications resource required for D2D communication.

It should be noted that, the second base station may establish an S1 link from the second base station to a core network for the UE that performs D2D communication, to facilitate data interaction between the UE and the core network.

For S1701 to S1709, refer to an execution process of the foregoing embodiment. Details are not repeatedly described herein.

Figure 18A:
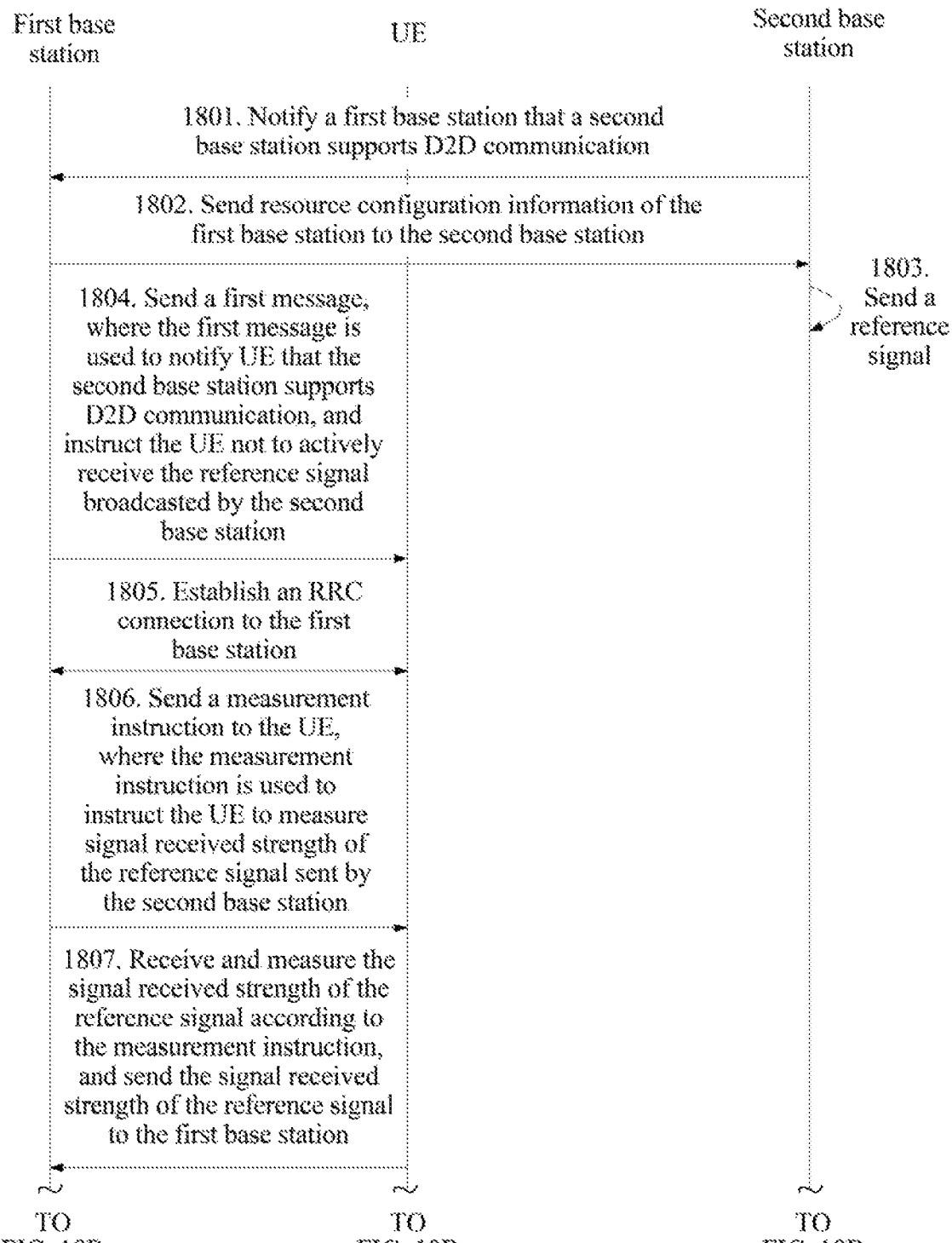
FIG. 18A and FIG. 18B are a signaling flowchart of Embodiment 18 of a resource allocation method according to the present invention.
Figure 18B:
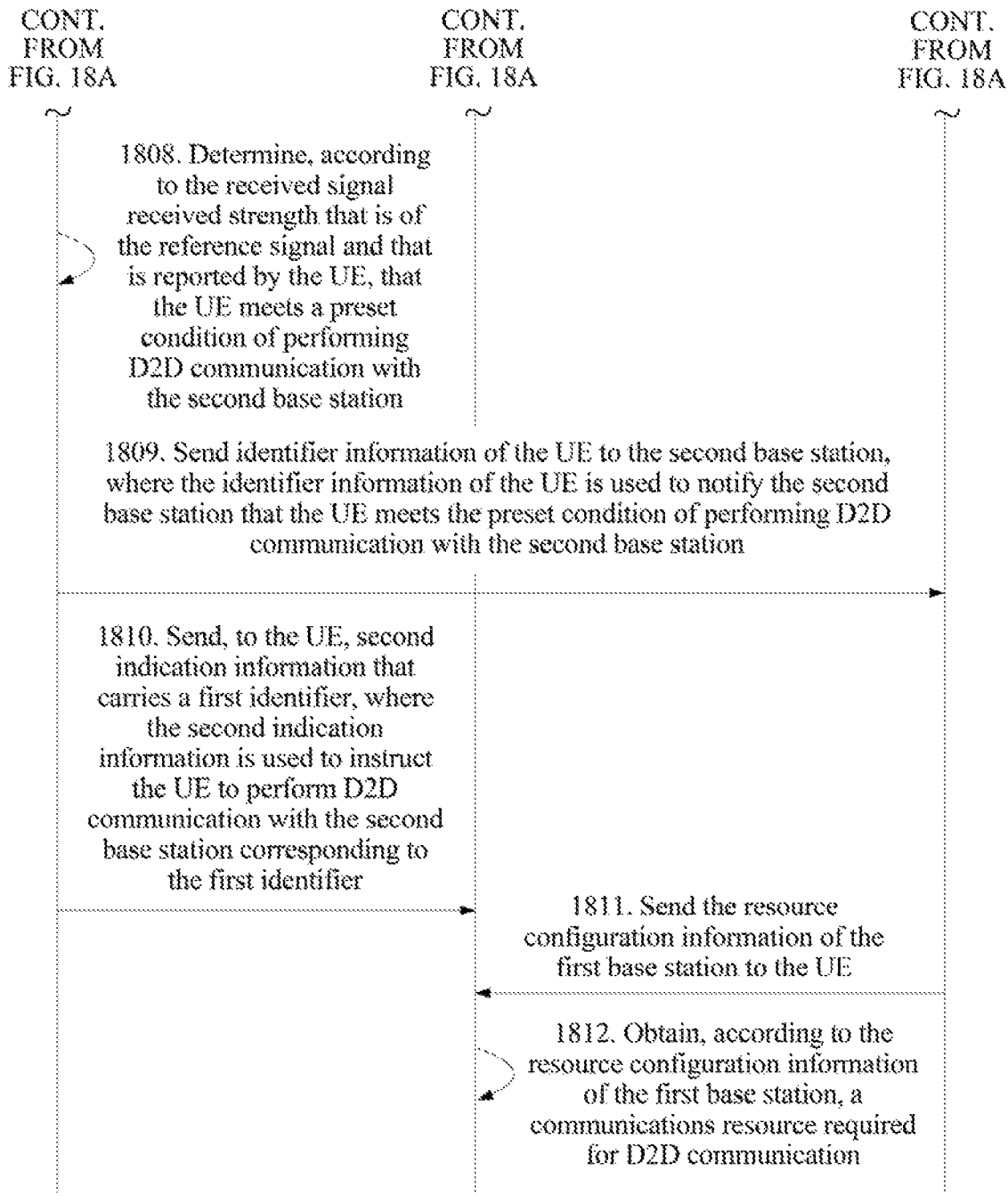

FIG. 18A and FIG. 18B are a signaling flowchart of Embodiment 18 of a resource allocation method according to the present invention. This embodiment is applied to a scenario in which there is an S1 physical link between a second base station and a core network, and a D2D mode is used for communication between the second base station and UE. As shown in FIG. 18A and FIG. 18B, the method includes the following steps.

S1801: The second base station notifies a first base station that the second base station supports D2D communication.

S1802: The first base station sends resource configuration information of the first base station to the second base station.

S1803: The second base station sends a reference signal.

S1804: The first base station sends a first message, where the first message is used to notify the UE that the second base station supports D2D communication, and instruct the UE not to actively receive the reference signal broadcasted by the second base station.

S1805: The UE establishes an RRC connection to the first base station.

S1806: The first base station sends a measurement instruction to the UE, where the measurement instruction is used to instruct the UE to measure signal received strength of the reference signal sent by the second base station.

S1807: The UE receives and measures the signal received strength of the reference signal according to the measurement instruction, and sends the signal received strength of the reference signal to the first base station.

S1808: The first base station determines, according to the received signal received strength that is of the reference signal and that is reported by the UE, that the UE meets a preset condition of performing D2D communication with the second base station.

S1809: The first base station sends identifier information of the UE to the second base station, where the identifier information of the UE is used to notify the second base station that the UE meets the preset condition of performing D2D communication with the second base station.

It should be noted that, content of the identifier information of the UE may be requesting the second base station to provide a communications service for the UE. Optionally, if the UE has reported, to the first base station, a service type of a service requested by the UE, the first base station transmits the service type to the second base station, so that the second base station can provide a corresponding service for the UE according to the service type.

S1810: The first base station sends, to the UE, second indication information that carries a first identifier, where the second indication information is used to instruct the UE to perform D2D communication with the second base station corresponding to the first identifier.

S1811: The second base station sends the resource configuration information of the first base station to the UE.

S1812: The UE obtains, according to the resource configuration information of the first base station, a communications resource required for D2D communication.

For S1801 to S1812, refer to an execution process of the foregoing embodiment. Details are not repeatedly described herein.

Figure 19A:
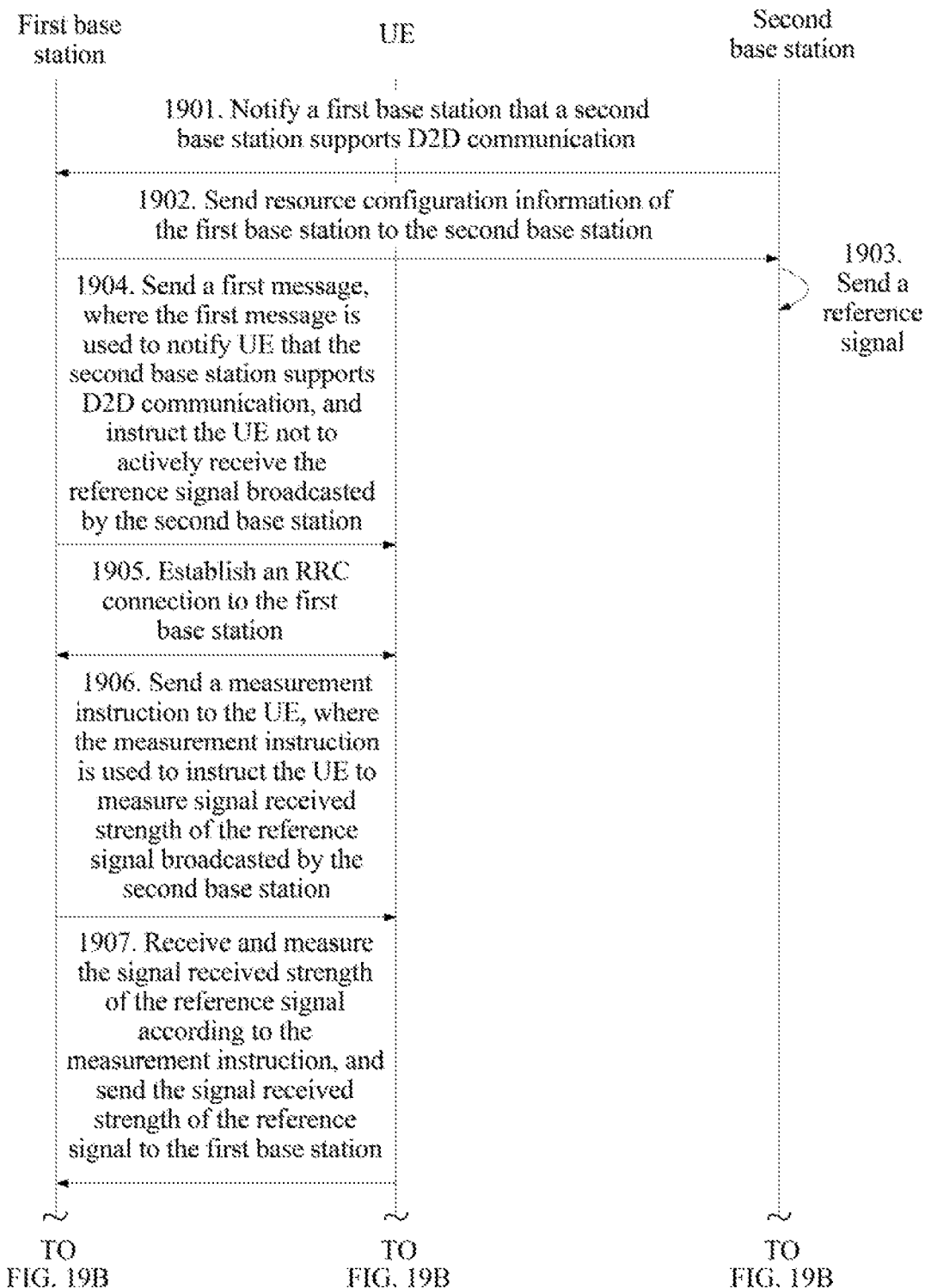

FIG. 19 is a signaling flowchart of Embodiment 19 of a resource allocation method according to the present invention. This embodiment is applied to an MSA scenario in which a first base station obtains data from a core network, then directly sends a part of the data to UE, and sends the other part of the data to the UE by using a second base station, and a mode of communication between the second base station and the UE is a D2D communication mode. As shown in FIG. 19, the method includes the following steps.

S1901: The second base station notifies the first base station that the second base station supports D2D communication.

S1902: The first base station sends resource configuration information of the first base station to the second base station.

S1903: The second base station sends a reference signal.

S1904: The first base station sends a first message, where the first message is used to notify the UE that the second base station supports D2D communication, and instruct the UE not to actively receive the reference signal broadcasted by the second base station.

S1905: The UE establishes an RRC connection to the first base station.

S1906: The first base station sends a measurement instruction to the UE, where the measurement instruction is used to instruct the UE to measure signal received strength of the reference signal broadcasted by the second base station.

S1907: The UE receives and measures the signal received strength of the reference signal according to the measurement instruction, and sends the signal received strength of the reference signal to the first base station.

S1908: The first base station determines, according to the received signal received strength that is of the reference signal and that is reported by the UE, that the UE meets a preset condition of performing D2D communication with the second base station.

S1909: The first base station sends identifier information of the UE to the second base station, where the identifier information of the UE is used to notify the second base station that the UE meets the preset condition of performing D2D communication with the second base station, and is further used to indicate that the second base station serves as a second serving cell of the UE.

S1910: The first base station sends, to the UE, second indication information that carries a first identifier, where the second indication information is used to instruct the UE to perform D2D communication with the second base station corresponding to the first identifier.

S1911: The second base station sends the resource configuration information of the first base station to the UE.

S1912: The UE obtains, according to the resource configuration information of the first base station, a communications resource required for D2D communication.

S1913: The first base station sends data obtained from a core network to the second base station.

S1914: The second base station sends the data to the UE in a D2D communication mode, so that the UE can receive the data by using the determined communications resource.

For S1901 to S1914, refer to an execution process of the foregoing embodiment. Details are not repeatedly described herein.

In a heterogeneous network, a resource used for communication between a micro base station and a macro base station or UE is an uplink-downlink resource of the macro base station. However, when receiving, by using a downlink resource of the macro base station, data delivered by the macro base station, the micro base station cannot send data to the UE by using the downlink resource; or when receiving data sent by UE in coverage of the micro base station, the micro base station cannot send data to the macro base station by using an uplink resource. Therefore, the micro base station cannot simultaneously communicate with the macro base station and the UE, and a resource can be used only at different time. Consequently, resource utilization is not high. How to improve resource utilization of the micro base station is a technical problem to be resolved in the following embodiment.

Figure 20:
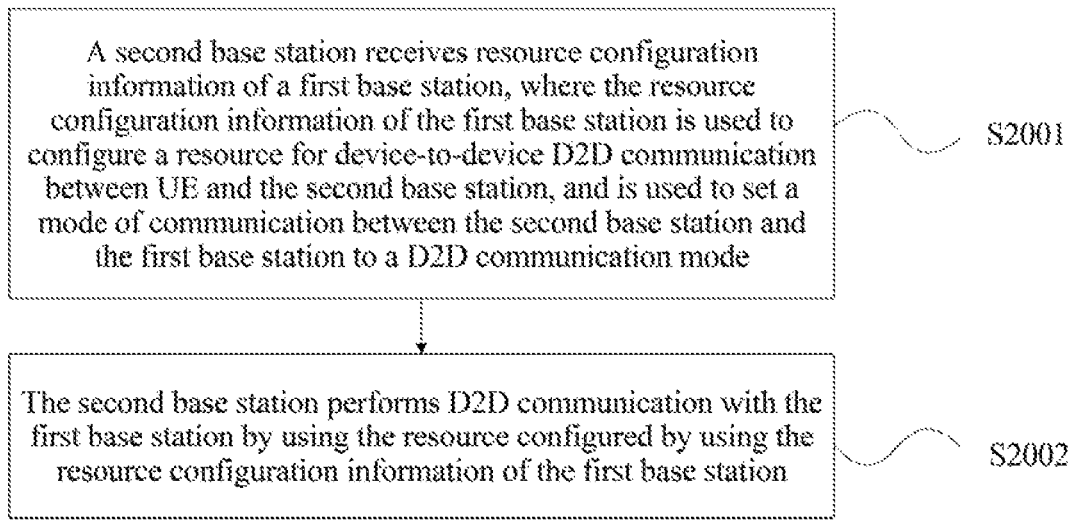
FIG. 20 is a schematic flowchart of Embodiment 20 of a resource allocation method according to the present invention.

FIG. 20 is a schematic flowchart of Embodiment 20 of a resource allocation method according to the present invention. This embodiment relates to a specific process in which a mode of communication between a second base station and a first base station is configured as a D2D communication mode, so that the second base station simultaneously communicates with UE and the first base station by using a resource of the first base station. In this embodiment, the first base station is a macro base station, and the second base station is a micro base station. As shown in FIG. 20, the method includes the following steps.

S2001: The second base station receives resource configuration information of the first base station, where the resource configuration information of the first base station is used to configure a resource for device-to-device (D2D) communication between the UE and the second base station, and is used to set a mode of communication between the second base station and the first base station to a D2D communication mode.

Specifically, in this embodiment, both the second base station and the first base station support D2D communication by default, or both the second base station and the first base station may perform a corresponding D2D detection to learn whether both the second base station and the first base station support D2D communication. If both the second base station and the first base station support D2D communication, the first base station sends the resource configuration information of the first base station to the second base station. Optionally, the first base station and the second base station detect whether the first base station and the second base station have a D2D communication capability. For details, refer to the foregoing method embodiment. Details are not repeatedly described herein.

When the first base station detects that the first base station supports D2D communication, and learns that the second base station also supports D2D communication, the first base station sends the resource configuration information of the first base station to the second base station. Further, the first base station may set the mode of communication between the first base station and the second base station to a D2D communication mode by using a communication parameter in the resource configuration information of the first base station, or may set a mode of communication between the second base station and the UE as a cellular communication mode, and notify the second base station that the second base station may perform communication by using a resource of the first base station.

S2002: The second base station performs D2D communication with the first base station by using the resource configured by using the resource configuration information of the first base station.

Specifically, in this embodiment, the resource configured by using the resource configuration information of the first base station may be an uplink resource of the first base station, or may be a downlink, resource of the first base station. Because the D2D communication mode has a capability of avoiding a resource conflict, when receiving, by using the downlink resource of the first base station, data sent by the first base station, the second base station may send data to the UE by using the uplink resource of the first base station, or when receiving, by using the uplink resource of the first base station, data sent by UE, the second base station may send data to the macro base station by using the downlink resource of the first base station. According to the technical solution in this embodiment of the present invention, the micro base station may simultaneously receive data and send data, thereby improving resource utilization of the first base station.

Figure 21:
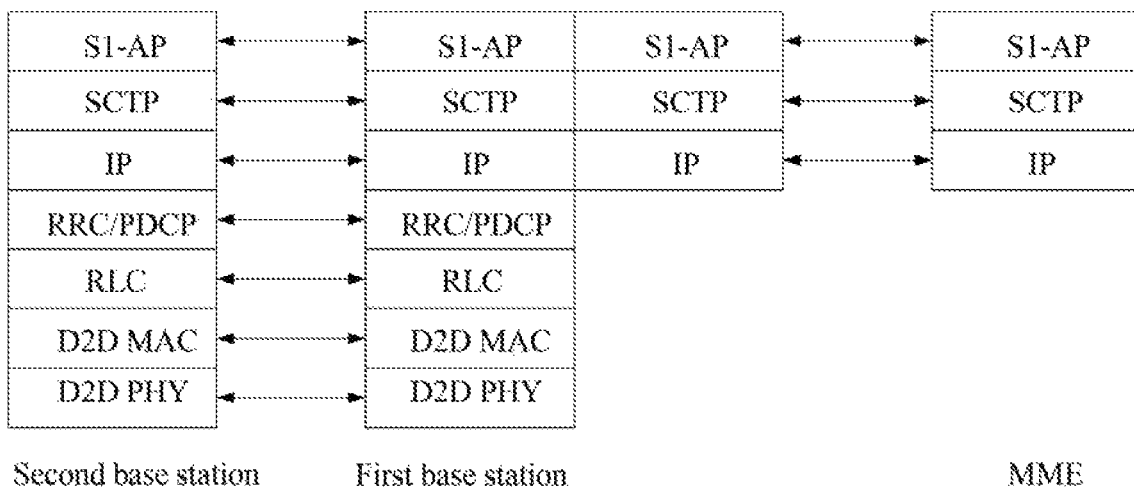
FIG. 21 is a schematic diagram of another protocol stack according to the present invention.
Figure 22:
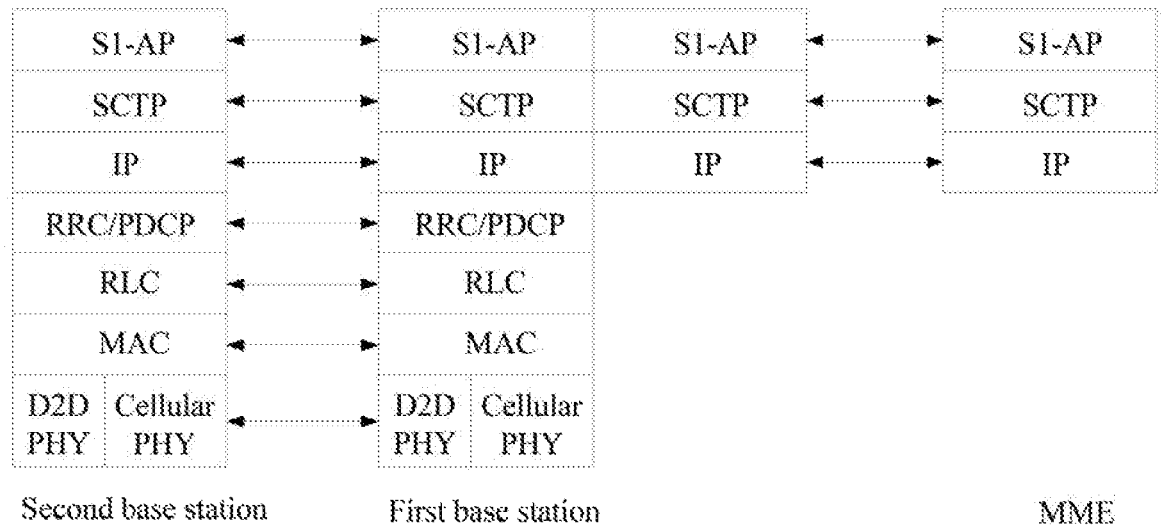
FIG. 22 is a schematic diagram of another protocol stack according to the present invention.
Figure 23:
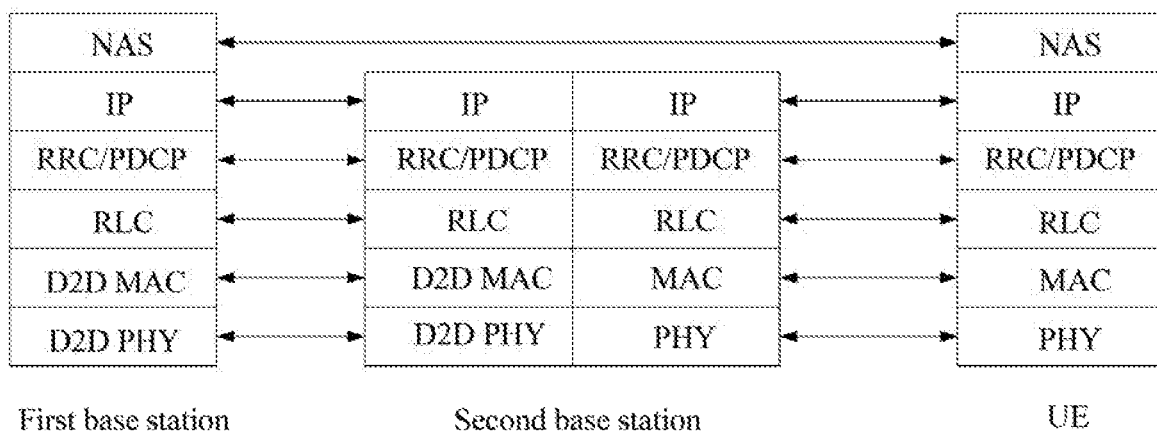
FIG. 23 is a schematic diagram of another protocol stack according to the present invention.

It should be noted that, the first base station and the second base station may perform D2D communication by using a protocol stack shown in FIG. 21, a protocol stack shown in FIG. 22, or a protocol stack shown in FIG. 23. A difference between the protocol stack shown in FIG. 21 and the protocol stack shown in FIG. 22 lies in that if the second base station uses the protocol stack shown in FIG. 21 to perform D2D communication with the first base station, the second base station may use a D2D link alone to implement a backhaul link, and if the second base station uses the protocol stack shown in FIG. 22, the second base station may support both a cellular link and a D2D link. For the protocol stack shown in FIG. 23, the second base station may serve as a routing function node in this case, to forward data between the UE and the macro base station at an IP layer. In addition, a link between the second base station and the macro base station is a D2D link, and a link between the second base station and the UE is a normal cellular link.

In addition, in the protocol stacks in FIG. 4, and FIG. 21 to FIG. 23, S1-AP refers to an S1 application protocol layer. SCTP refers to a stream control transmission protocol layer, IP is an Internet protocol layer, RRC is a radio resource control layer, PDCP is a packet data convergence protocol (Packet Data Convergence Protocol, hereinafter referred to as PDCP) layer, RLC is a radio link control layer, MAC is a media access control layer. PHY is a physical layer, D2D PHY refers to PHY in a D2D communication mode, and NAS is a non-access stratum layer.

According to the resource allocation method provided in this embodiment of the present invention, a first base station and a second base station are separately deployed as a base station that supports DID communication, and the first base station configures a mode of communication with the second base station to a D2D communication mode, so that the second base station can perform D2D communication with the first base station by using an uplink resource of the first base station when receiving data, that is, the second base station can simultaneously receive data and send data, thereby improving resource utilization of the first base station.

Persons of ordinary skill in the art may understand that all or some of the steps of the method embodiments may be implemented by a program instructing relevant hardware. The program may be stored in a computer readable storage medium. When the program runs, the steps of the method embodiments are performed. The storage medium includes: any medium that can store program code, such as a ROM, a RAM, a magnetic disk, or an optical disc.

Figure 24:
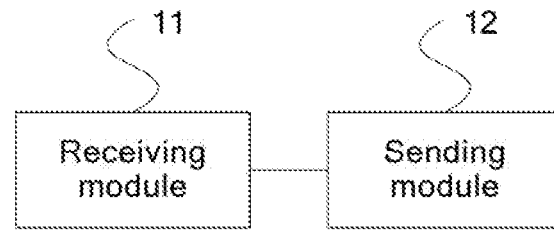
FIG. 24 is a schematic structural diagram of Embodiment 1 of a base station according to the present invention.

FIG. 24 is a schematic structural diagram of Embodiment 1 of a base station according to the present invention. The base station may be a second base station in the foregoing method embodiment. As shown in FIG. 24, the base station includes a receiving module 11 and a sending module 12. The receiving module 11 is configured to receive resource configuration information of a first base station. The sending module 12 is configured to send the resource configuration information of the first base station to user equipment (UE). The resource configuration information of the first base station is used to configure a resource for device-to-device (D2D) communication between the UE and the base station.

The base station provided in this embodiment of the present invention can execute the foregoing method embodiment. An implementation principle and a technical effect of this embodiment are similar to those of the foregoing method embodiment thereof are similar, and details are not repeatedly described herein.

Further, the sending module 12 is further configured to: before, the receiving module 11 receives the resource configuration information of the first base station, notify the first base station that the base station supports D2D communication. Still further, the sending module 12 is specifically configured to send the resource configuration information of the first base station to the UE by using the resource configured by using the resource configuration information of the first base station.

In a possible implementation of this embodiment of the present invention, the sending module 12 is further configured to send a reference signal to the UE before sending the resource configuration information of the first base station to the user equipment (UE). The reference signal is used to instruct the UE to send a setup request message. The receiving module 11 is further configured to receive the setup request message. The setup request message is used to request the base station to send the resource configuration information of the first base station to the UE, and the setup request message is an RRC connection setup request message.

Optionally, when the setup request message is directly sent by the UE to the base station, the sending module 12 is specifically configured to send a setup response message to the UE. The setup response message includes the resource configuration information of the first base station. The setup response message is an RRC connection setup response message.

Optionally, when the setup request message is sent by the UE to the base station by using the first base station, the sending module 12 is specifically configured to send a setup response message to the UE according to an identifier of the UE. The setup response message includes the resource configuration information of the first base station. The setup request message includes the identifier of the UE and first indication information. The first indication information is used to notify the base station that the UE supports D2D communication with the base station. The setup response message is an RRC connection setup response message.

In another possible implementation of this embodiment of the present invention, the receiving module 11 is specifically configured to receive identifier information of the UE sent by the first base station. The identifier information of the UE is used to notify the base station that the UE supports D2D communication with the base station. The sending module 12 is specifically configured to send the resource configuration information of the first base station to the UE according to the identifier information of the UE.

Optionally, the identifier information of the UE is further used to indicate that the base station serves as a second serving cell of the UE.

In another possible implementation of this embodiment of the present invention, optionally, the receiving module 11 is further configured to: after the sending module 12 sends the resource configuration information of the first base station to the UE according to the identifier information of the UE, receive data sent by the first base station. The sending module 12 is further configured to send the data to the UE according to the resource configured by using the resource configuration information of the first base station.

Optionally, the sending module 12 is specifically configured to send the resource configuration information of the first base station to the UE by using the first base station.

Optionally, the receiving module 11 is specifically configured to receive an RRC connection setup request message sent by the UE. The sending module 12 is specifically configured to send an RRC connection setup response message to the UE. The RRC connection setup response message includes the resource configuration information of the first base station.

Optionally, the resource configured by using the resource configuration information of the first base station includes an uplink resource of the first base station and/or a downlink resource of the first base station.

The base station provided in this embodiment of the present invention can execute the foregoing method embodiment. An implementation principle and a technical effect of this embodiment are similar to those of the foregoing method embodiment are similar, and details are not repeatedly described herein.

Embodiment 2 of the present invention provides a base station. The base station may be a first base station in the foregoing method embodiment. The base station includes a sending module 21, configured to send resource configuration information of the base station to a second base station. The resource configuration information of the base station is used to configure a resource for device-to-device (D2D) communication between user equipment (UE) and the second base station.

The base station provided in this embodiment of the present invention can execute the foregoing method embodiment. An implementation principle and a technical effect of this embodiment are similar to those of the foregoing method embodiment are similar, and details are not repeatedly described herein.

Figure 25:
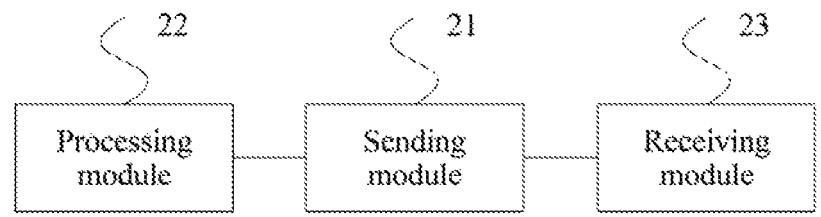
FIG. 25 is a schematic structural diagram of Embodiment 3 of a base station according to the present invention.

FIG. 25 is a schematic structural diagram of Embodiment 3 of a base station according to the present invention. Based on the foregoing embodiment shown in FIG. 24, the base station further includes a processing module 22. The processing module 22 is configured to determine, according to an indication of the second base station, that the second base station supports D2D communication.

Still further, the base station further includes a receiving module 23. The sending module 21 is further configured to send a first message to the UE after sending the resource configuration information of the base station to the second base station. The first message is used to notify the UE that the second base station supports D2D communication. The receiving module 23 is configured to receive an RRC connection setup request message that is sent by the UE and that carries first indication information. The first indication information is used to notify the base station that the UE supports D2D communication with the second base station. The sending module 21 is further configured to: add an identifier of the UE to the RRC connection setup request message, and send the RRC connection setup request message to the second base station, so that the second base station sends an RRC connection setup response message to the UE according to the identifier of the UE. The RRC connection setup response message includes the resource configuration information of the base station.

The base station provided in this embodiment of the present invention can execute the foregoing method embodiment. An implementation principle and a technical effect of this embodiment are similar to those of the foregoing method embodiment are similar, and details are not repeatedly described herein.

Still referring to FIG. 25, the sending module 21 is further configured to: send a first message to the UE, and send a measurement instruction to the UE. The first message is used to notify the UE that the second base station supports D2D communication. The measurement instruction is used to instruct the UE to measure signal received strength of a reference signal sent by the second base station. The processing module 22 is further configured to determine, according to the signal received strength that is of the reference signal, reported by the UE, and received by the receiving module 23, that the UE supports D2D communication with the second base station. The sending module 21 is further configured to: send identifier information of the UE to the second base station, and send, to the UE, second indication information that carries a first identifier. The identifier information of the UE is used to notify the second base station that the UE supports D2D communication with the second base station. The second indication information is used to instruct the UE to perform D2D communication with the second base station corresponding to the first identifier.

Further, the identifier information of the UE is further used to indicate that the second base station serves as a second serving cell of the UE.

Optionally, the receiving module 23 is further configured to: after the sending module 21 sends the identifier information of the UE to the second base station, and sends, to the UE, the second indication information that carries the first identifier, receive the resource configuration information of the base station sent by the second base station corresponding to the first identifier. The sending module 21 is further configured to send the resource configuration information of the base station to the UE.

The base station provided in this embodiment of the present invention can execute the foregoing method embodiment. An implementation principle and a technical effect of this embodiment are similar to those of the foregoing method embodiment are similar, and details are not repeatedly described herein.

Figure 26:
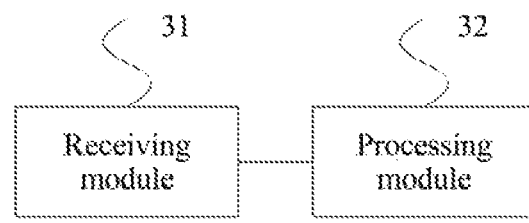
FIG. 26 is a schematic structural diagram of Embodiment 1 of user equipment according to the present invention.

FIG. 26 is a schematic structural diagram of Embodiment 1 of user equipment according to the present invention. As shown in FIG. 26, the UE includes: a receiving module 31, configured to receive resource configuration information of a first base station sent by a second base station: and a processing module 32, configured to determine, according to the resource configuration information of the first base station, a communications resource required for D2D communication.

The UE provided in this embodiment of the present invention can execute the foregoing method embodiment. An implementation principle and a technical effect of this embodiment are similar to those of the foregoing method embodiment are similar, and details are not repeatedly described herein.

Further, the receiving module 31 is specifically configured to receive the resource configuration information of the first base station sent by the second base station by using a resource configured by using the resource configuration information of the first base station.

Figure 27:
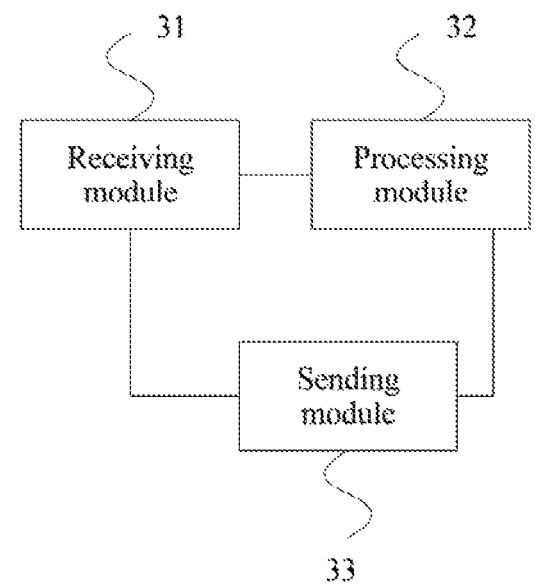
FIG. 27 is a schematic structural diagram of Embodiment 2 of user equipment according to the present invention.

FIG. 27 is a schematic structural diagram of Embodiment 2 of user equipment according to the present invention. Based on the foregoing embodiment, the UE further includes a sending module 33. In this embodiment, the receiving module 31 is further configured to: before receiving the resource configuration information of the first base station sent by the second base station, receive a reference signal sent by the second base station. The reference signal is used to instruct the UE to send a setup request message. The sending module 33 is configured to send the setup request message. The setup request message is used to request the second base station to send the resource configuration information of the first base station to the UE.

In a possible implementation of this embodiment of the present invention, the receiving module 31 is specifically configured to receive a first message sent by the first base station. The first message is used to notify the UE that the second base station supports D2D communication. The processing module 32 is specifically configured to: measure signal received strength of the reference signal, and determine, according to the signal received strength of the reference signal, that the UE supports D2D communication with the second base station. The sending module 33 is specifically configured to send the setup request message after the processing module 32 determines, according to the signal received strength of the reference signal, that the UE supports D2D communication with the second base station. The setup request message is an RRC connection setup request message.

Optionally, the receiving module 31 is specifically configured to receive a setup response message sent by the second base station. The setup response message includes the resource configuration information of the first base station, and the setup request message is directly sent by the UE to the second base station.

Optionally, the setup request message includes an identifier of the UE and first indication information. The first indication information is used to notify the second base station that the UE supports D2D communication with the second base station. The receiving module 31 is specifically configured to receive a setup response message sent by the second base station according to the identifier of the UE. The setup response message includes the resource configuration information of the first base station. The setup request message is sent by the UE to the second base station by using the first base station. The setup response message is an RRC connection setup response message.

In another possible implementation of this embodiment of the present invention, the processing module 32 is specifically configured to measure, according to a measurement instruction sent by the first base station, signal received strength of a reference signal sent by the second base station. The sending module 33 is specifically configured to report the signal received strength of the reference signal to the first base station, so that the first base station sends identifier information of the UE to the second base station after determining, according to the signal received strength of the reference signal, that the UE supports D2D communication with the second base station. The identifier information of the UE is used to notify the second base station that the UE supports D2D communication with the second base station. The receiving module 31 is specifically configured to: receive second indication information that is sent by the first base station and that carries a first identifier, and receive the resource configuration information of the first base station sent by the second base station corresponding to the first identifier. The second indication information is used to instruct the UE to perform D2D communication with the second base station corresponding to the first identifier.

Further, the identifier information of the UE is further used to indicate that the second base station serves as a second serving cell of the UE.

Optionally, the receiving module 31 is specifically configured to receive the resource configuration information of the first base station sent by using the first base station by the second base station corresponding to the first identifier.

Optionally, the sending module 33 is specifically configured to send an RRC connection setup request message to the second base station corresponding to the first identifier. The receiving module 31 is specifically configured to receive an RRC connection setup response message sent by the second base station corresponding to the first identifier. The RRC connection setup response message includes the resource configuration information of the first base station.

The UE provided in this embodiment of the present invention can execute the foregoing method embodiment. An implementation principle and a technical effect of this embodiment are similar to those of the foregoing method embodiment are similar, and details are not repeatedly described herein.

Figure 28:
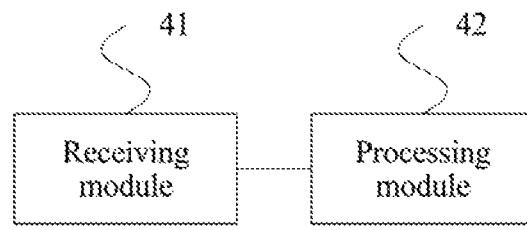
FIG. 28 is a schematic structural diagram of Embodiment 4 of a base station according to the present invention.

FIG. 28 is a schematic structural diagram of Embodiment 4 of a base station according to the present invention. The base station may be a second base station in the foregoing method embodiment. As shown in FIG. 28, the base station includes: a receiving module 41, configured to receive resource configuration information of a first base station, where the resource configuration information of the first base station is used to configure a resource for device-to-device (D2D) communication between UE and the base station, and is used to set a mode of communication between the base station and the first base station to a D2D communication mode; and a processing module 42, configured to perform D2D communication with the first base station by using the resource configured by using the resource configuration information of the first base station.

The base station provided in this embodiment of the present invention can execute the foregoing method embodiment. An implementation principle and a technical effect of this embodiment are similar to those of the foregoing method embodiment are similar, and details are not repeatedly described herein.

Figure 29:
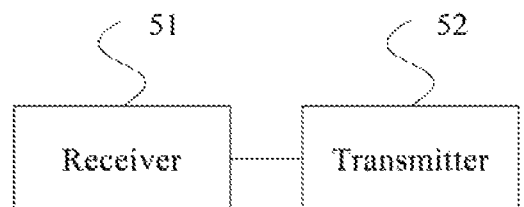
FIG. 29 is a schematic structural diagram of Embodiment 5 of a base station according to the present invention.

FIG. 29 is a schematic structural diagram of Embodiment 5 of a base station according to the present invention. The base station may be a second base station in the foregoing method embodiment. As shown in FIG. 29, the base station includes a receiver 51 and a transmitter 52. The receiver 51 is configured to receive resource configuration information of a first base station. The transmitter 52 is configured to send the resource configuration information of the first base station to user equipment (UE). The resource configuration information of the first base station is used to configure a resource for device-to-device (D2D) communication between the UE and the base station.

The base station provided in this embodiment of the present invention can execute the foregoing method embodiment. An implementation principle and a technical effect of this embodiment are similar to those of the foregoing method embodiment are similar, and details are not repeatedly described herein.

Further, the transmitter 52 is further configured to: before the receiver 51 receives the resource configuration information of the first base station, notify the first base station that the base station supports D2D communication. Still further, the transmitter 52 is specifically configured to send the resource configuration information of the first base station to the UE by using the resource configured by using the resource configuration information of the first base station.

In a possible implementation of this embodiment of the present invention, the transmitter 52 is further configured to send a reference signal to the UE before sending the resource configuration information of the first base station to the user equipment (UE). The reference signal is used to instruct the UE to send a setup request message. The receiver 51 is further configured to receive the setup request message. The setup request message is used to request the base station to send the resource configuration information of the first base station to the UE, and the setup request message is an RRC connection setup request message.

Optionally, when the setup request message is directly sent by the UE to the base station, the transmitter 52 is specifically configured to send a setup response message to the UE. The setup response message includes the resource configuration information of the first base station. The setup response message is an RRC connection setup response message.

Optionally, when the setup request message is sent by the UE to the base station by using the first base station, the transmitter 52 is specifically configured to send a setup response message to the UE according to an identifier of the UE. The setup response message includes the resource configuration information of the first base station. The setup request message includes the identifier of the UE and first indication information. The first indication information is used to notify the base station that the UE supports D2D communication With the base station. The setup response message is an RRC connection setup response message.

In another possible implementation of this embodiment of the present invention, the receiver 51 is specifically configured to receive identifier information of the UE sent by the first base station. The identifier information of the UE is used to notify the base station that the UE supports D2D communication with the base station. The transmitter 52 is specifically configured to send the resource configuration information of the first base station to the UE according to the identifier information of the UE.

Optionally, the identifier information of the UE is further used to indicate that the base station serves as a second serving cell of the UE.

In another possible implementation of this embodiment of the present invention, optionally; the receiver 51 is further configured to: after the transmitter 52 sends the resource configuration information of the first base station to the UE according to the identifier information of the UE, receive data sent by the first base station. The transmitter 52 is further configured to send the data to the UE according to the resource configured by using the resource configuration information of the first base station.

Optionally, the transmitter 52 is specifically configured to send the resource configuration information of the first base station to the UE by using the first base station.

Optionally, the receiver 51 is specifically configured to receive an RRC connection setup request message sent by the UE. The transmitter 52 is specifically configured to send an RRC connection setup response message to the UE. The RRC connection setup response message includes the resource configuration information of the first base station.

Optionally, the resource configured by using the resource configuration information of the first base station includes an uplink resource of the first base station and/or a downlink resource of the first base station.

The base station provided in this embodiment of the present invention can execute the foregoing method embodiment. An implementation principle and a technical effect of this embodiment are similar to those of the foregoing method embodiment are similar, and details are not repeatedly described herein.

Embodiment 6 of the present invention provides a base station. The base station may be a first base station in the foregoing method embodiment. The base station includes a transmitter 61, configured to send resource configuration information of the base station to a second base station. The resource configuration information of the base station is used to configure a resource for device-to-device (D2D) communication between user equipment (UE) and the second base station.

The base station provided in this embodiment of the present invention can execute the foregoing method embodiment. An implementation principle and a technical effect of this embodiment are similar to those of the foregoing method embodiment are similar, and details are not repeatedly described herein.

Figure 30:
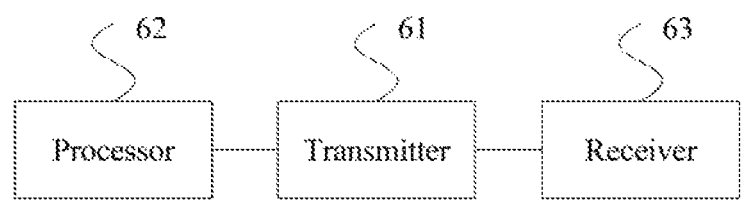
FIG. 30 is a schematic structural diagram of Embodiment 7 of a base station according to the present invention.

FIG. 30 is a schematic structural diagram of Embodiment 7 of a base station according to the present invention. Based on the foregoing embodiment shown in FIG. 29, the base station further includes a processor 62. The processor 62 is configured to determine, according to an indication of the second base station, that the second base station supports D2D communication.

Still further, the base station further includes a receiver 63. The transmitter 61 is further configured to send a first message to the UE after sending the resource configuration information of the base station to the second base station. The first message is used to notify the UE that the second base station supports D2D communication. The receiver 63 is configured to receive an RRC connection setup request message that is sent by the UE and that carries first indication information. The first indication information is used to notify the base station that the UE supports D2D communication with the second base station. The transmitter 61 is further configured to: add an identifier of the UE to the RRC connection setup request message, and send the RRC connection setup request message to the second base station, so that the second base station sends an RRC connection setup response message to the UE according to the identifier of the UE. The RRC connection setup response message includes the resource configuration information of the base station.

The base station provided in this embodiment of the present invention can execute the foregoing method embodiment. An implementation principle and a technical effect of this embodiment are similar to those of the foregoing method embodiment are similar, and details are not repeatedly described herein.

Still referring to FIG. 30, the transmitter 61 is further configured to: send a first message to the UE, and send a measurement instruction to the UE. The first message is used to notify the UE that the second base station supports D2D communication. The measurement instruction is used to instruct the UE to measure signal received strength of a reference signal sent by the second base station. The processor 62 is further configured to determine, according to the signal received strength that is of the reference signal, reported by the UE, and received by the receiver 63, that the UE supports D2D communication with the second base station. The transmitter 61 is further configured to: send identifier information of the UE to the second base station, and send, to the UE, second indication information that carries a first identifier. The identifier information of the UE is used to notify the second base station that the UE supports D2D communication with the second base station. The second indication information is used to instruct the UE to perform D2D communication with the second base station corresponding to the first identifier.

Further, the identifier information of the UR is further used to indicate that the second base station serves as a second serving cell of the UE.

Optionally, the receiver 63 is further configured to: after the transmitter 61 sends the identifier information of the UE to the second base station, and sends, to the UE, the second indication information that carries the first identifier, receive the resource configuration information of the base station sent by the second base station corresponding to the first identifier. The transmitter 61 is further configured to send the resource configuration information of the base station to the UE.

The base station provided in this embodiment of the present invention can execute the foregoing method embodiment. An implementation principle and a technical effect of this embodiment are similar to those of the foregoing method embodiment are similar, and details are not repeatedly described herein.

Figure 31:
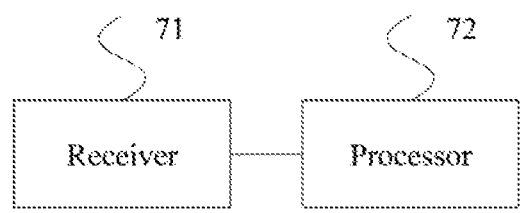
FIG. 31 is a schematic structural diagram of Embodiment 3 of user equipment according to the present invention.

FIG. 31 is a schematic structural diagram of Embodiment 3 of user equipment according to the present invention. As shown in FIG. 31, the UE includes: a receiver 71, configured to receive resource configuration information of a first base station sent by a second base station; and a processor 72, configured to determine, according to the resource configuration information of the first base station, a communications resource required for D2D communication.

The UE provided in this embodiment of the present invention can execute the foregoing method embodiment. An implementation principle and a technical effect of this embodiment are similar to those of the foregoing method embodiment are similar, find details are not repeatedly described herein.

Further, the receiver 71 is specifically configured to receive the resource configuration information of the first base station sent by the second base station by using a resource configured by using the resource configuration information of the first base station.

Figure 32:
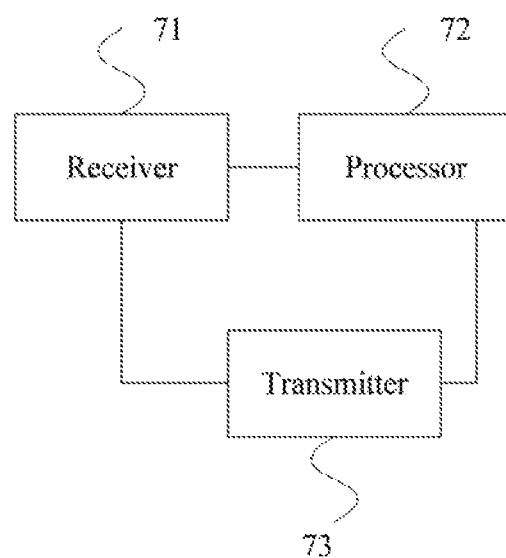
FIG. 32 is a schematic structural diagram of Embodiment 4 of user equipment according to the present invention.

FIG. 32 is a schematic structural diagram of Embodiment 4 of user equipment according to the present invention. Based on the foregoing embodiment, the UE further includes a transmitter 73. In this embodiment, the receiver 71 is further configured to: before receiving the resource configuration information of the first base station sent by the second base station, receive a reference signal sent by the second base station. The reference signal is used to instruct the UE to send a setup request message. The transmitter 73 is configured to send the setup request message. The setup request message is used to request the second base station to send the resource configuration information of the first base station to the UE.

In a possible implementation of this embodiment of the present invention, the receiver 71 is specifically configured to receive a first message sent by the first base station. The first message is used to notify the UE that the second base station supports D2D communication. The processor 72 is specifically configured to: measure signal received strength of the reference signal, and determine, according to the signal received strength of the reference signal, that the UE supports D2D communication with the second base station. The transmitter 73 is specifically configured to send the setup request message after the processor 72 determines, according to the signal received strength of the reference signal, that the UE supports D2D communication with the second base station. The setup request message is an RRC connection setup request message.

Optionally, the receiver 71 is specifically configured to receive a setup response message sent by the second base station. The setup response message includes the resource configuration Information of the first base station, and the setup request message is directly sent by the UE to the second base station.

Optionally, the setup request message includes an identifier of the UE and first indication information. The first indication information is used to notify the second base station that the UE supports D2D communication with the second base station. The receiver 71 is specifically configured to receive a setup response message sent by the second base station according to the identifier of the UE. The setup response message includes the resource configuration information of the first base station. The setup request message is sent by the UE to the second base station by using the first base station. The setup response message is an RRC connection setup response message.

In another possible implementation of this embodiment of the present invention, the processor 72 is specifically configured to measure, according to a measurement instruction sent by the first base station, signal received strength of a reference signal sent by the second base station. The transmitter 73 is specifically configured to report the signal received strength of the reference signal to the first base station, so that the first base station sends identifier information of the UE to the second base station after determining, according to the signal received strength of the reference signal, that the UE supports D2D communication with the second base station. The identifier information of the UE is used to notify the second base station that the UE supports D2D communication with the second base station. The receiver 71 is specifically configured to; receive second indication information that is sent by the first base station and that carries a first identifier, and receive the resource configuration information of the first base station sent by the second base station corresponding to the first identifier. The second indication information is used to instruct the UE to perform D2D communication with the second base station corresponding to the first identifier.

Further, the identifier information of the UE is further used to indicate that the second base station serves as a second serving cell of the UE.

Optionally, the receiver 71 is specifically configured to receive the resource configuration information of the first base station sent by using the first base station by the second base station corresponding to the first identifier.

Optionally, the transmitter 73 is specifically configured to send an RRC connection setup request message to the second base station corresponding to the first identifier. The receiver 71 is specifically configured to receive an RRC connection setup response message sent by the second base station corresponding to the first identifier. The RRC connection setup response message includes the resource configuration information of the first base station.

The UE provided in this embodiment of the present invention can execute the foregoing method embodiment. An implementation principle and a technical effect of this embodiment are similar to those of the foregoing method embodiment are similar, find details are not repeatedly described herein.

Figure 33:
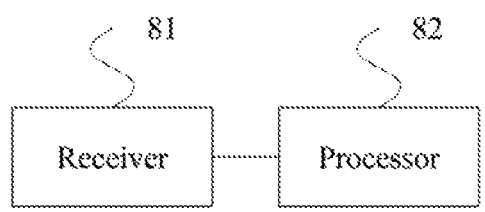
FIG. 33 is a schematic structural diagram of Embodiment 8 of a base station according to the present invention.

FIG. 33 is a schematic structural diagram of Embodiment 8 of a base station according to the present invention. The base station may be a second base station in the foregoing method embodiment. As shown in FIG. 33, the base station includes: a receiver 81, configured to receive resource configuration information of a first base station, where the resource configuration information of the first base station is used to configure a resource for device-to-device (D2D) communication between UE and the base station, and is used to set a mode of communication between the base station and the first base station to a D2D communication mode; and a processor 82, configured to perform D2D communication with the first base station by using the resource configured by using the resource configuration information of the first base station.

The base station provided in this embodiment of the present invention can execute the foregoing method embodiment. An implementation principle and a technical effect of this embodiment are similar to those of the foregoing method embodiment are similar, and details are not repeatedly described herein.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A resource allocation method, comprising:
    receiving, by a second base station, resource configuration information of a first base station;
    receiving, by the second base station, identifier information of a user equipment (UE) from the first base station, wherein the identifier information of the UE is used to notify the second base station that the UE supports device-to-device (D2D) communication with the second base station; and
    sending, by the second base station, the resource configuration information of the first base station to the UE according to the identifier information of the UE, wherein the resource configuration information of the first base station is used to configure a resource for D2D communication between the UE and the second base station.

2. The method according to claim 1, wherein before the receiving, by the second base station, the resource configuration information of the first base station, the method further comprises:
    notifying, by the second base station, the first base station that the second base station supports D2D communication.

3. The method according to claim 1, wherein the sending, by the second base station, the resource configuration information of the first base station to the UE comprises:
    sending, by the second base station, the resource configuration information of the first base station to the UE by using the resource configured by using the resource configuration information of the first base station.

4. The method according to claim 1, wherein before the sending, by the second base station, the resource configuration information of the first base station to the UE, the method further comprises:
    sending, by the second base station, a reference signal to the UE, wherein the reference signal is used to instruct the UE to send a setup request message; and
    receiving, by the second base station, the setup request message, wherein the setup request message is used to request the second base station to send the resource configuration information of the first base station to the UE.

5. The method according to claim 1, wherein the identifier information of the UE is further used to indicate that the second base station serves as a second serving cell of the UE.

6. A resource allocation method, comprising:
    sending, by a first base station, resource configuration information of the first base station to a second base station, wherein the resource configuration information of the first base station is used to configure a resource for device-to-device (D2D) communication between a user equipment (UE) and the second base station;
    sending, by the first base station, a first message to the UE, wherein the first, message is used to notify the UE that the second base station supports D2D communication;
    receiving, by the first base station, an RRC (radio resource control) connection setup request message that carries first indication information from the UE, wherein the first indication information is used to notify the first base station that the UE supports D2D communication with the second base station; and
    adding, by the first base station, an identifier of the UE to the RRC connection setup request message, and sending the RRC connection setup request message to the second base station, so that the second base station sends an RRC connection setup response message to the UE according to the identifier of the UE, wherein the RRC connection setup response message comprises the resource configuration information of the first base station.

7. The method according to claim 6, wherein before the sending, by the first base station, the resource configuration information of the first base station to the second base station, the method further comprises:
    determining, by the first base station according to an indication of the second base station, that the second base station supports D2D communication.

8. A base station, comprising:
    a receiver, configured to receive resource configuration information of a first base station; and
    a transmitter, configured to send the resource configuration information of the first base station to a user equipment (UE), wherein the resource configuration information of the first base station is used to configure a resource for device-to-device (D2D) communication between the UE and the base station;
    wherein the transmitter is further configured to send a reference signal to the UE before sending the resource configuration information of the first base station to the UE, wherein the reference signal is used to instruct the UE to send a setup request message; and
    wherein the receiver is further configured to receive the setup request message, wherein the setup request message is used to request the base station to send the resource configuration information of the first base station to the UE.

9. The base station according to claim 8, wherein the transmitter is further configured to:
    before the receiver receives the resource configuration information of the first base station, notify the first base station that the base station supports D2D communication.

10. The base station according to claim 8, wherein the transmitter is further configured to send the resource configuration information of the first base station to the UE by using the resource configured by using the resource configuration information of the first base station.

11. The base station according to claim 8,
wherein the receiver is further configured to receive identifier information of the UE from the first base station, wherein the identifier information of the UE is used to notify the base station that the UE supports D2D communication with the base station; and
wherein the transmitter is further configured to send the resource configuration information of the first base station to the UE according to the identifier information of the UE.

12. The base station according to claim 11, wherein the identifier information of the UE is further used to indicate that the base station serves as a second serving cell of the UE.

13. A base station, comprising:
a receiver;
a transmitter configured to:
send resource configuration information of the base station to a second base station, wherein the resource configuration information of the base station is used to configure a resource for device-to-device (D2D) communication between a user equipment (UE) and the second base station,
send a first message to the UE and send a measurement instruction to the UE, wherein the first message is used to notify the UE that the second base station supports D2D communication, and the measurement instruction is used to instruct the UE to measure signal received strength of a reference signal sent by the second base station; and
a processor configured to determine, according to the signal received strength that is of the reference signal, reported by the UE, and received by the receiver, that the UE supports D2D communication with the second base station; and
wherein the transmitter is further configured to:
send identifier information of the UE to the second base station, and
send, to the UE, second indication information that carries a first identifier, wherein the identifier information of the UE is used to notify the second base station that the UE supports D2D communication with the second base station, and the second indication information is used to instruct the UE to perform D2D communication with the second base station corresponding to the first identifier.

14. The base station according to claim 13, wherein the processor is further configured to determine, according to an indication of the second base station, that the second base station supports D2D communication.

* * * * *